(12) United States Patent
Mulani et al.

(10) Patent No.: US 12,425,394 B2
(45) Date of Patent: Sep. 23, 2025

(54) PASSKEY MANAGEMENT AND SHARING

(71) Applicant: Apple Inc., Cupertino, CA (US)

(72) Inventors: Jay S. Mulani, San Francisco, CA (US); Elizabeth C. Cranfill, San Francisco, CA (US); Ryan D. Shelby, Mountain View, CA (US); Peter W. Roman, Los Altos, CA (US); Richard J. Mondello, San Jose, CA (US); Patrick L. Coffman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 127 days.

(21) Appl. No.: 18/204,535

(22) Filed: Jun. 1, 2023

(65) Prior Publication Data

US 2023/0396607 A1 Dec. 7, 2023

Related U.S. Application Data

(60) Provisional application No. 63/502,528, filed on May 16, 2023, provisional application No. 63/348,249, filed on Jun. 2, 2022.

(51) Int. Cl.
*H04L 9/40* (2022.01)
*H04L 9/08* (2006.01)

(52) U.S. Cl.
CPC .......... *H04L 63/083* (2013.01); *H04L 9/0891* (2013.01)

(58) Field of Classification Search
CPC ... H04L 63/083; H04L 63/20; H04L 63/0823; H04L 9/0891
See application file for complete search history.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |

(Continued)

FOREIGN PATENT DOCUMENTS

| | | |
|---|---|---|
| WO | 2013/169849 A2 | 11/2013 |
| WO | 2014/105276 A1 | 7/2014 |

OTHER PUBLICATIONS

International Search Report and Written Opinion of the International Searching Authority for International Application No. PCT/US2023/022757, dated Sep. 18, 2023.

*Primary Examiner* — Chau Le
(74) *Attorney, Agent, or Firm* — Kubota & Basol LLP

(57) ABSTRACT

The present disclosure generally relates to techniques for managing and sharing authentication information (e.g., passkeys, verification codes, and/or passwords) using electronic devices. A first computing system being associated with a first user account of a first user receives, via one or more input devices, one or more inputs that corresponds to a request to access a remote service that requires authentication, and in response to receiving the one or more inputs that correspond to the request to access the remote service, provides authentication information to the remote service that is based on a private key that is accessible to the first computing system, where the authentication information does not include the private key, the private key was established by a second computer system that is different from the first computer system, and the second computer system is also associated with the first user account.

42 Claims, 52 Drawing Sheets

(56) References Cited

U.S. PATENT DOCUMENTS

| | | | |
|---|---|---|---|
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 9,348,458 B2 | 5/2016 | Hotelling et al. | |
| 9,933,937 B2 | 4/2018 | Lemay et al. | |
| 2002/0015024 A1 | 2/2002 | Westerman et al. | |
| 2003/0204734 A1* | 10/2003 | Wheeler | H04L 9/3271 |
| | | | 713/184 |
| 2005/0190059 A1 | 9/2005 | Wehrenberg | |
| 2006/0017692 A1 | 1/2006 | Wehrenberg et al. | |
| 2006/0033724 A1 | 2/2006 | Chaudhri et al. | |
| 2006/0197753 A1 | 9/2006 | Hotelling | |
| 2014/0165165 A1* | 6/2014 | Story, Jr. | H04W 12/0431 |
| | | | 726/6 |
| 2014/0281540 A1* | 9/2014 | Brouwer | H04L 9/12 |
| | | | 713/169 |
| 2016/0306955 A1* | 10/2016 | Martin | G06F 21/34 |
| 2017/0012974 A1* | 1/2017 | Sierra | H04W 12/08 |
| 2017/0329958 A1* | 11/2017 | Hitchcock | H04L 9/3268 |
| 2019/0312726 A1* | 10/2019 | Sierra | H04L 63/104 |
| 2021/0373744 A1* | 12/2021 | Miller | G06Q 20/4014 |

\* cited by examiner

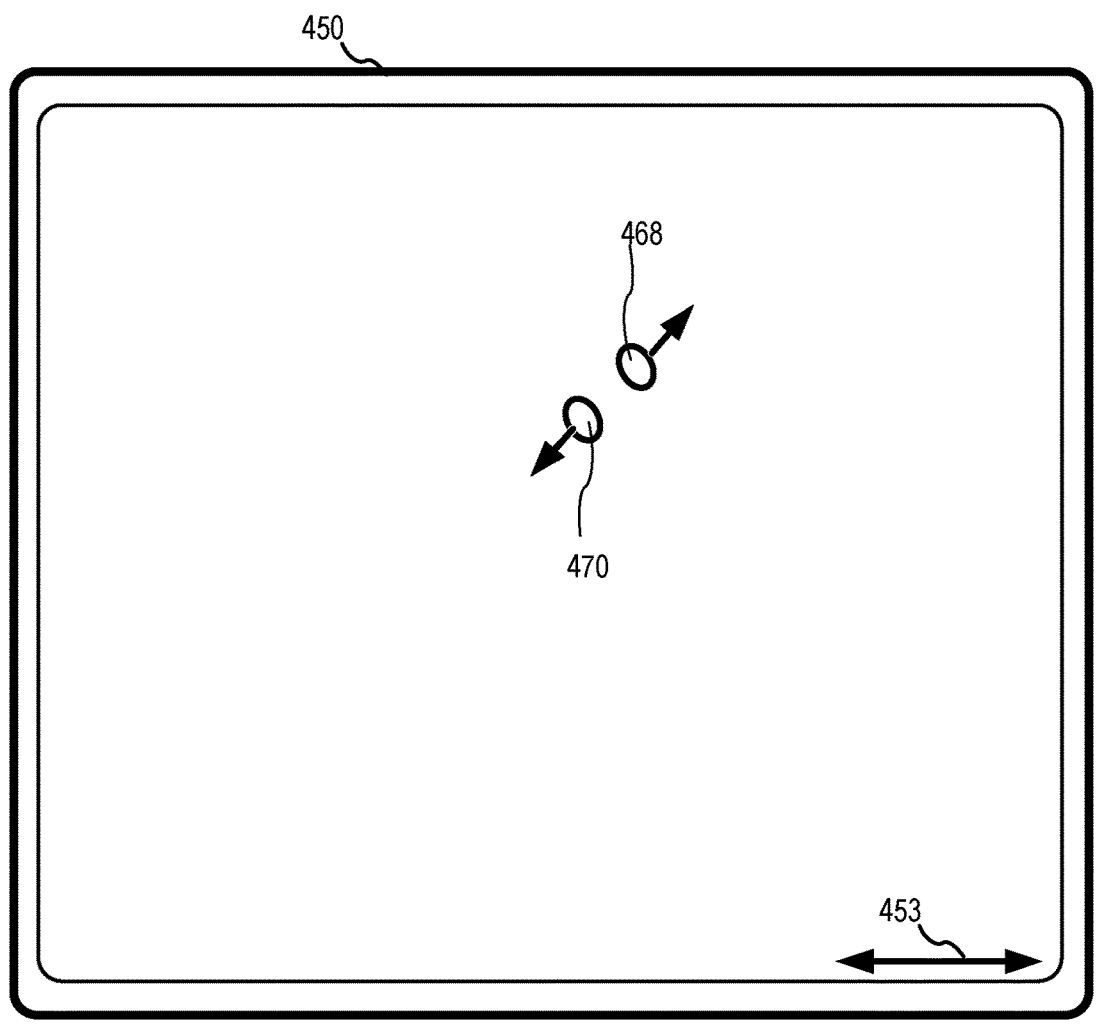
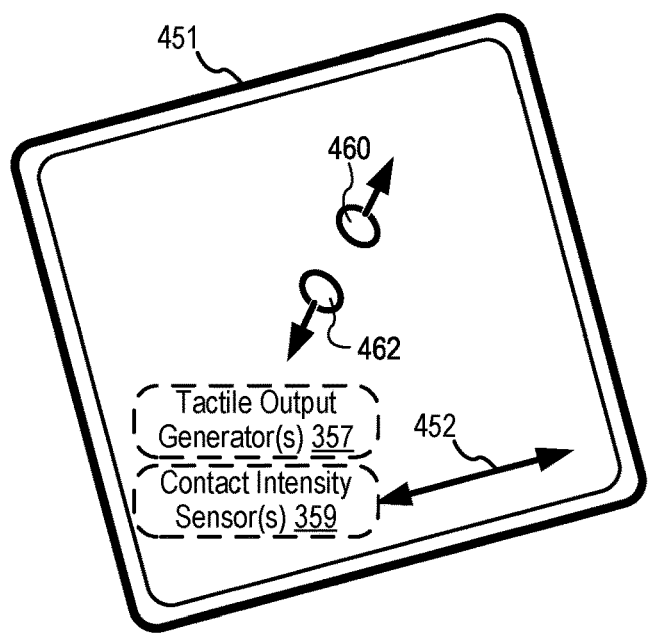
FIG. 4B

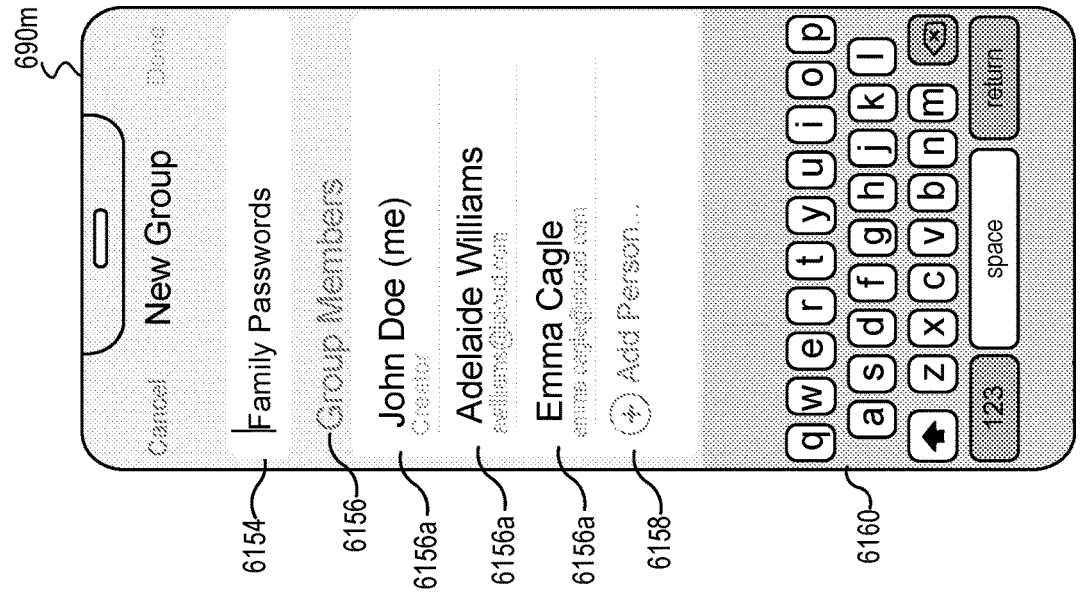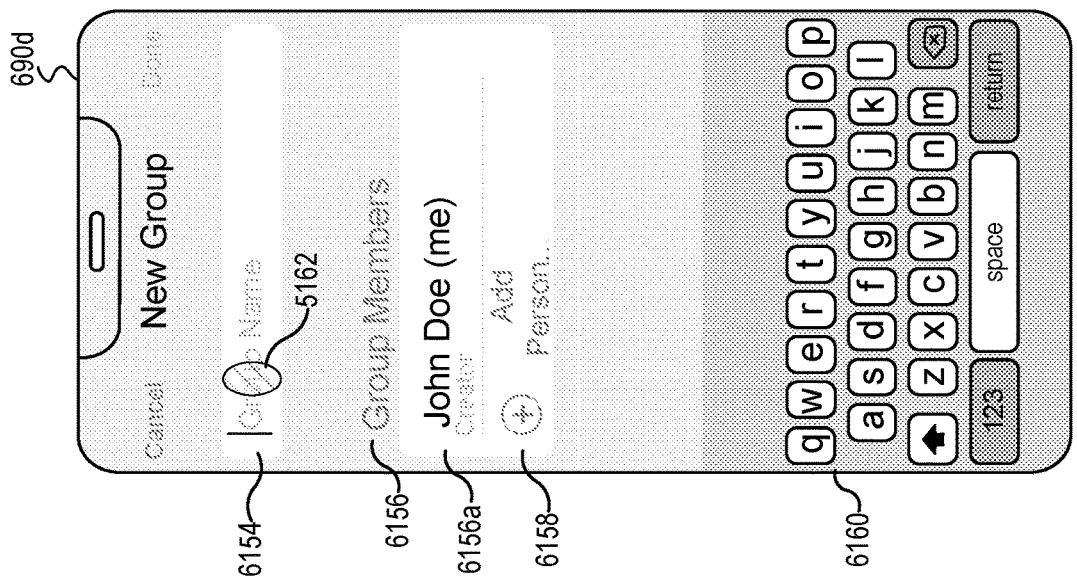
FIG. 6AA

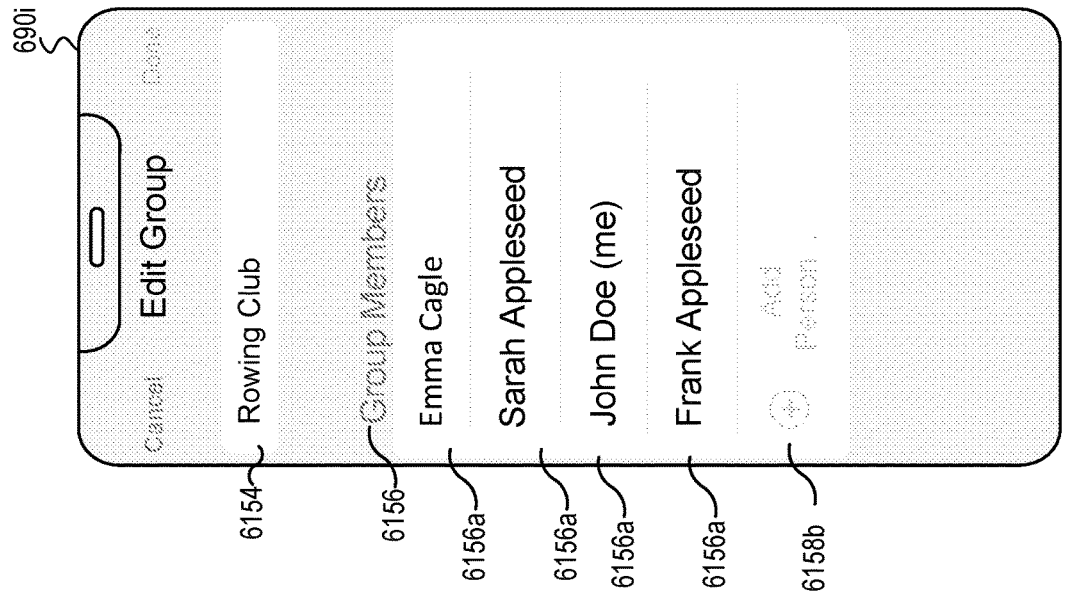
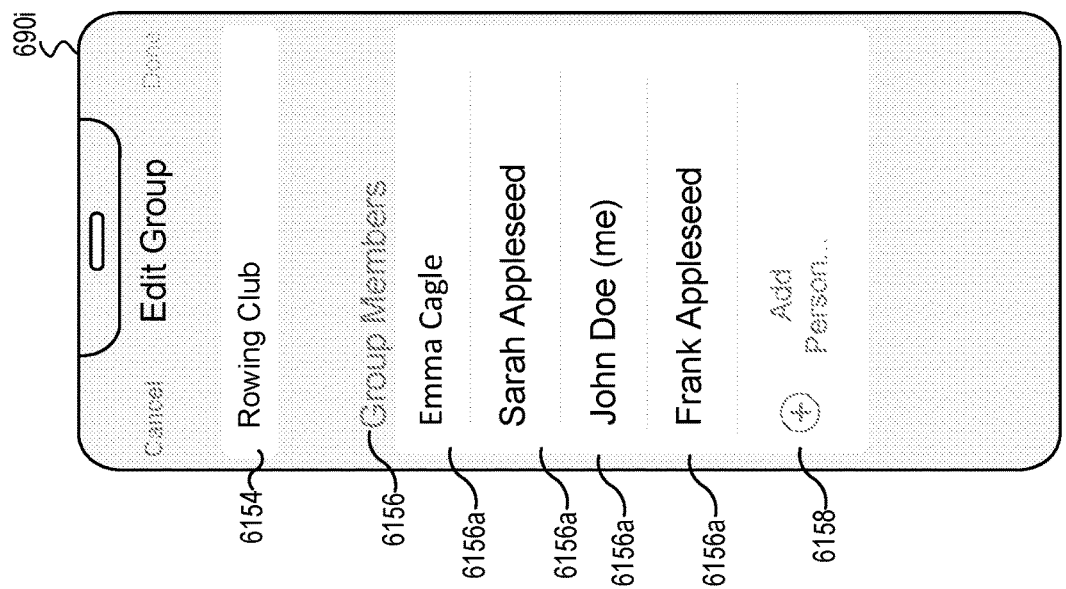
FIG. 6AL

702
At a first computing system that is in communication with a display generation component and one or more input devices, the first computing system being associated with a first user account of a first user:

704
Receiving, via the one or more input devices, one or more inputs that corresponds to a request to access a remote service that requires authentication

706
In response to receiving the one or more inputs that correspond to the request to access the remote service, providing authentication information to the remote service that is based on a private key that is accessible to the first computing system

708
The authentication information does not include the private key

710
The private key was established by a second computer system that is different from the first computer system

712
The second computer system is also associated with the first user account

*FIG. 7*

(902)
At a first computing system that is in communication with a display generation component and one or more input devices:

(904)
Receiving, via the one or more input devices, a request to display a respective portion of an authentication credential user interface for authentication credential management software that includes options for managing one or more shared credentials that are shared between the user of the first computing system with one or more users

(906)
In response to the input corresponding to the request to display the respective portion of the authentication credential management user interface, displaying, via the display generation component, the respective portion of the authentication credential management user interface that includes one or more credential user interface elements corresponding to different authentication credentials associated with a first user of the first computing system, including, in accordance with a determination that a respective authentication credential that was previously shared with a group of users including the first user of the first computing system and one or more other users is no longer shared with the group of users including the first user of the first computing system and the one or more other users, displaying, via the display generation component, one or more user interface elements associated with retaining a copy of the respective authentication credential

(908)
While displaying the respective portion of the authentication credential management user interface, detecting an input directed to a respective user interface element of the one or more user interface elements associated with the respective authentication credential

(910)
In response to detecting the input directed to a respective user interface element, initiating a process for retaining a copy of the respective authentication credential in the authentication credential management software

*FIG. 9*

PASSKEY MANAGEMENT AND SHARING

CROSS REFERENCE TO RELATED APPLICATIONS

This non-provisional application claims the benefit under 35 U.S.C. § 119 (e) to U.S. Provisional Application No. 63/348,249, filed on Jun. 2, 2022, and 63/502,528, filed on May 16, 2023, all of which are hereby expressly incorporated by reference into the present application.

FIELD

The present disclosure relates generally to computer user interfaces, and more specifically to techniques for managing and sharing authentication information (e.g., passkeys verification codes, and/or passwords).

BACKGROUND

Multiple authentication credentials (e.g., passwords, verification codes, and passkeys) are becoming more available for accessing online services as the number of services providing online or remote access continues to increase security of remote access. Furthermore the complexity of the authentication credentials have also increased for security purposes making management of authentication credentials more time consuming for individuals. In addition, communal (e.g., within a family or other social group) access to on-line services is more prevalent making sharing and management of communal credentials more difficult and/or time consuming.

BRIEF SUMMARY

Some techniques for managing and sharing authentication information (e.g., passkeys, verification codes, and/or passwords) using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing and sharing authentication information (e.g., passkeys, verification codes, and/or passwords). Such methods and interfaces optionally complement or replace other methods for managing and sharing authentication information. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a first computing system that is in communication with a display generation component and one or more input devices, the first computing system being associated with a first user account of a first user, includes: receiving, via the one or more input devices, one or more inputs that corresponds to a request to access a remote service that requires authentication; and in response to receiving the one or more inputs that correspond to the request to access the remote service, providing authentication information to the remote service that is based on a private key that is accessible to the first computing system, where: the authentication information does not include the private key; the private key was established by a second computer system that is different from the first computer system; and the second computer system is also associated with the first user account.

In accordance with some embodiments, a method performed at a first computing system that is in communication with a display generation component and one or more input devices includes receiving, via the one or more input devices, one or more inputs that correspond to a first request to provide, to a remote service that requires authentication, an authentication credential that is shared with a second user, and in response to receiving the first request, providing a first authentication credential to the remote service without requiring the user to input the first authentication credential at the first computer system, wherein the first authentication credential was established by the first user. The method further includes, after providing the authentication credential to the remote service, receiving, via the one or more input devices, one or more inputs that correspond to a second request to provide, to the remote service that requires authentication, the authentication credential that is shared with a second user, and in response to receiving the second request, in accordance with the shared authentication credential having been updated based on input from the second user, providing a second authentication credential to the remote service without requiring the user to input the second authentication credential at the first computer system.

In accordance with some embodiments, a method performed at a first computing system that is in communication with a display generation component and one or more input devices includes receiving an input corresponding to a request to display a respective portion of an authentication credential management user interface for authentication credential management software that includes options for managing one or more shared credentials that are shared between the user of the first computing system with one or more other users, and in response to the input corresponding to the request to display the respective portion of the authentication credential management user interface, displaying, via the display generation component, the respective portion of the authentication credential management user interface that includes one or more credential user interface elements corresponding to different authentication credentials associated with a first user of the first computing system, including, in accordance with a determination that a respective authentication credential that was previously shared with a group of users including the first user of the first computing system and one or more other users is no longer shared with the group of users including the first user of the first computing system and the one or more other users, displaying, via the display generation component, one or more user interface elements associated with retaining a copy of the respective authentication credential. The method further includes, detecting, while displaying the respective portion of the authentication credential management user interface, an input directed to a respective user interface element of the one or more user interface elements associated with the respective authentication credential, and in response to detecting the input directed to a respective user interface element, initiating a process for retaining a copy of the respective authentication credential in the authentication credential management software.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing and sharing authentication information (e.g., passkeys, verification codes, and/or passwords), thereby increasing the effectiveness, efficiency, and user satisfaction with such devices. Such methods and interfaces may complement or replace other methods for managing and sharing authentication information (e.g., passkeys, verification codes, and/or passwords).

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 is a flow diagram of a process for managing and sharing authentication information in accordance with some embodiments.

FIG. 9 is a flow diagram of a process for managing and sharing authentication information in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing and sharing authentication information (e.g., passkeys verification codes, and/or passwords). For example, managing and sharing passkeys, generated with a private key associated with a first device, between devices associated with a user for the user to access remote services which require authentication. Such techniques can reduce the cognitive burden on a user who accesses remote services which require authentication from multiple device, thereby enhancing productivity. Further, such techniques can reduce processor and battery power otherwise wasted on redundant user inputs.

Figure 8:
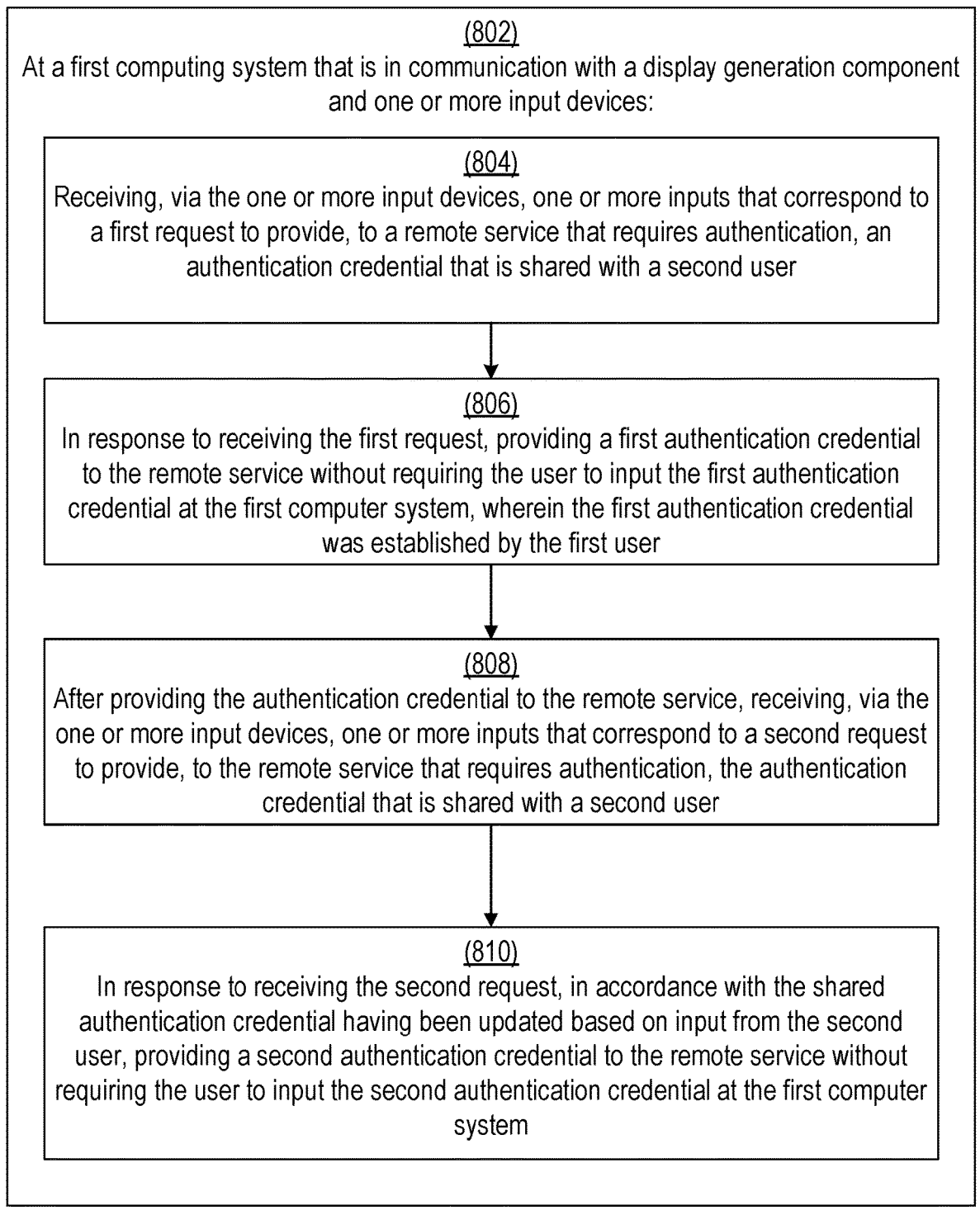
FIG. 8 is a flow diagram of a process for managing and sharing authentication information in accordance with some embodiments.

Below, FIGS. 1A-1B, 2, 3, 4A-4B, and 5A-5B provide a description of exemplary devices for performing the techniques for managing and sharing authentication information (e.g., passkeys verification codes, and/or passwords). FIGS. 6A-6AL illustrate exemplary user interfaces for managing and sharing authentication information. FIGS. 7 and 8 are a flow diagrams illustrating methods of managing and sharing authentication information among multiple devices and users in accordance with some embodiments. The user interfaces in FIGS. 6A-6AL are used to illustrate the processes described below, including the processes in FIGS. 7 and 8.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
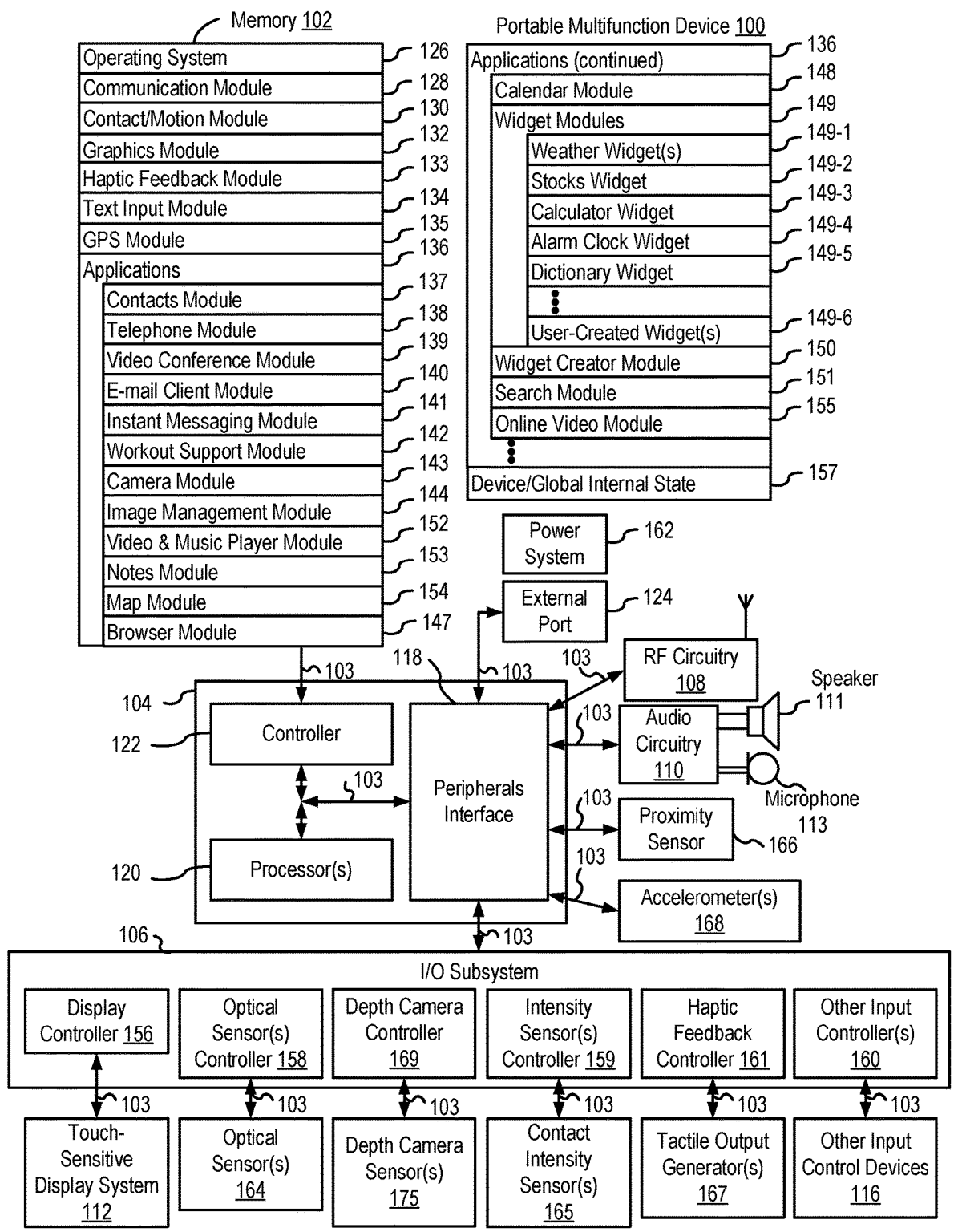
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6)

U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
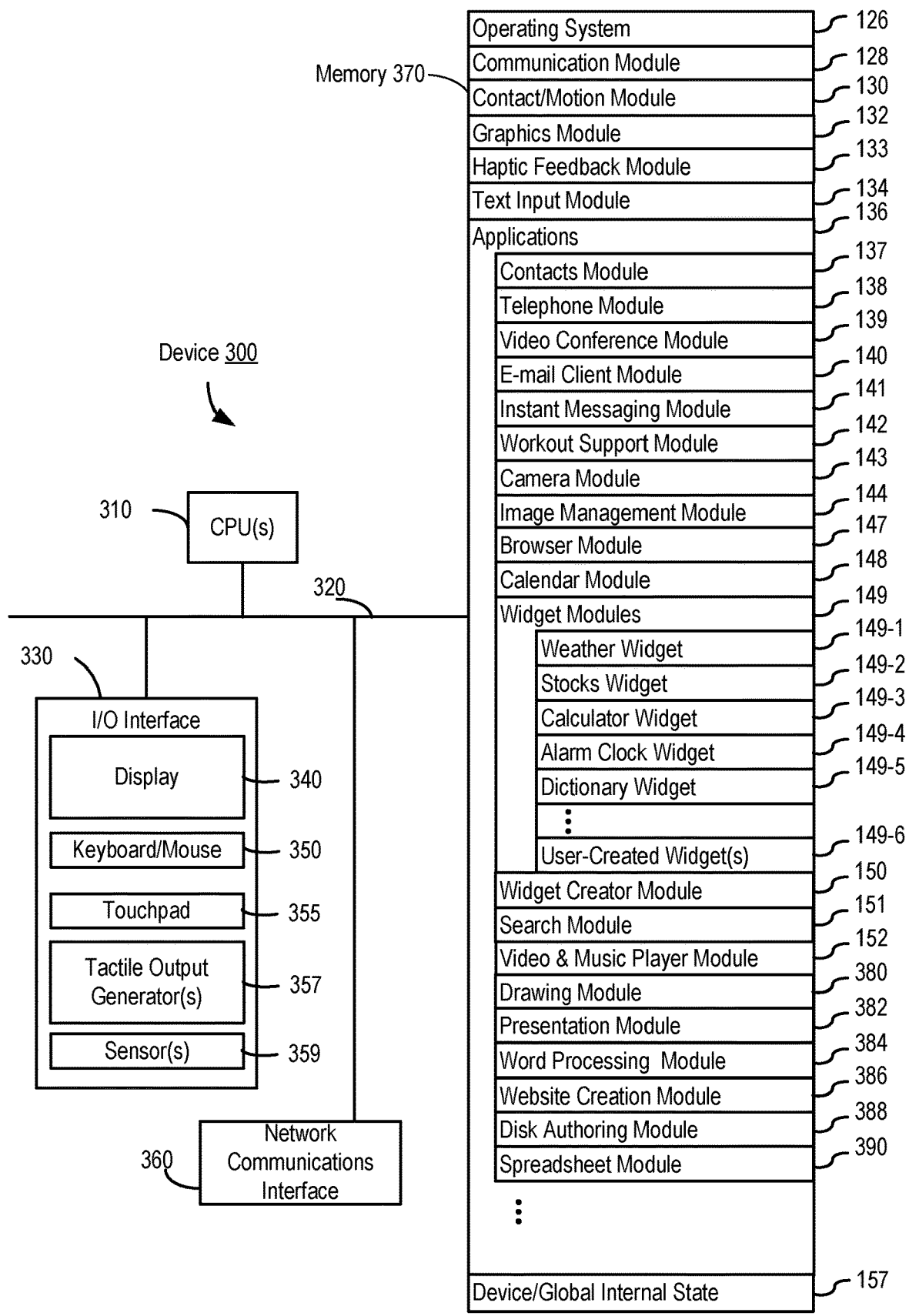
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
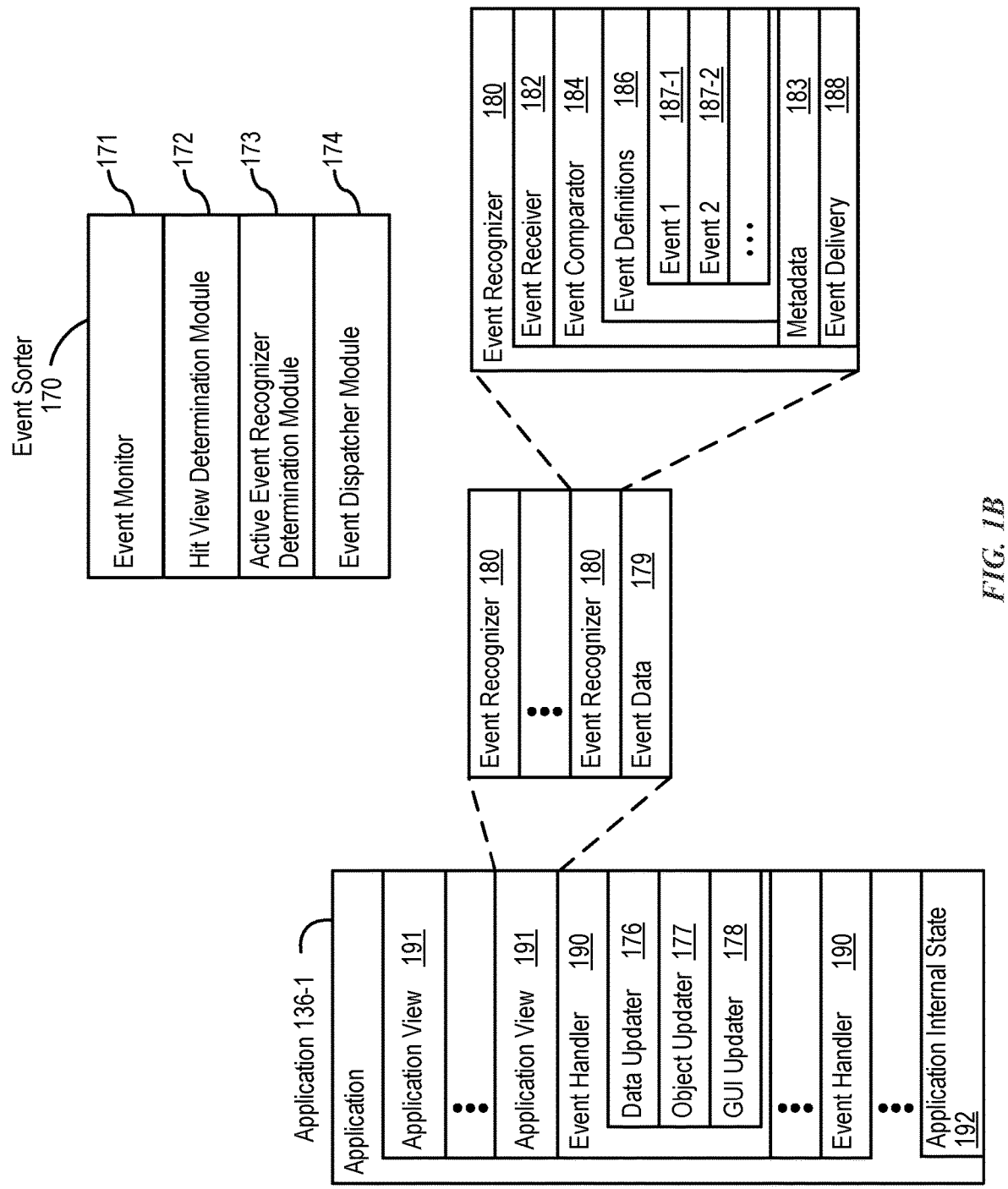
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
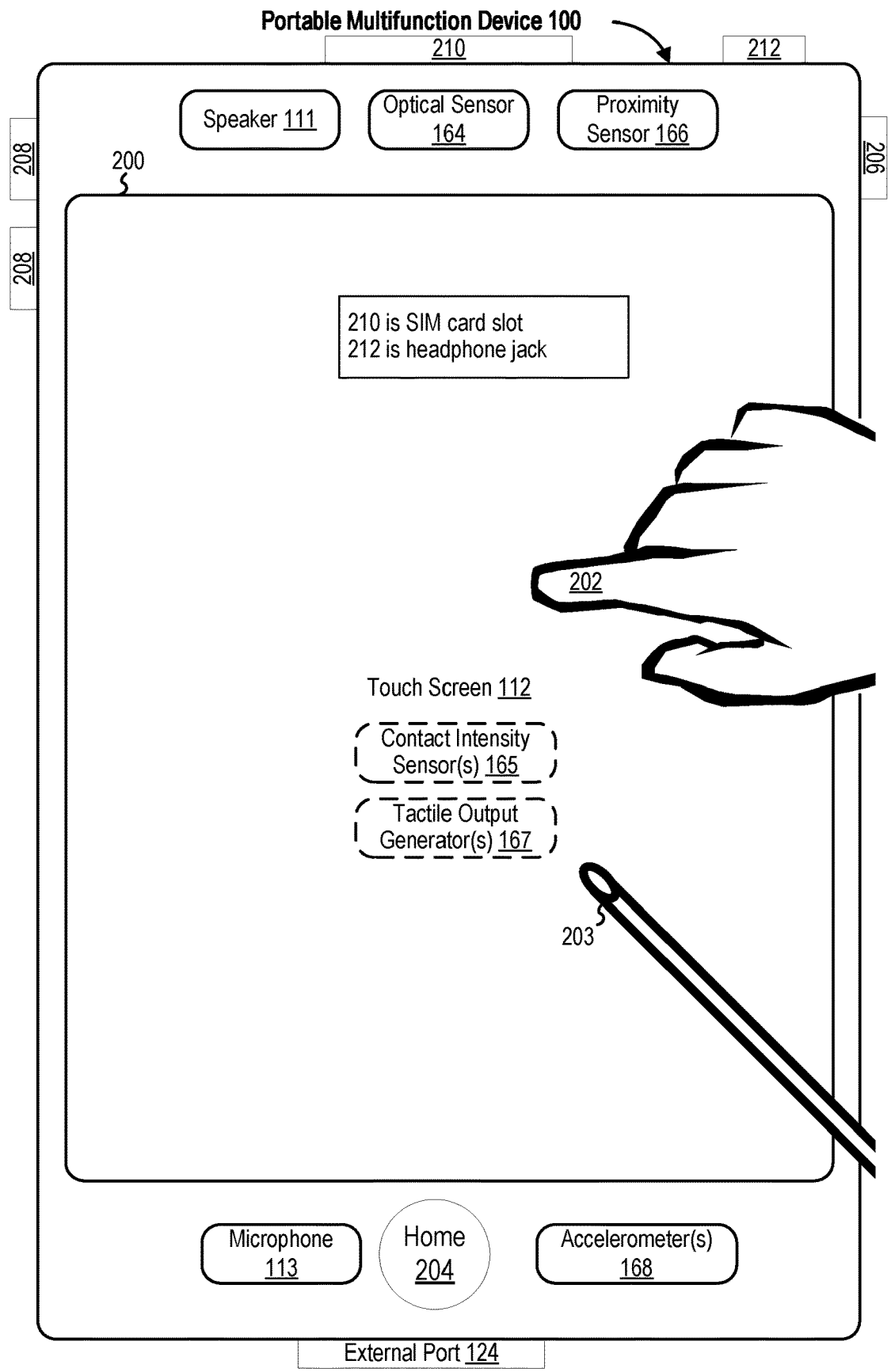
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
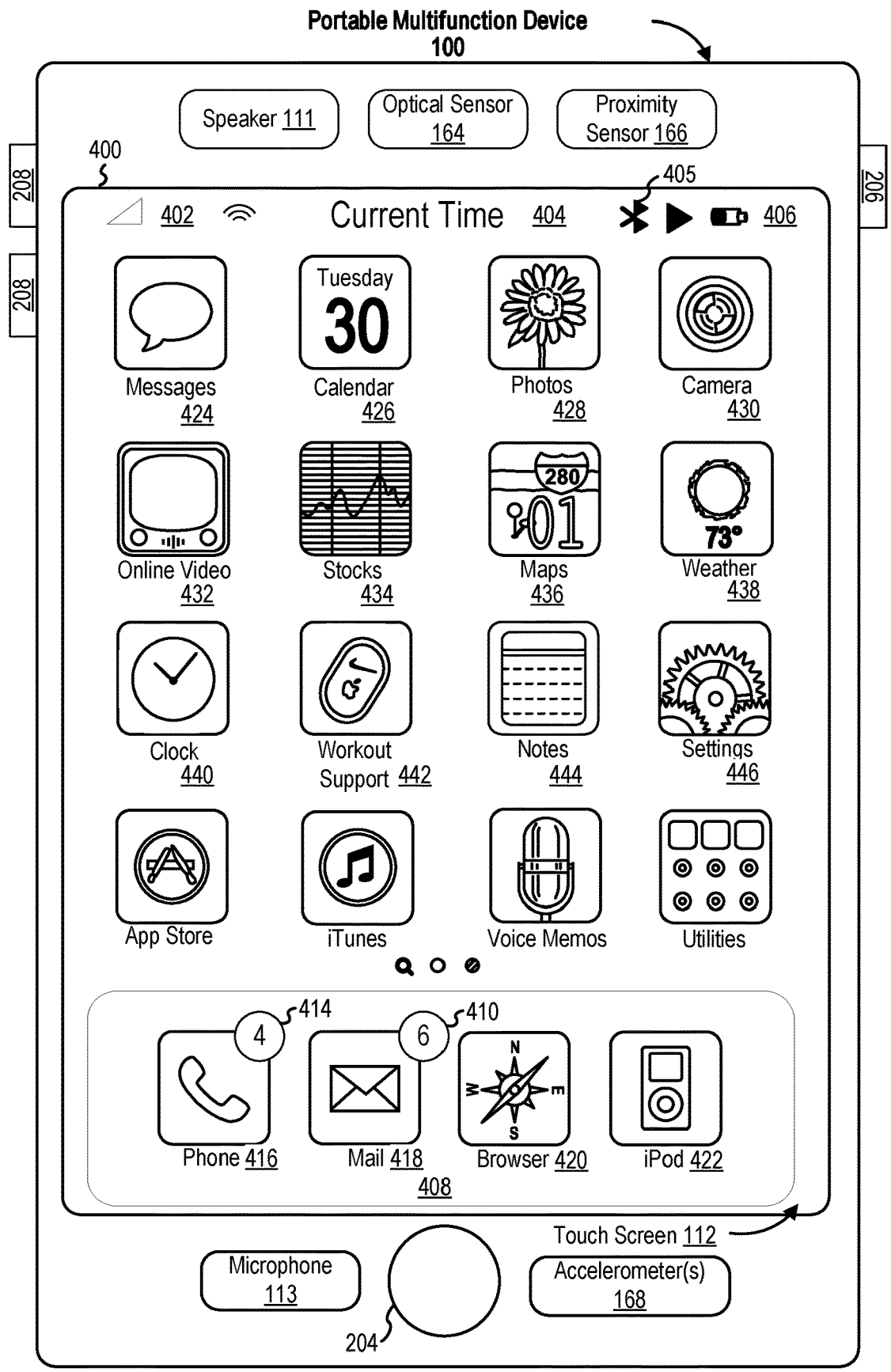
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
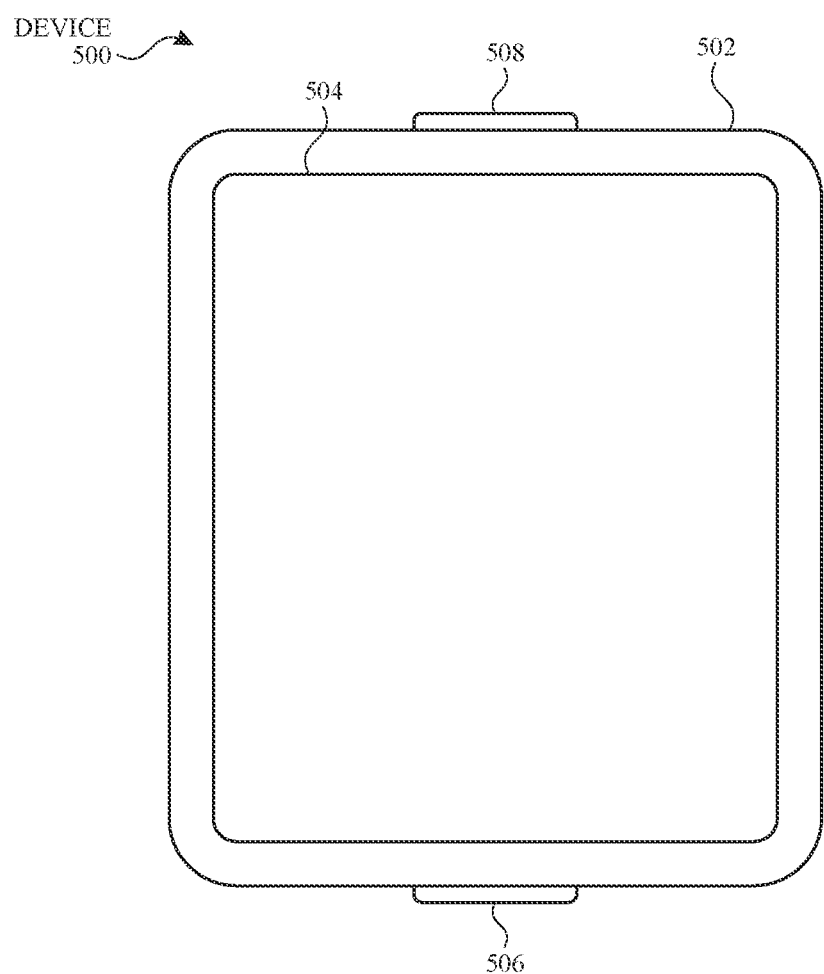
FIG. 5A illustrates a personal electronic device in accordance with some embodiments.
Figure 6A:
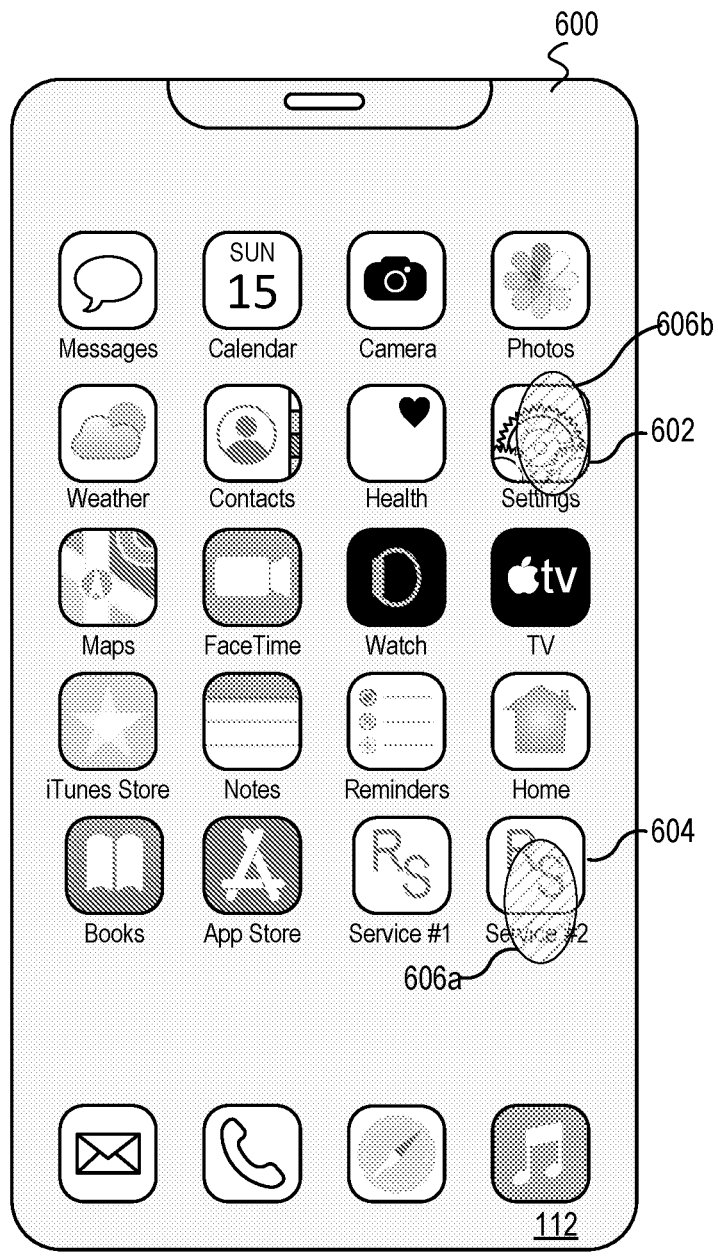
FIGS. 6A-6AP illustrate example user interfaces for managing and sharing authentication information in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
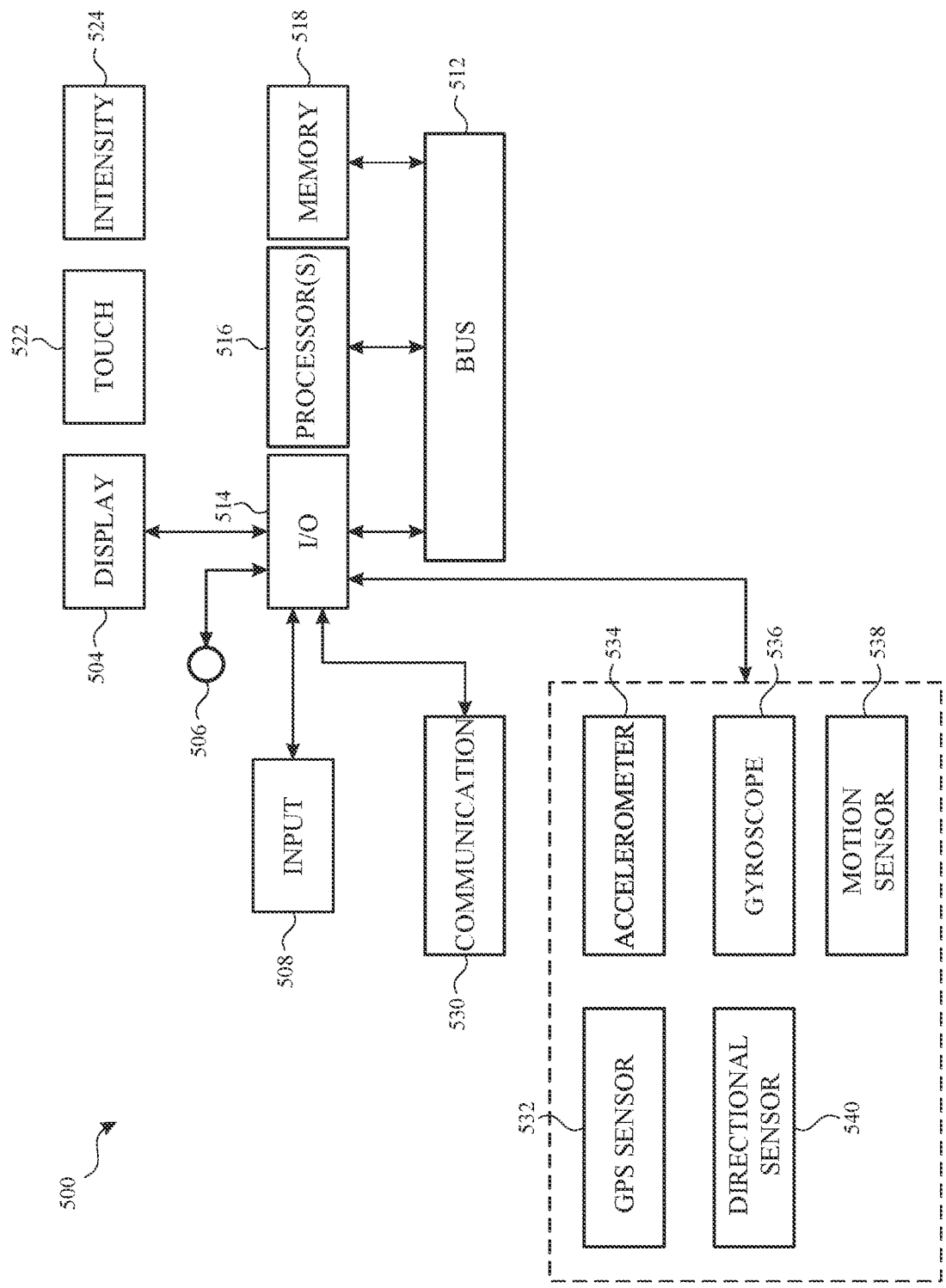
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on a computing system, such as portable multifunction device 100, device 300, or device 500, in communication with a display generation component and one or more input devices.

FIGS. 6A-6AP illustrate exemplary user interfaces for managing and sharing authentication information (e.g., passkeys, verification codes, and/or passwords), in accordance with some embodiments. The user interfaces in these figures are used to illustrate the processes described below, including the processes in FIGS. 7-9. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while display the user interfaces shown in the figures on the display 450, along with a focus selector.

FIG. 6A illustrates an exemplary user interface (e.g., home screen) 600 for a menu of applications displayed on touch screen 112 of device 100. In some embodiments, the application user interface 600 includes a plurality of user interface elements for respective applications installed on the device 100. Exemplary applications include settings 602 for accessing and/or managing various parameters associated with different functionality (e.g., password management interface 620*a* in FIG. 6D in response to one or more inputs 606*b*), accessible to the user; and one or more remote services 604 (e.g., media streaming services, banking services, remote messaging services, and/or other remote service that require authentication).

Figure 6C:
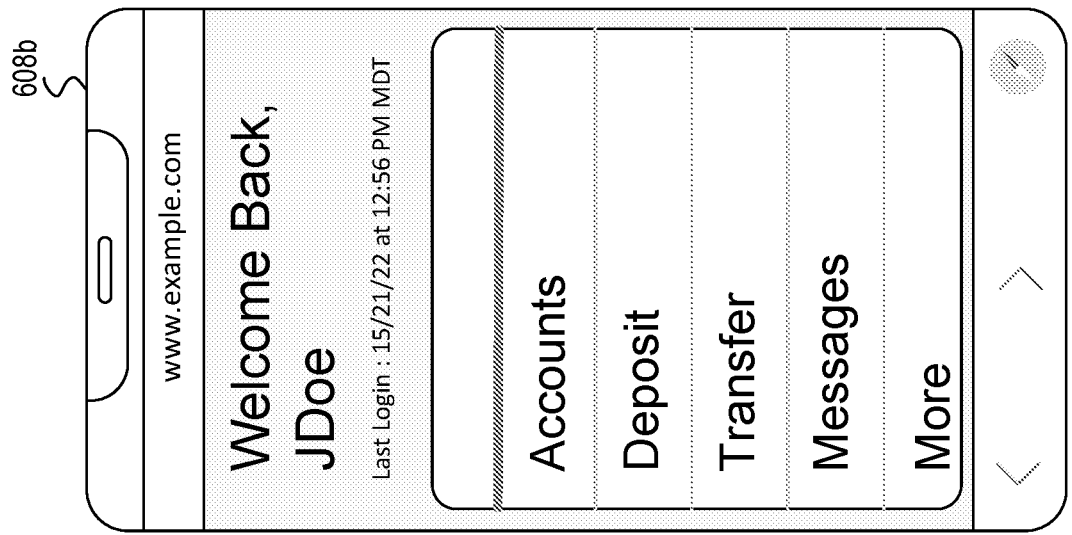
Figure 6B:
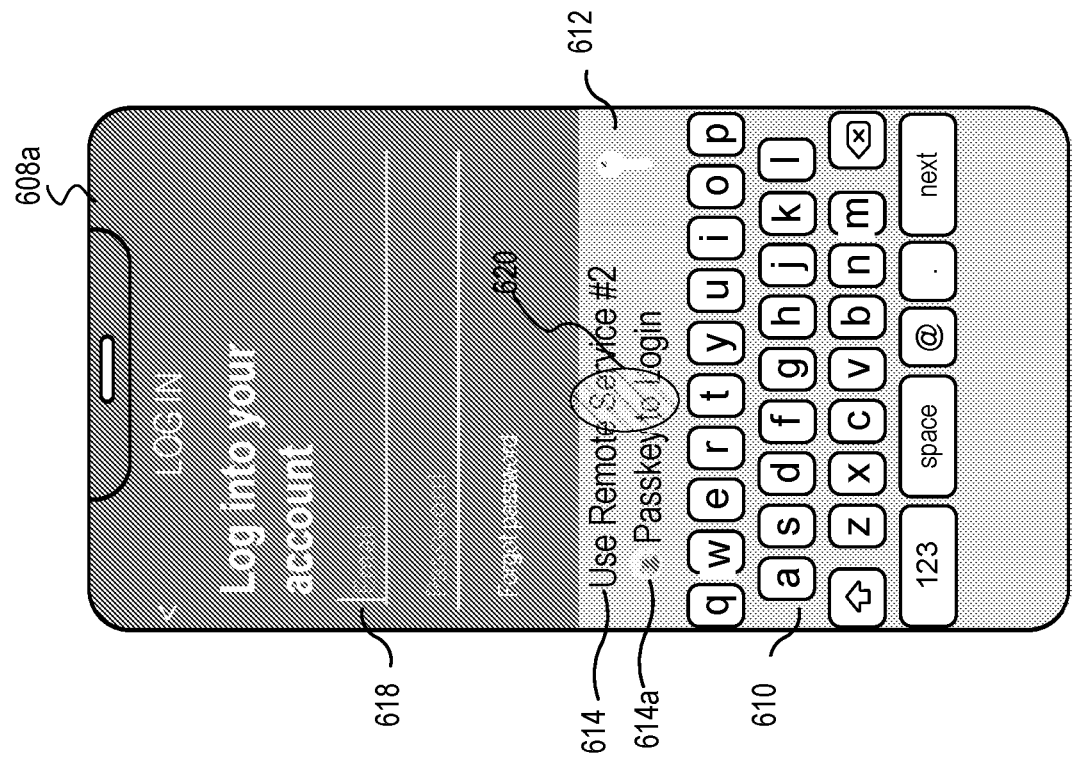

FIG. 6B illustrates a transition of home screen 600 from FIG. 6A upon detection of an input (e.g., contact 606*a* on touch screen 112) directed a remote service 604. In FIG. 6B authentication interface 608*a* for remote service #2 (e.g., a remote banking service) is displayed along with input keyboard interface 610. Input keyboard interface 610, in addition, to a query keyboard, includes a password affordance 612 and passkey affordance 614. Passkey affordance 614 may further include a badge 614*a* indicating that the associated passkey or password is being shared with one or more groups of users. Selection of password affordance 612 allows selection of an authentication password from one or more accessible (e.g., stored at or stored in secure cloud storage associated with) to device 100. Selection of passkey affordance 614 provides authentication information to the remote service that is based on a private key that is accessible to (e.g., stored at or stored in secure cloud storage associated with) the device 100 without requiring entry of the account information (e.g., email and password).

FIG. 6C illustrates the transition of the authentication interface 608*a* for remote service #2 upon detection of input 620 directed to passkey affordance 614. In response to selection of the passkey affordance an associated passkey is provided to the remote service without requiring the user to input additional credential information (e.g., user name/email or password) and the user directed to a landing page of the remote service as shown in FIG. 6C. In FIG. 6C an exemplary application interface 608*b* for remote service #2 is displayed. In FIG. 6C remote service #2 is illustrated as a remote banking application for ease of explanation only and may be any remote service which requires authentication.

Figure 6D:
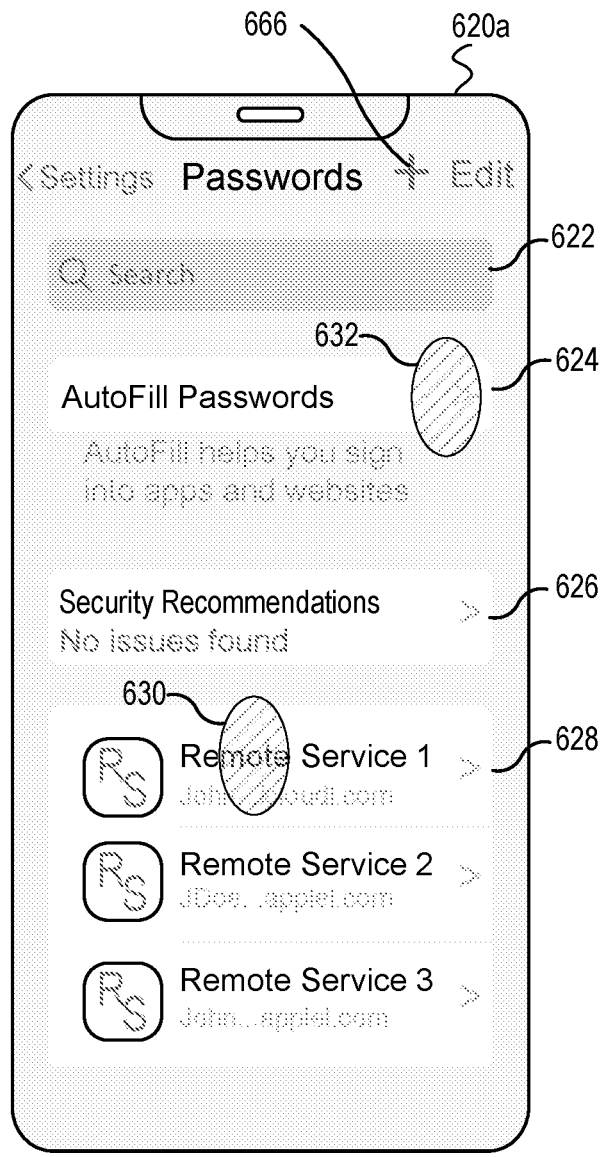

FIG. 6D illustrates a password management user interface 620*a* for managing authentication information associated with (e.g., saved in association with a credential synchronization service) a user and thus accessible to (e.g., stored at or stored in secure cloud storage associated with) the computing systems associated with the user. The password management user interface 620*a* is accessible via one more inputs, including input 606*b* in FIG. 6A directed to settings application 602. The password management user interface 620*a* includes a search affordance 622 for searching for a particular remote service for which authentication information has been saved in response to a selection input; a credential synchronization service affordance 624 for selecting a synchronization service for auto-filling authentication information into remote service applications and/or websites in response to a selection input; a security recommendation affordance 626 providing information regarding security risks associated with a remote service for which authentication information has been saved in response to a selection input; and a respective authentication affordance 628 for each remote service for which authentication information has been saved.

Figure 6E:
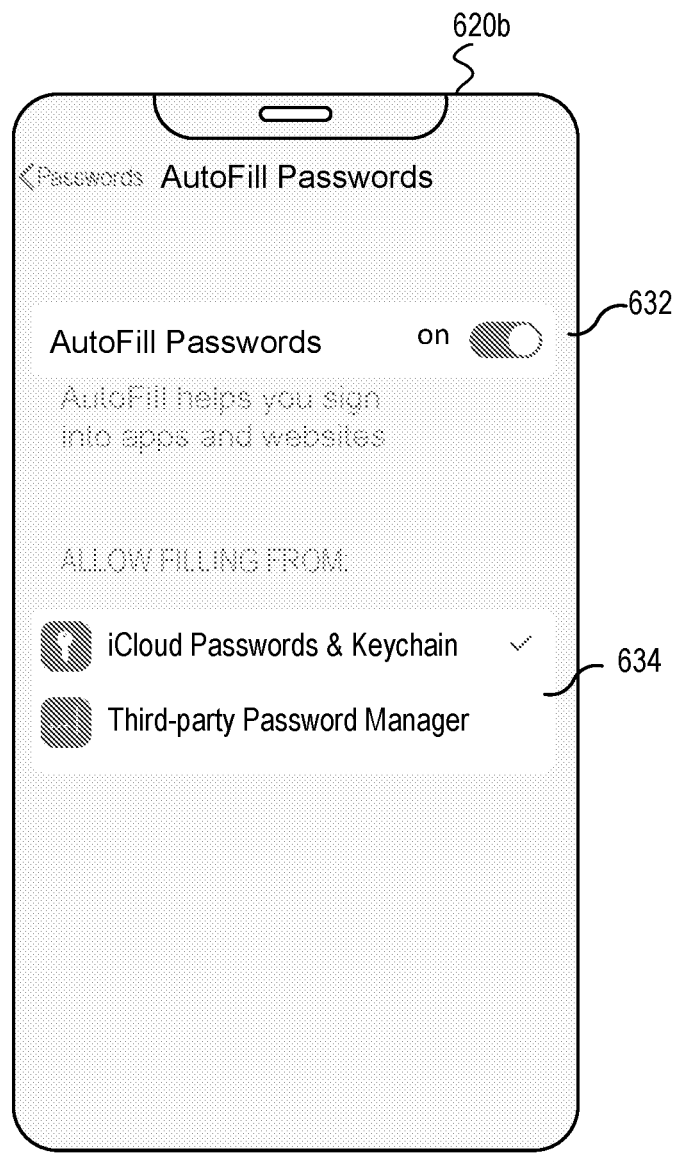

FIG. 6E illustrates a supplementary user interface 620*b* displayed upon detection of an input 632 in FIG. 6D directed to credential synchronization service affordance 624 while displaying password management user interface 620*a*. The supplementary user interface 620*b* includes a selection element (e.g., toggle 632) for turning on and off authentication information auto fill and one or more selection elements 634 for identifying a credential synchronization service for providing authentication information in response to a selection input.

Figure 6F:
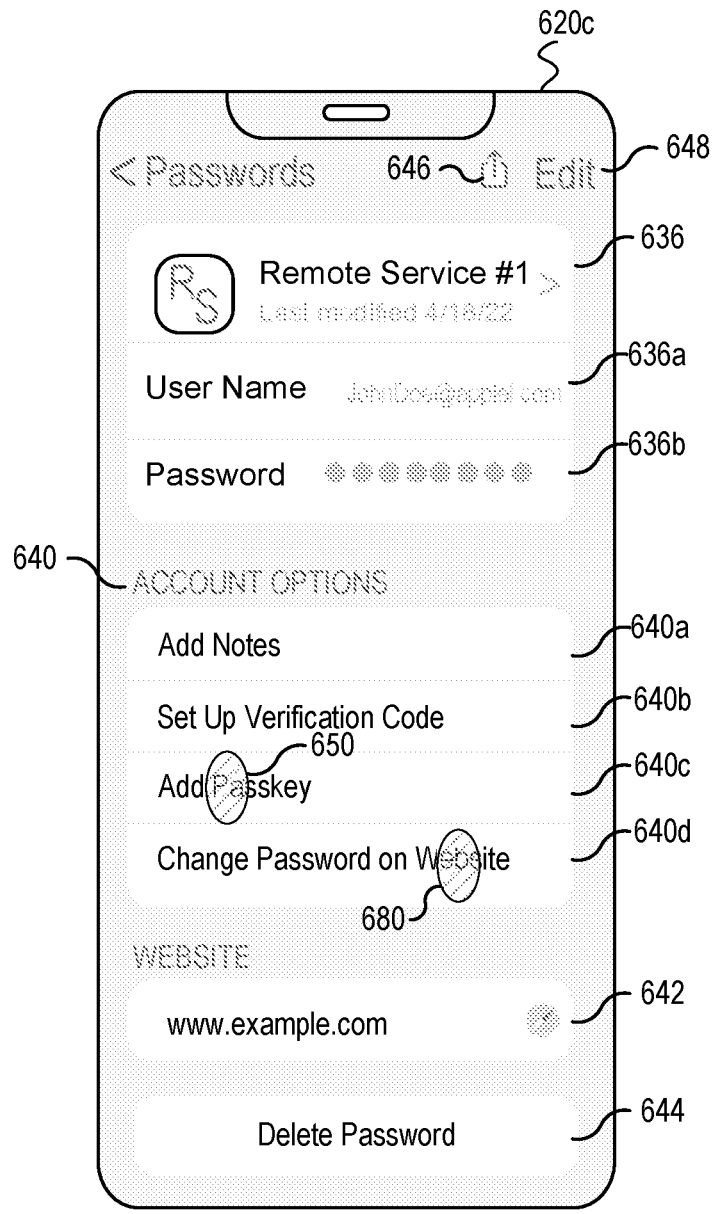

FIG. 6F illustrates a credential user interface 620*c* displayed upon detection of input 630 in FIG. 6D directed to a respective remote service affordance 628 while displaying password management user interface 620*a*. The credential user interface 620*c* includes identification of the respective remote service 636 along with associated authentication information 636*a* and 636*b*; indication of one or more account options 640 accessible in response to a selection input; and remote service website affordance 642 that in response to a selection input redirects the user to the remote service website. The credential user interface 602*c* further includes a delete password affordance 644 that in response to a selection input deletes a password associated with the remote service, and edit affordance 648 that in response to a selection input allows information association with the remote service to be changed and/or added. The account options affordance 640 includes an add notes affordance 640*a* that in response to selection causes the device to initiate a process for accepting and storing user created text (e.g., 656 in FIG. 6H); and change password on website affordance 640*d* that in response to a selection input 680 causes the device to initiate a process that navigates to a portion of the remote service website for changing the associated password (e.g., 608*s* in FIG. 6G). In some embodiments, the account options change in accordance with the type of authentication information currently associated with the remote service. For example, if the authentication credential is a password, the account options affordance 640 further includes a set up verification code affordance 640*b* that in response to a selection input causes the device to initiate a process for adding a verification code; and an add passkey affordance 650 that in response to selection input 650 causes the device to initiate a process that navigates to a portion of the remote service website for adding and/or changing a passkey. In some embodiment, the add passkey option may be altered to change passkey if a passkey has been associated with the remote service or remove password if both a passkey and password have been associated with the remote service.

Figure 6G:
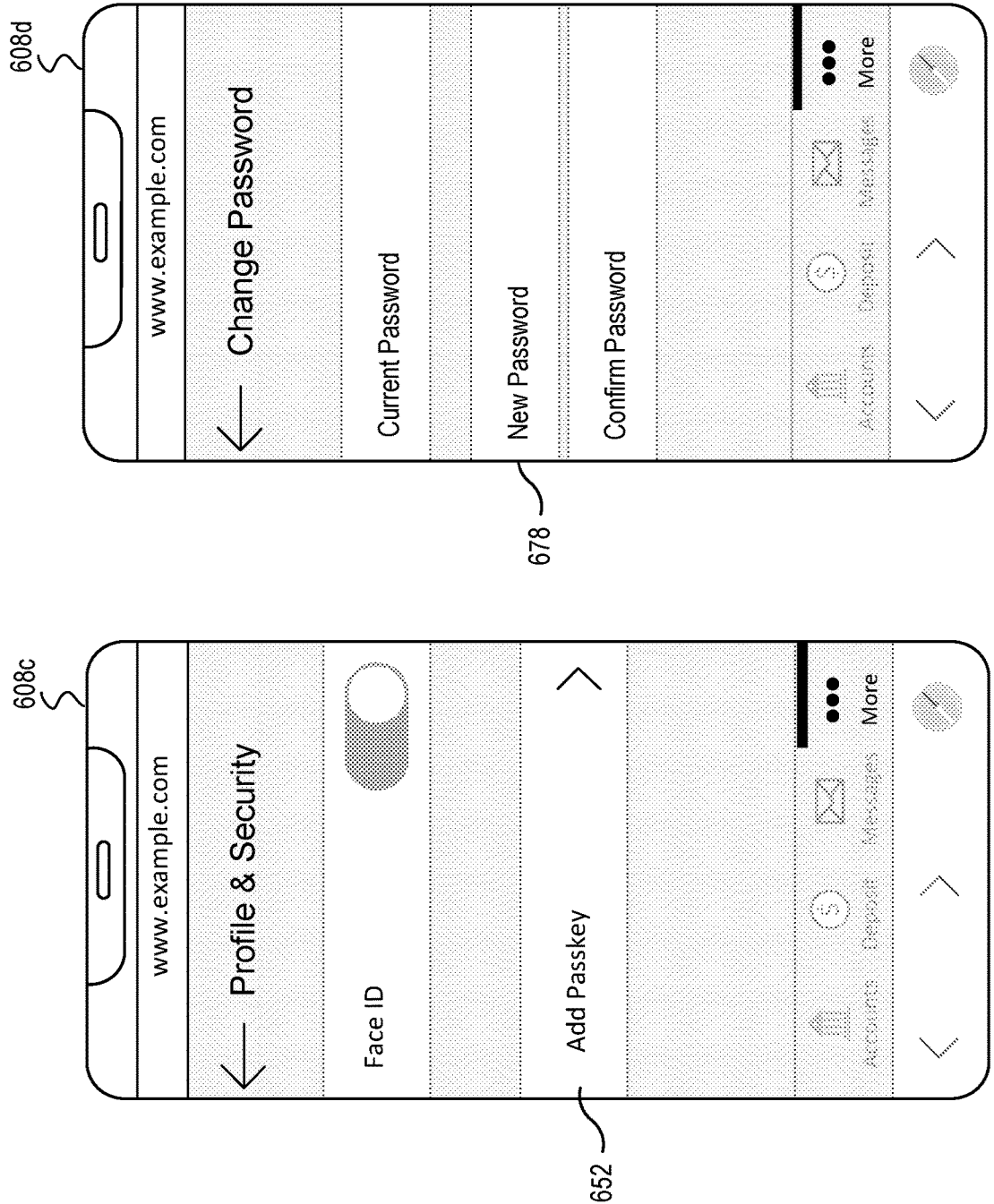

FIG. 6G illustrates transition from supplementary user interface 620*c* in FIG. 6F to a portion of the remote service web site for adding and/or changing a passkey upon detection of input 650 in FIG. 6F directed to the add passkey affordance 640*c* in FIG. 6F. In FIG. 6G the website interface 608*c* for remote service #2 allows the user to initiate and/or perform a process 652 for adding a passkey for use an authentication method when accessing the respective remote service. FIG. 6G further illustrates an exemplary portion of the remote service website 608*d* for changing a password to which a user is redirect upon detection of input 680 in FIG. 6F directed to the change password on website affordance 640*d* in FIG. 6F.

Figure 6H:
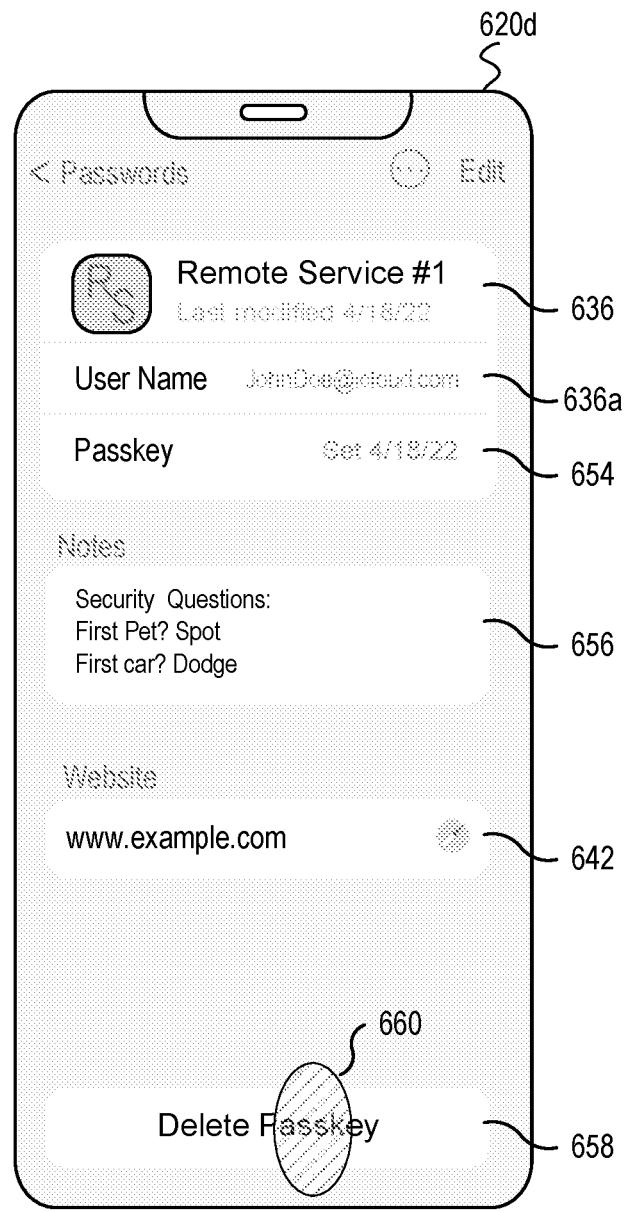

FIG. 6H illustrates an exemplary supplemental user interface 620*d* displayed upon detection of an input 630 in FIG. 6D directed to a respective remote service affordance 628 while displaying password management user interface 620*a* after addition of a passkey described above with respect to FIGS. 6F-6G. In supplemental user interface 620*d* the password credential 636*b* in FIG. 6F is transitioned to passkey affordance 654 and the delete password affordance 644 is transitioned to delete passkey affordance 658. In some embodiments, the account options 640 are removed, and notes affordance 656 including user defined text added in response a previous selection that caused the device to initiate a process for accepting and storing the user defined text.

Figure 6I:
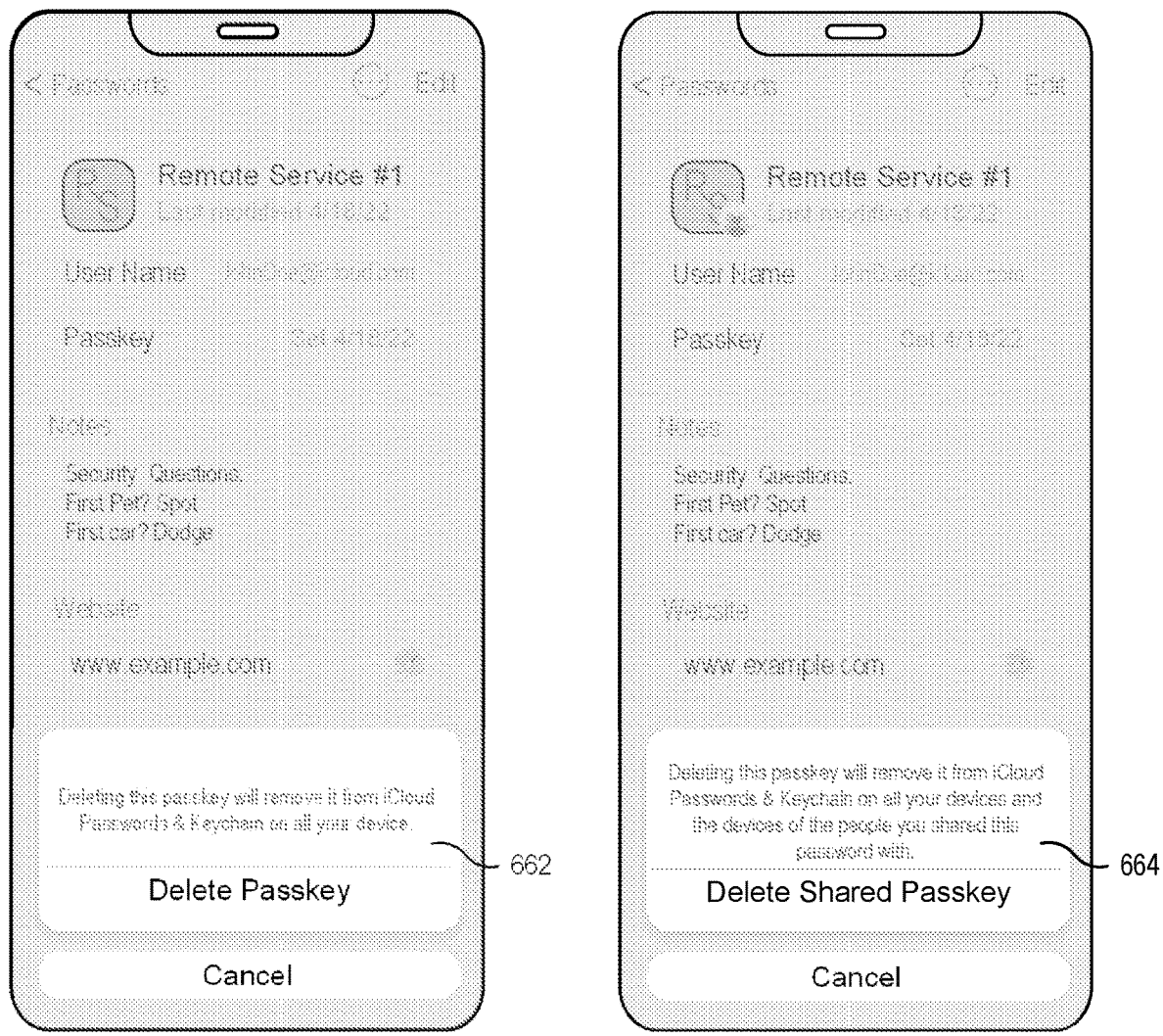

FIG. 6I illustrates exemplary message 662 displayed upon detection of an input 660 in FIG. 6H directed to delete passkey affordance 658 in FIG. 6H. Message 662 corresponds to the message displayed when the passkey selected for deletion is not currently shared with another user. FIG. 6I further illustrates an exemplary message 664 displayed when a passkey selected for deletion is currently shared with one or more other users.

Figure 6J:
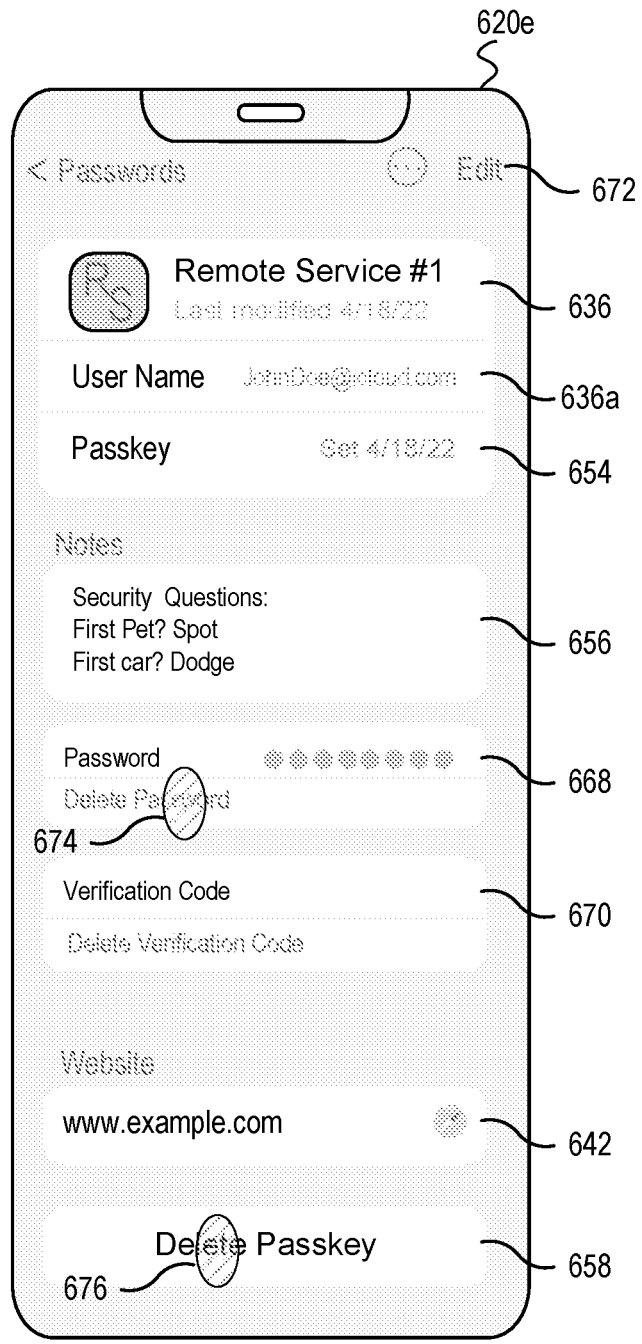

FIG. 6J illustrates an exemplary supplemental user interface 620*e* displayed upon detection of an input 630 in FIG. 6D directed to a respective remote service affordance 628 while displaying password management user interface 620*a* when the multiple credential types have been associated with the respective remote service. Supplemental user interface 620*e* includes: identification of the respective remote service 636 including authentication information 636*a* and 654; notes affordance 656; credential affordances 668 and 670 corresponding to a respective different type of authentication credential associated with the remote service; remote service website affordance 642 that that in response to selection causes the device to initiate a process that navigates to the remote service website; delete passkey affordance 658, and edit affordance 672. Credential affordances 668 and 670 both include selectable elements for deleting the respective credential.

Figure 6K:
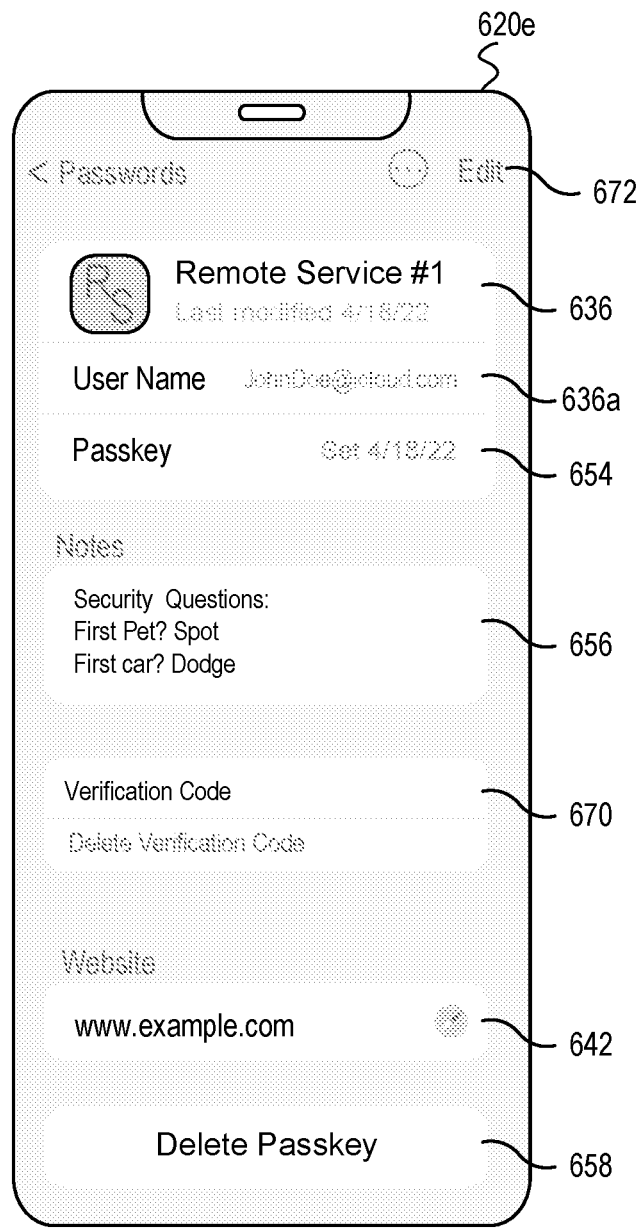

FIG. 6K illustrates transition of supplemental user interface 620*e* in FIG. 6J after deletion of the password credential 668 with respect to remote service 636 initiated by detection of input 674 in FIG. 6J corresponding to the delete password element. In FIG. 6K the credential affordance 668 corresponding to the password has been removed.

Figure 6L:
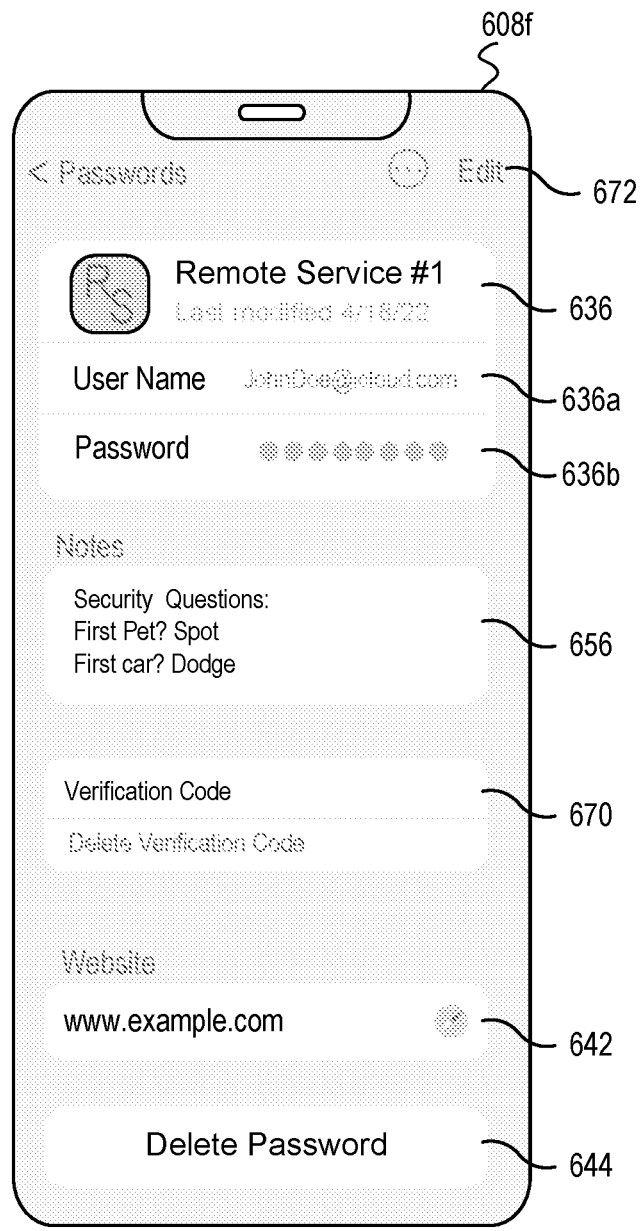

FIG. 6L illustrates transition of supplemental user interface 620*e* in FIG. 6J after removal of the passkey credential type with respect to a respective remote service (e.g., initiated by detection of input 676 in FIG. 6J). Specifically, authentication information 654 is transitioned from passkey 654 to password credential 636*b* and the delete passkey affordance 658 is transitioned to delete password affordance 644.

Figure 6M:
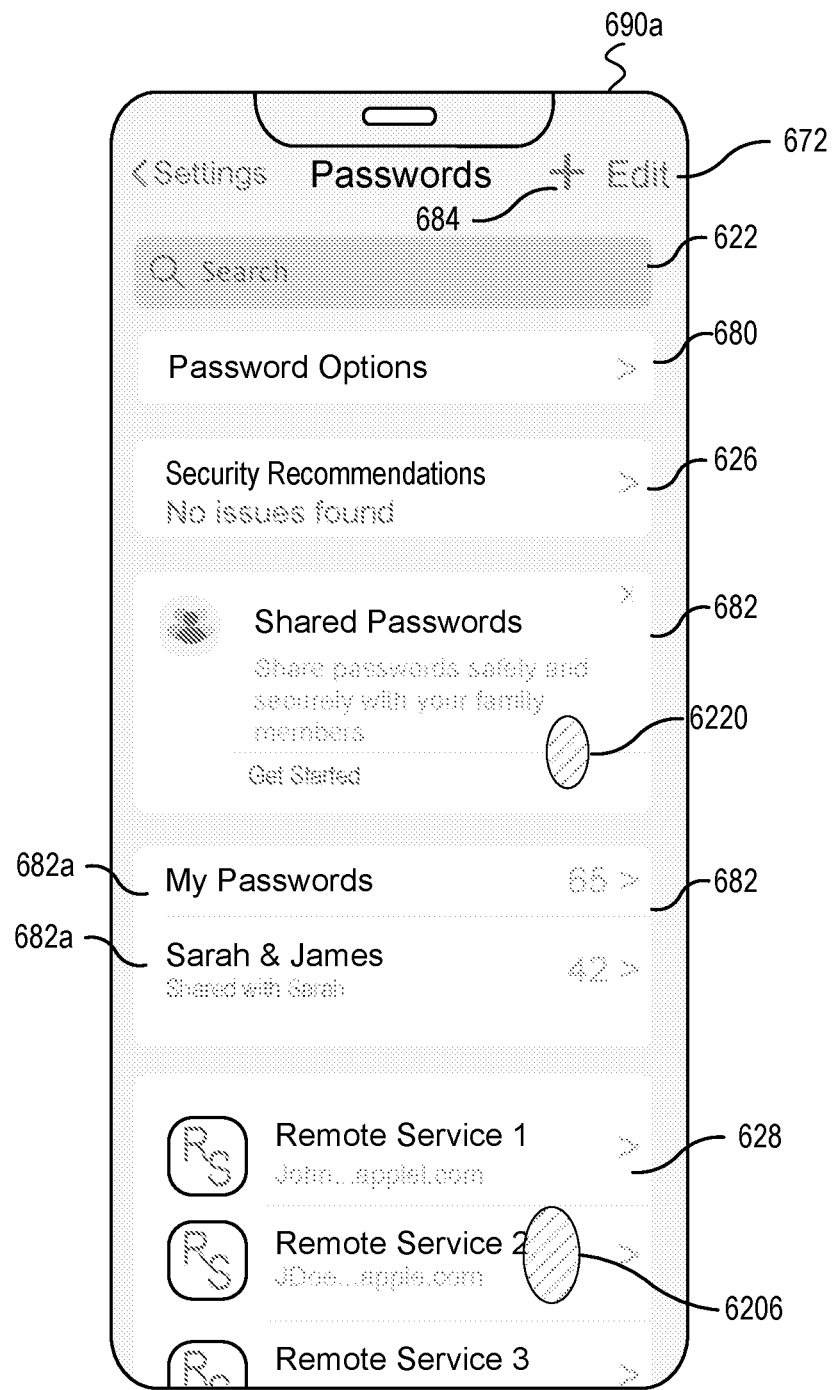
Figure 6N:
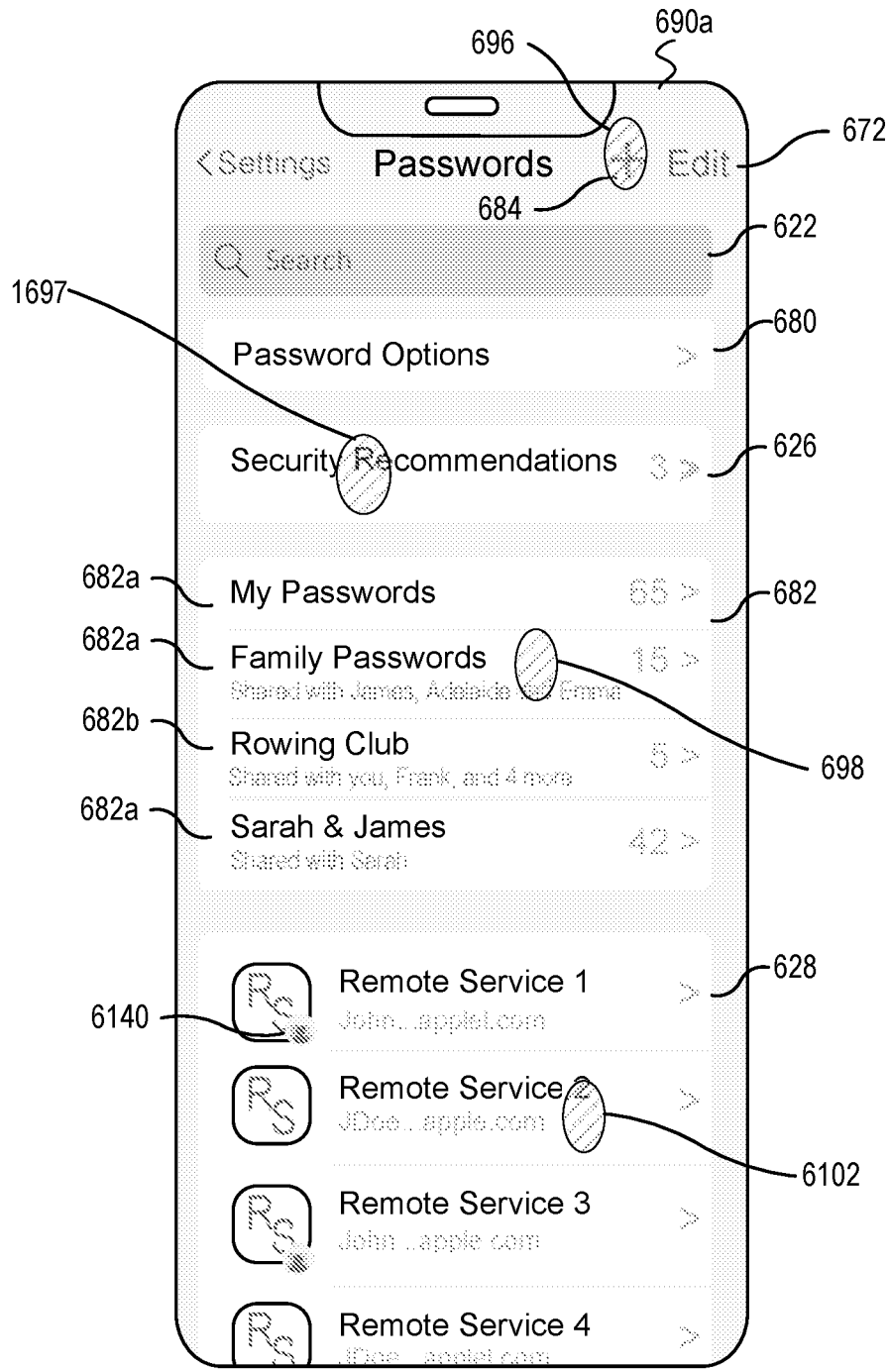
Figure 6O:
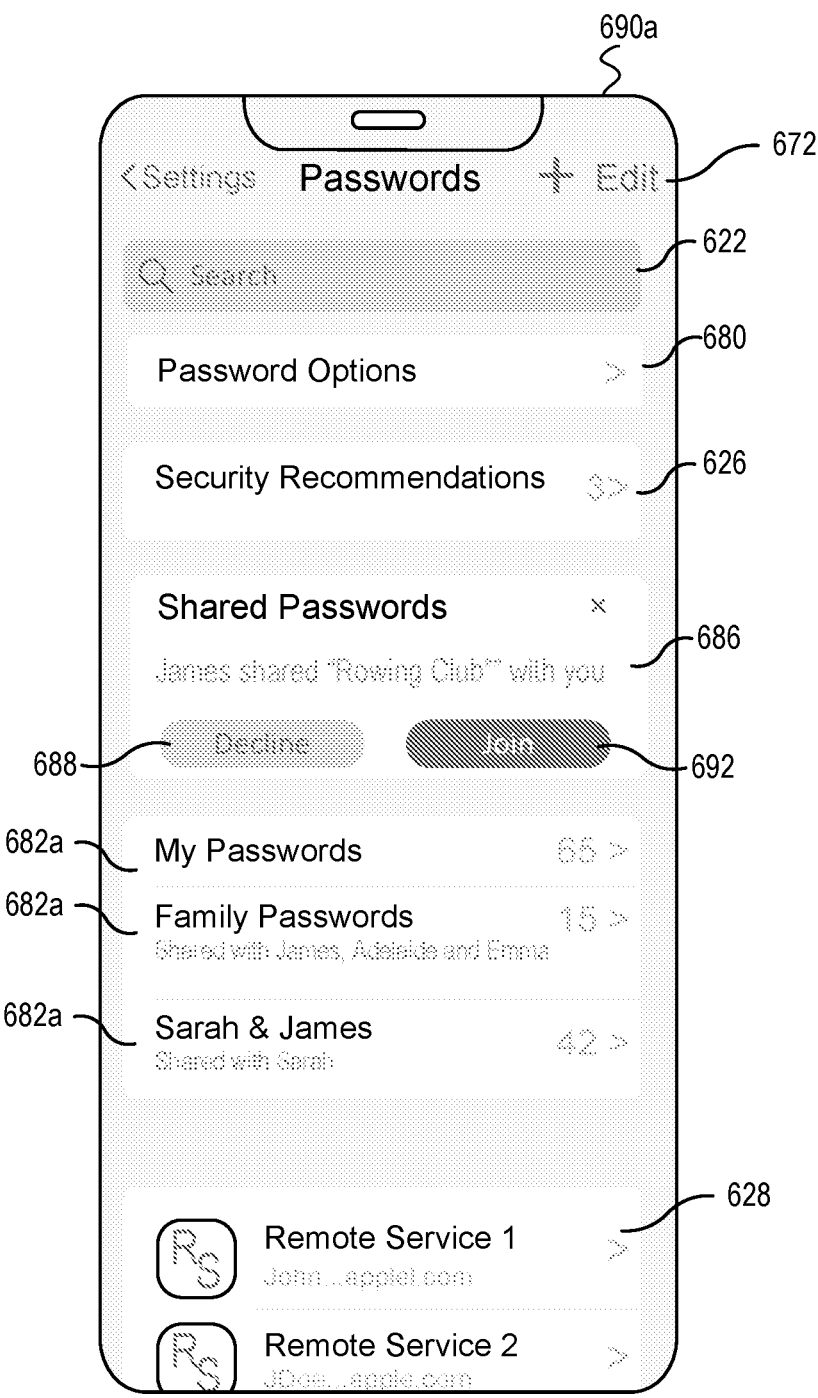

FIG. 6M illustrates a password management user interface 690*a* for managing and sharing authentication information associated with (e.g., saved in association with a credential synchronization service) a user and thus accessible to (e.g., stored at or stored in secure cloud storage associated with) the computing systems associated with the user. The password management user interface 690*a* includes a search affordance 622 that, in response to a selection input, causes the device to initiate a search for a particular remote service 628 for which authentication information has been saved; a credential synchronization service affordance 680 that, in response to a selection input, causes the device to initiate a process for selecting a synchronization service for auto-filling authentication information into remote service applications and/or websites; a security recommendation affordance 626 that provides information regarding security risks associated with remote services for which authentication information has been saved; and respective authentication affordances 628 for a plurality of different remote services for which authentication information has been saved. The security recommendation affordance 626 may indicate no issues found as in FIG. 6M or may indicate an indicator 626*a* that one or more issues exist as illustrated in FIGS. 6N and 6O. Password management user interface 690*a* further includes an add affordance 684 that, in response to a selection input, causes the device to initiate a process for creating a new shared group or new credential, and an edit affordance 672. In addition, in some embodiments password management user interface 690*a* further includes a shared passwords recommendation affordance 682 recommending a suggested user group (e.g., family member) with which to share authentication information (e.g., passwords, verification codes, or passkeys) accessible to the device 100.

FIG. 6N illustrates a transition of password management user interface 690*a* from FIG. 6M in accordance with one or more credentials accessible to device 100 being shared with a suggest group (e.g., family members) or the recommendation affordance 682 being dismissed. Specifically, the shared passwords recommendation affordance 682 is removed and group affordance 682 includes a respective group affordance 682*a* for a plurality of groups of users for which one or more credentials is being shared. In addition, the password management user interface 690*a*, in accordance with acceptance of an invitation to join a shared group, further includes group affordance 682*b* for a plurality of different joined groups.

FIG. 6O illustrates password management user interface 690*a* from FIG. 6N prior to accepting an invitation to join the "Rowing Club" shared group. In accordance with the user associated with device 100 having received an invitation to join a shared credential group from another user, password management user interface is modified to include a shared password invitation affordance 686 identifying the shared group to which the user is invited and the user extending the invitation. The shared password invitation affordance 686 further includes a decline affordance 688 that, in response to a selection input, causes the device to initiate a process that declines the invitation and join affordance 692 that, in response to a selection input, causes the device to initiate a process that accepts the invitation.

Figure 6P:
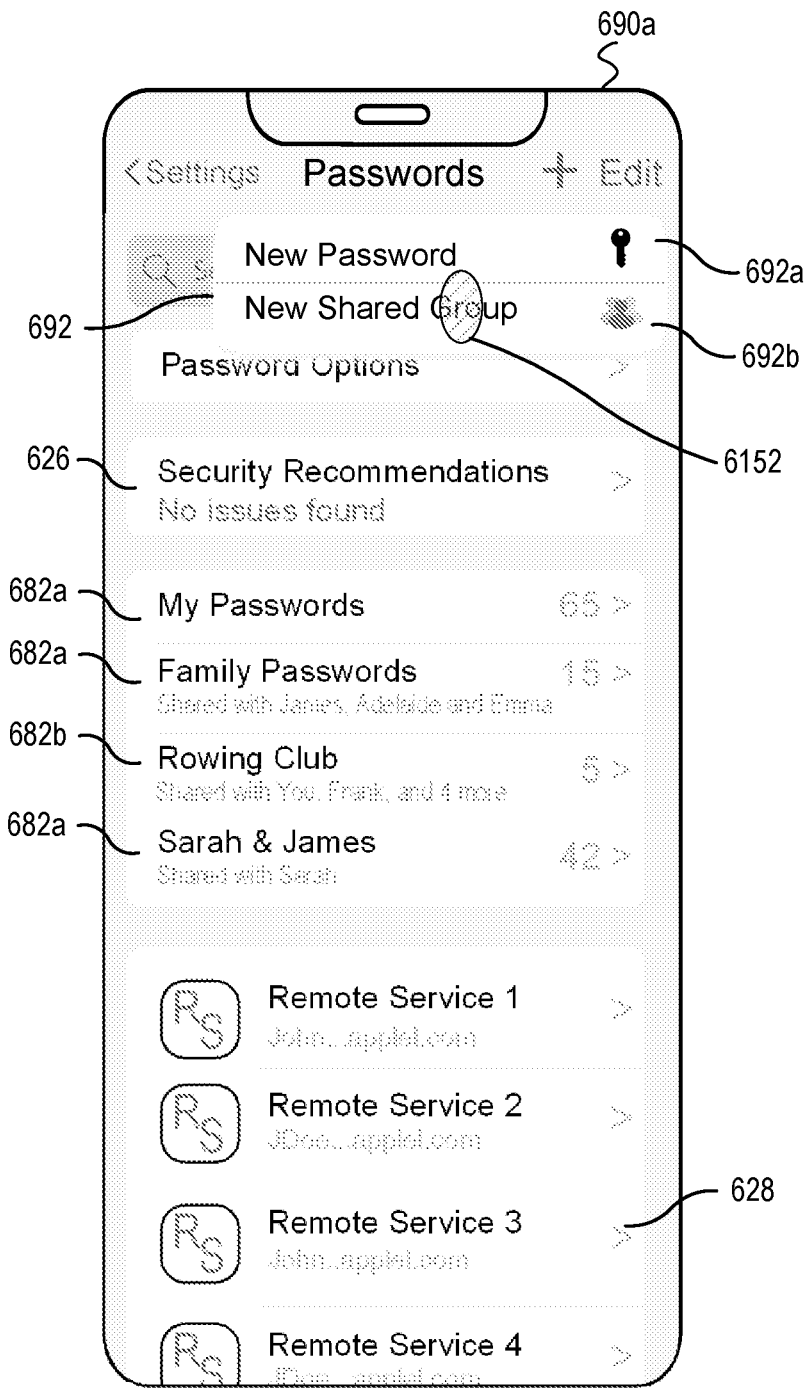

FIG. 6P illustrates an exemplary supplemental affordance 692 displayed upon detection of an input 696 in FIG. 6N directed to add affordance 684 while displaying password management user interface 690*a*. Supplemental user interface 692 includes new password affordance 692*a* that, in response to a selection input, causes the device to initiate a process for adding a saved credential and new shared group 692*b* that, in response to a selection input, causes the device to initiate a process for creating a new sharing group in response to a selection input (e.g., input 6152).

Figure 6Q:
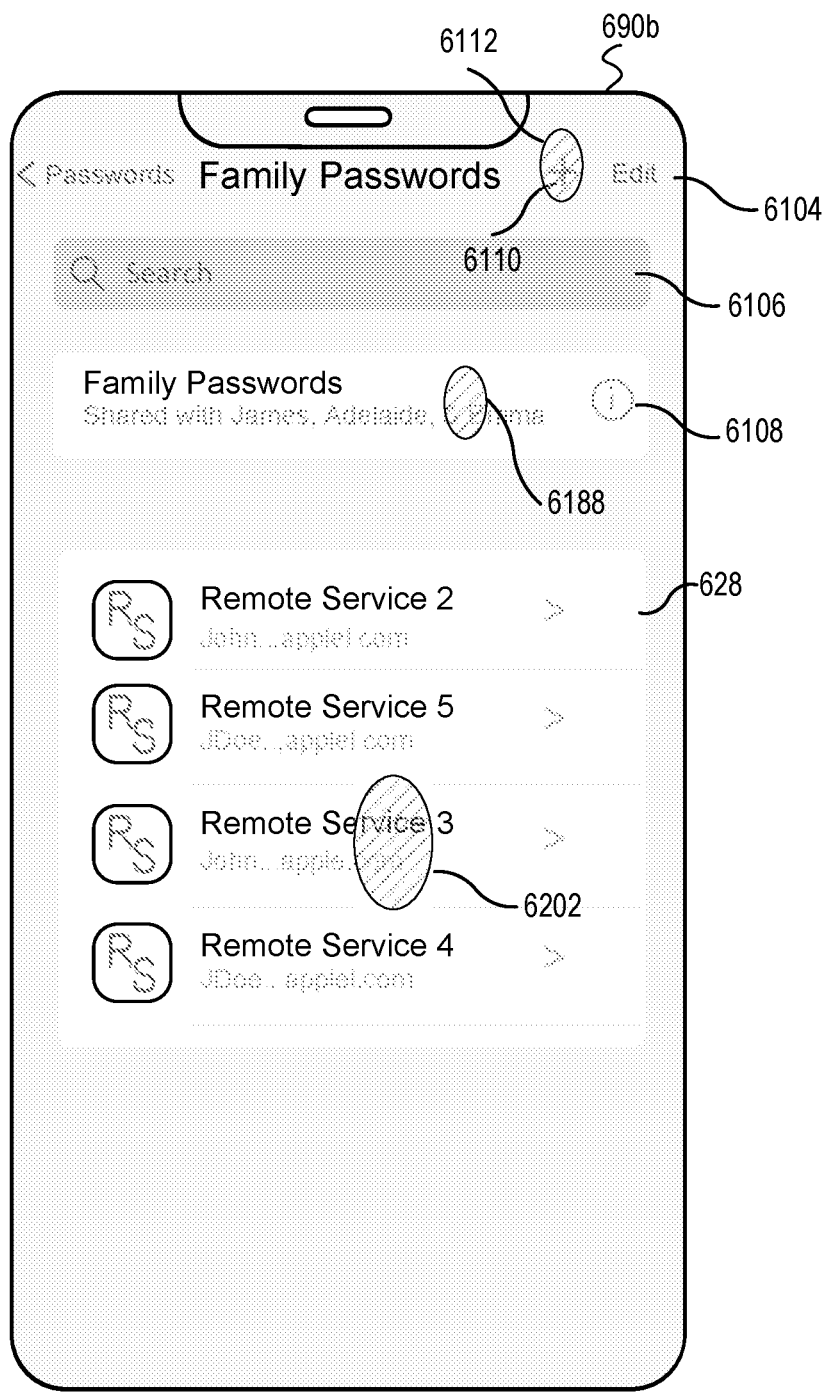

FIG. 6Q illustrates an exemplary shared group interface 690*b* displayed upon detection of an input 698 in FIG. 6N directed to a respective shared group 682*a* while displaying password management user interface 690*a*. Shared group interface 690*b* includes respective credential affordances 628 for a plurality of different affordances being shared with the family passwords group, group identification affordance 6108, search affordance 6106, edit affordance 6104, and add affordance 6110. Selection of the add affordance (e.g., input contact 6112 in FIG. 6Q) displays supplemental affordance 6114 illustrated in FIG. 6R. Supplemental affordance 6114 includes new password affordance 6116 and add existing password affordance 6118.

Figure 6R:
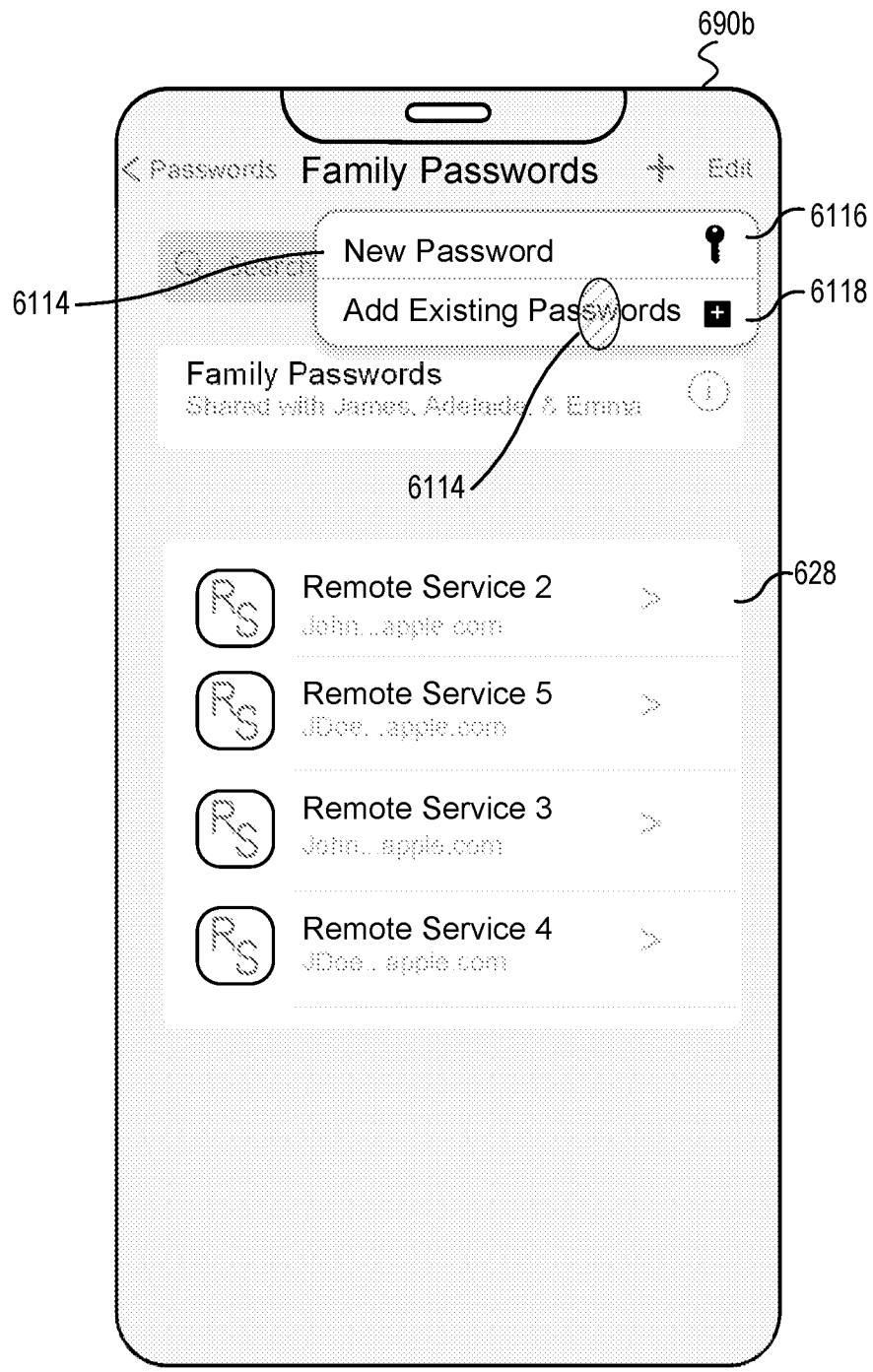
Figure 6S:
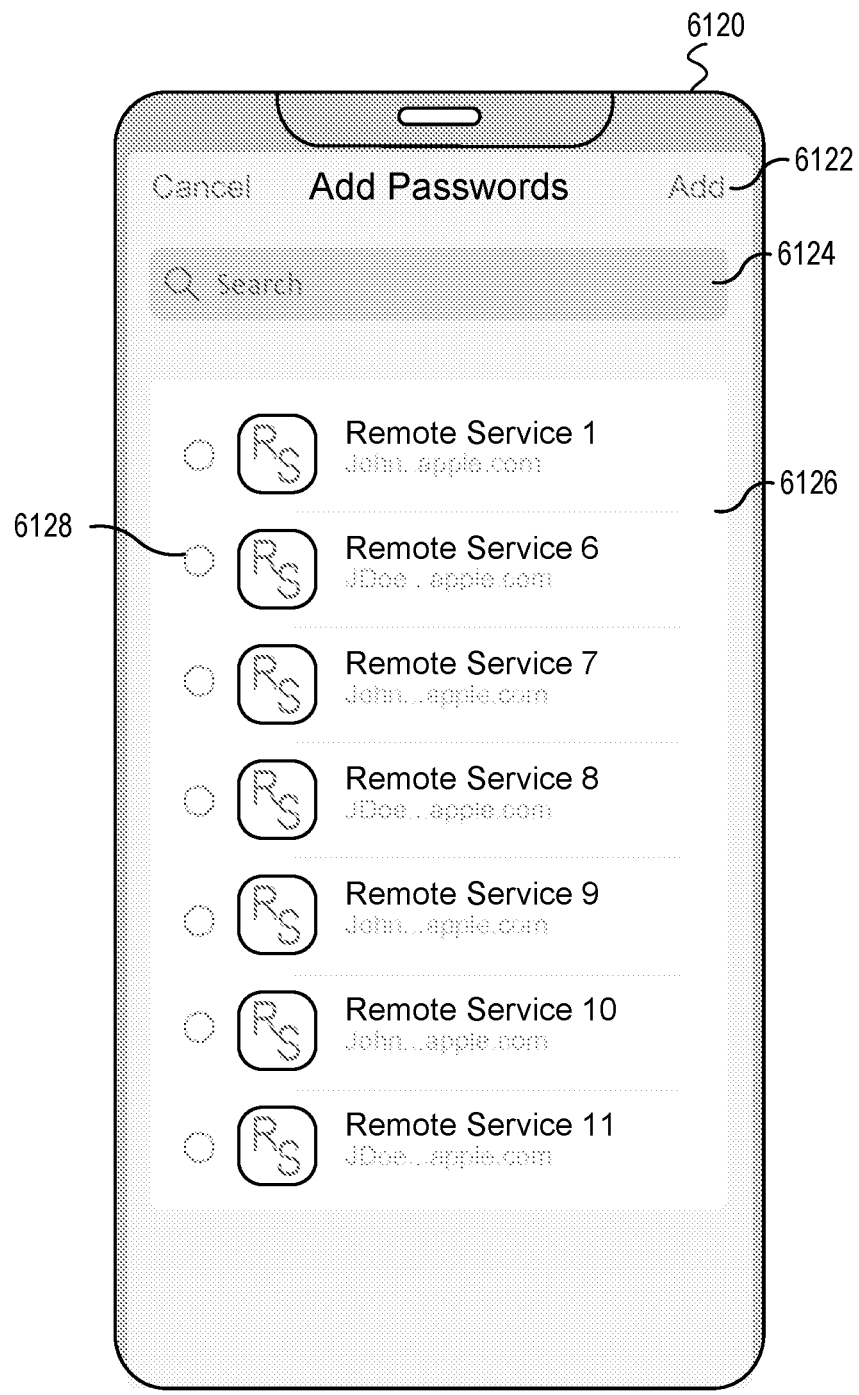
Figure 6T:
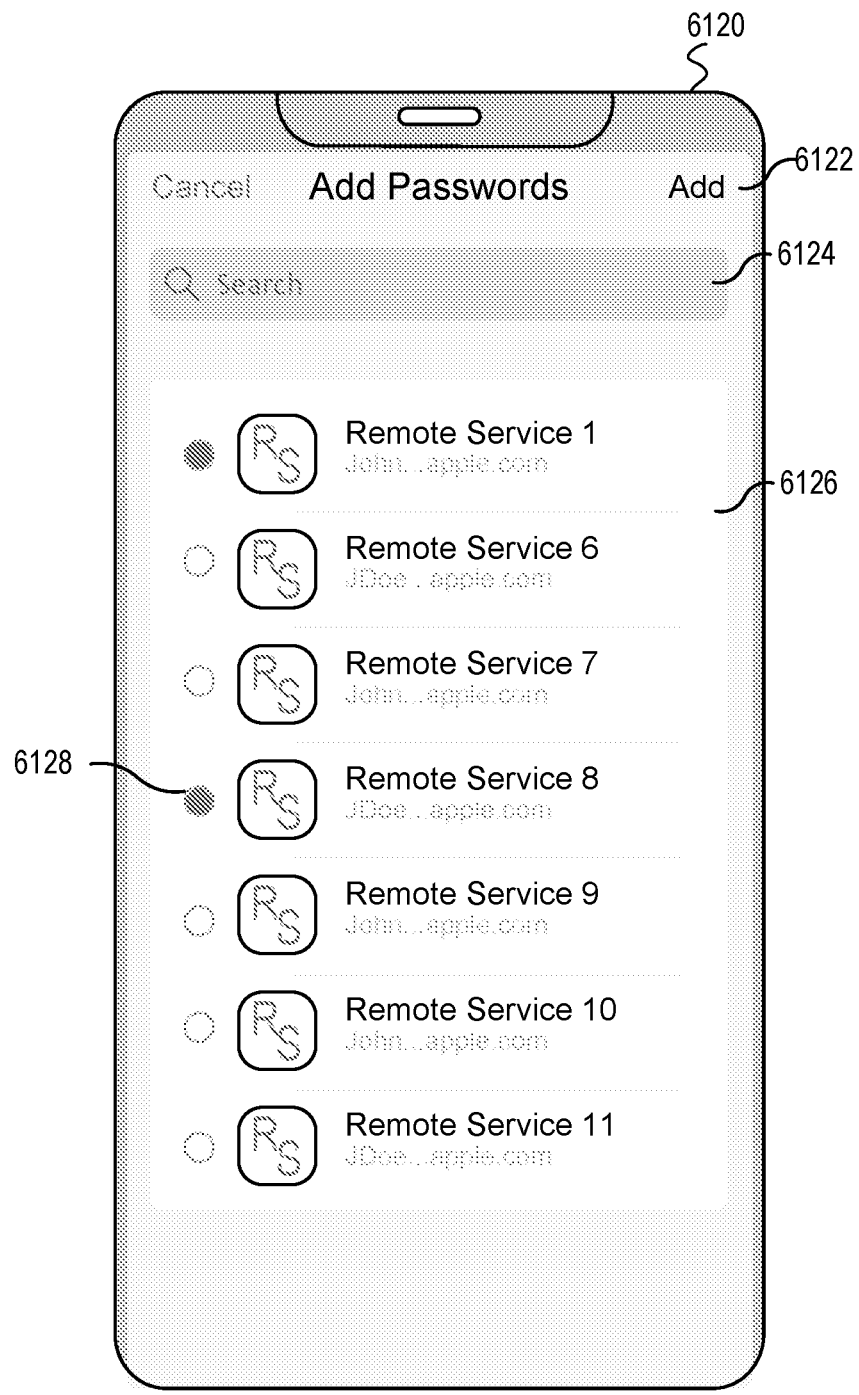

FIG. 6S illustrates an exemplary supplemental affordance 6120 displayed upon detection of an input 6114 in FIG. 6R directed to add existing password 6118 in FIG. 6R. Supplemental affordance 6120 includes add affordance 6122 that, in response to a selection input, causes the device to initiate a process for adding selected credentials to the shared group, search affordance 6124 that, in response to a selection input, causes the device to initiate a process for searching for specific credential accessible to the device 100, and existing credential listing 6126 identifying credentials accessible to the device 100 which are not currently being shared with the respective group. The existing credential listing 6126 includes respective selection elements 6128 for a plurality of different credentials listed in the credential listing 6126. FIG. 6T illustrates the transition of supplemental affordance 6120 upon detection of selection of one or more of the selection elements 6128. As illustrated in FIG. 6T, the add affordance 6122 is transitioned to a more prominent color and the respective selection elements 6128 corresponding to a selected credential are transitioned to a darker color to indicate selection.

Figure 6U:
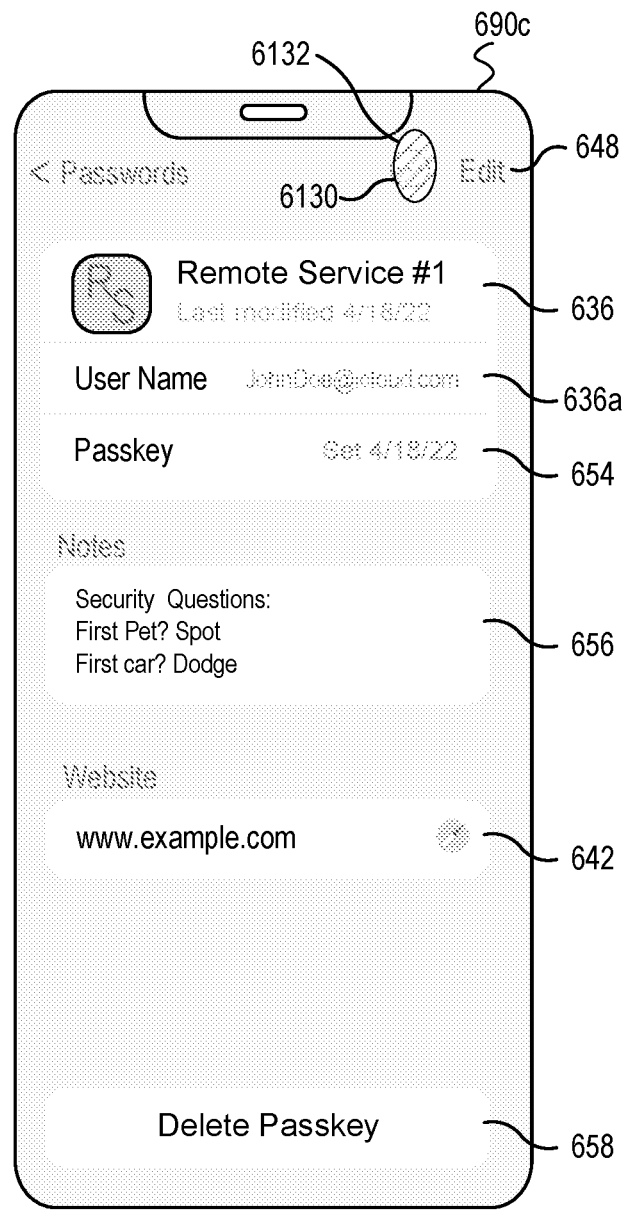

FIG. 6U illustrates an exemplary credential interface 690*c* displayed upon detection of an input 6206 in FIG. 6M directed to a respective credential affordance 628 while displaying password management user interface 690*a* when the respective credential is not being shared. The credential user interface 690*c* includes identification of the respective remote service 636 along with the associated authentication information 636*a* and 654, notes affordance 656, remote service website affordance 642 that, in response to a selection input, causes the device to initiate a process that navigates to the remote service website in response to a selection input; a delete passkey affordance 644, edit affordance 648, and more affordance 6130.

Figure 6V:
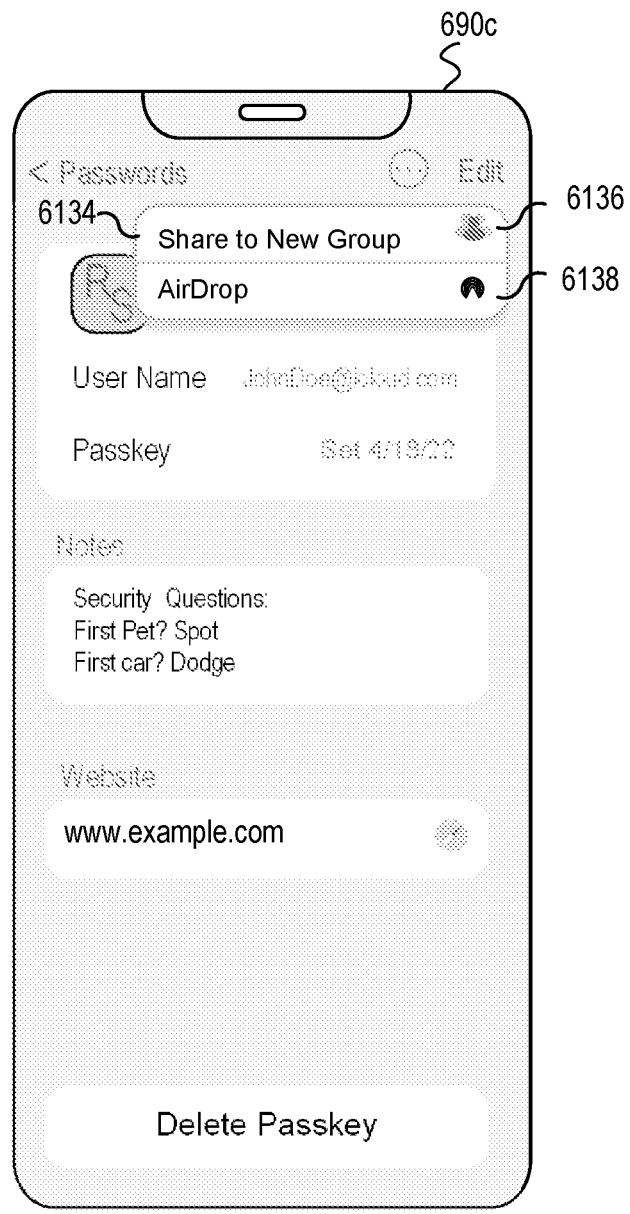

FIG. 6V illustrates an exemplary supplemental affordance 6134 displayed upon detection of an input 6132 in FIG. 6U directed to more affordance 6130 while displaying password management user interface 690*c*. Supplemental user interface 6134 includes share affordance 6136 that, in response to a selection input, causes the device to initiate a process for adding the respective credential to a new share group; and airdrop affordance 6138 that, in response to a selection input, causes the device to initiate a process for wirelessly transmitting the respective credential to a nearby devices.

Figure 6W:
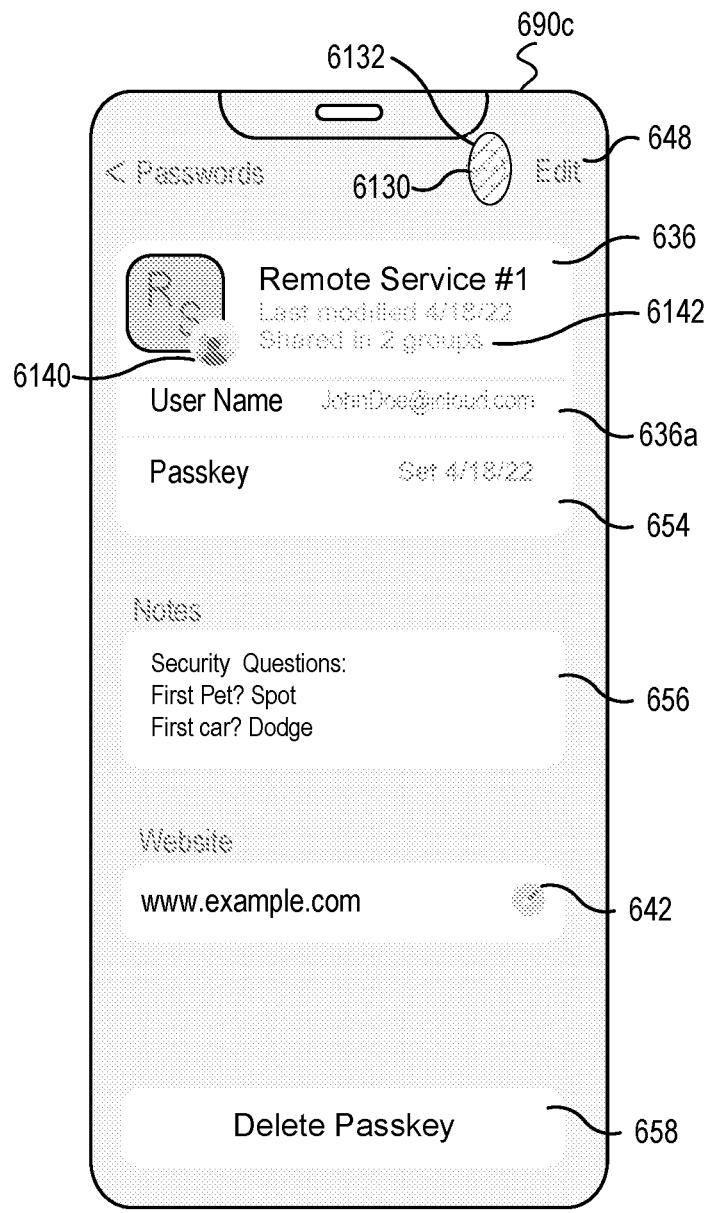

FIG. 6W illustrates an exemplary credential interface 690*c* displayed upon detection of an input 6102 in FIG. 6N directed to a respective credential affordance 628 while displaying password management user interface 690*a* when the respective credential is shared. The credential user interface 690*c* includes identification of the respective remote service 636 along with the associated authentication information 636*a* and 654. In addition, the respective remote service identification information includes sharing badge 6140 and the number of groups the credential is shared with 6142. In some embodiments when the credential is shared with a single group the element 6142 indicated the name of the shared group. Credential interface 690*c* further includes notes affordance 656, remote service website affordance 642 that when selected by the user causes the device to navigate to the remote service website; a delete passkey affordance 644, edit affordance 648, and more affordance 6130.

Figure 6X:
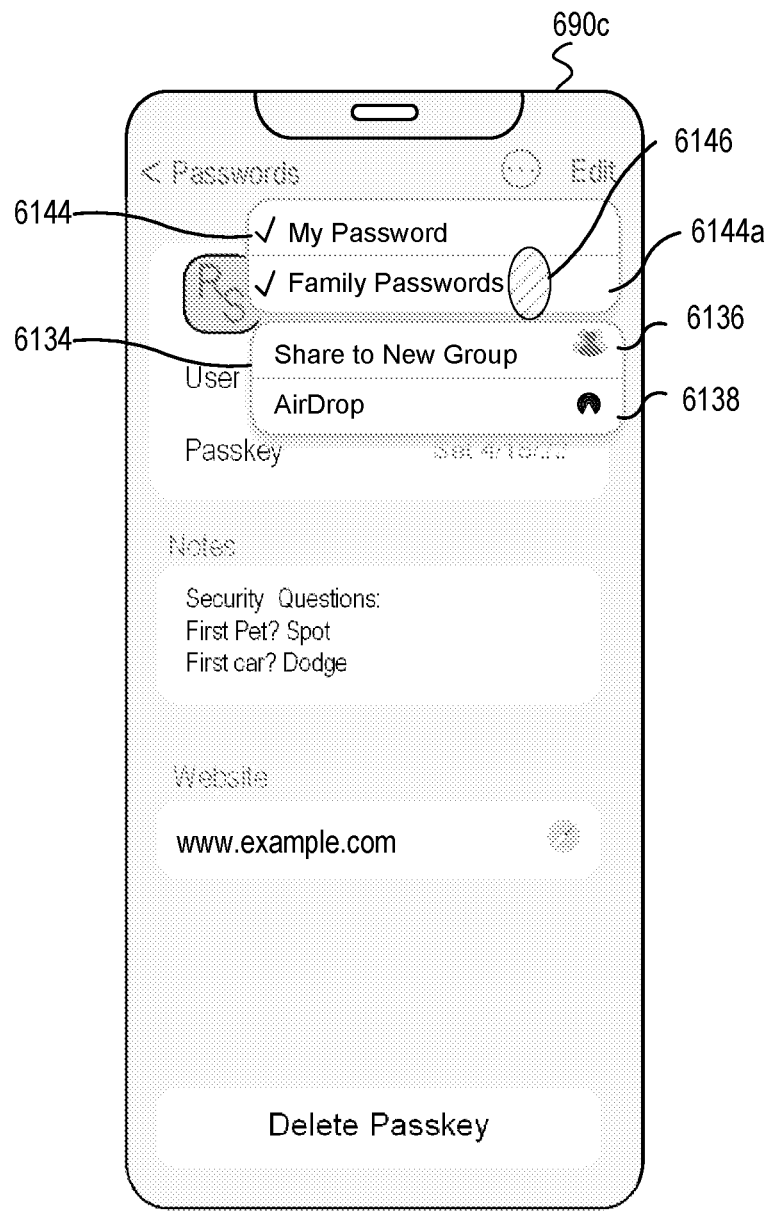

FIG. 6X illustrates exemplary supplemental affordances 6134 and 6144 displayed upon detection of an input 6132 in FIG. 6W directed to more affordance 6130 while displaying password management user interface 690*c* when the respective credential is shared. Supplemental affordance 6134 includes share affordance 6136 that, when selected causes the device to initiate a process for adding the respective credential to a new share group in response to a selection input; and airdrop affordance 6138 that, when selected causes the device to initiate a process for wirelessly transmitting the respective credential to a nearby devices in response to a selection input. Supplemental affordance 6144 includes a respective affordance 6144*a* for a plurality of different groups the credential is currently shared with and that, in response to a selection input (e.g., 6146), causes the device to initiate a process that removes the respective credential from the shared group.

Figure 6Y:
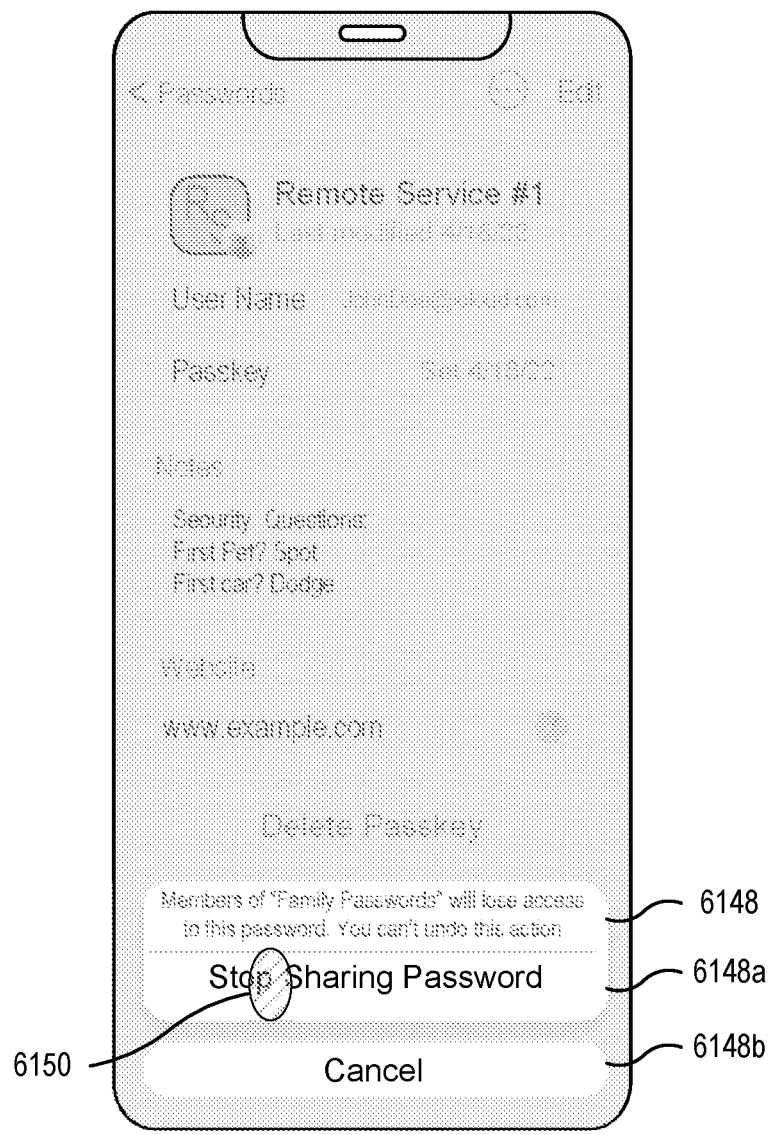

FIG. 6Y illustrates an exemplary message 6148 displayed in response to detection of an input 6146 in FIG. 6X directed to a respective affordance 6144*a* that, when selected causes the device to initiate a process to stop sharing the credential with the family passwords group. The message 6148 includes a confirmation affordance 6148*a* that, in response to a selection input, causes the device to initiate a process to confirm the removal of the credential from the family passwords group and a cancel affordance 6148*b* that, in response to a selection input, causes the device to initiate a process to continue sharing the credential.

Figure 6Z:
Figure 6A:
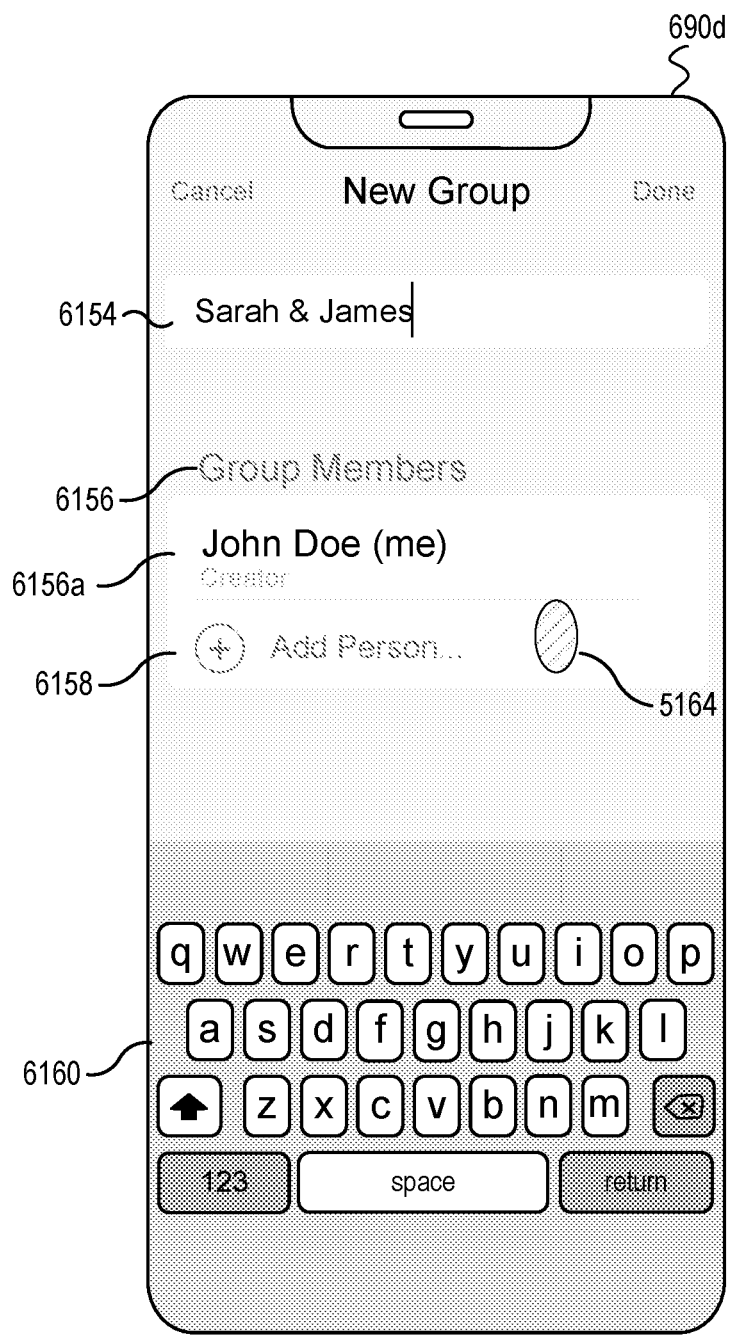
Figure 6A:
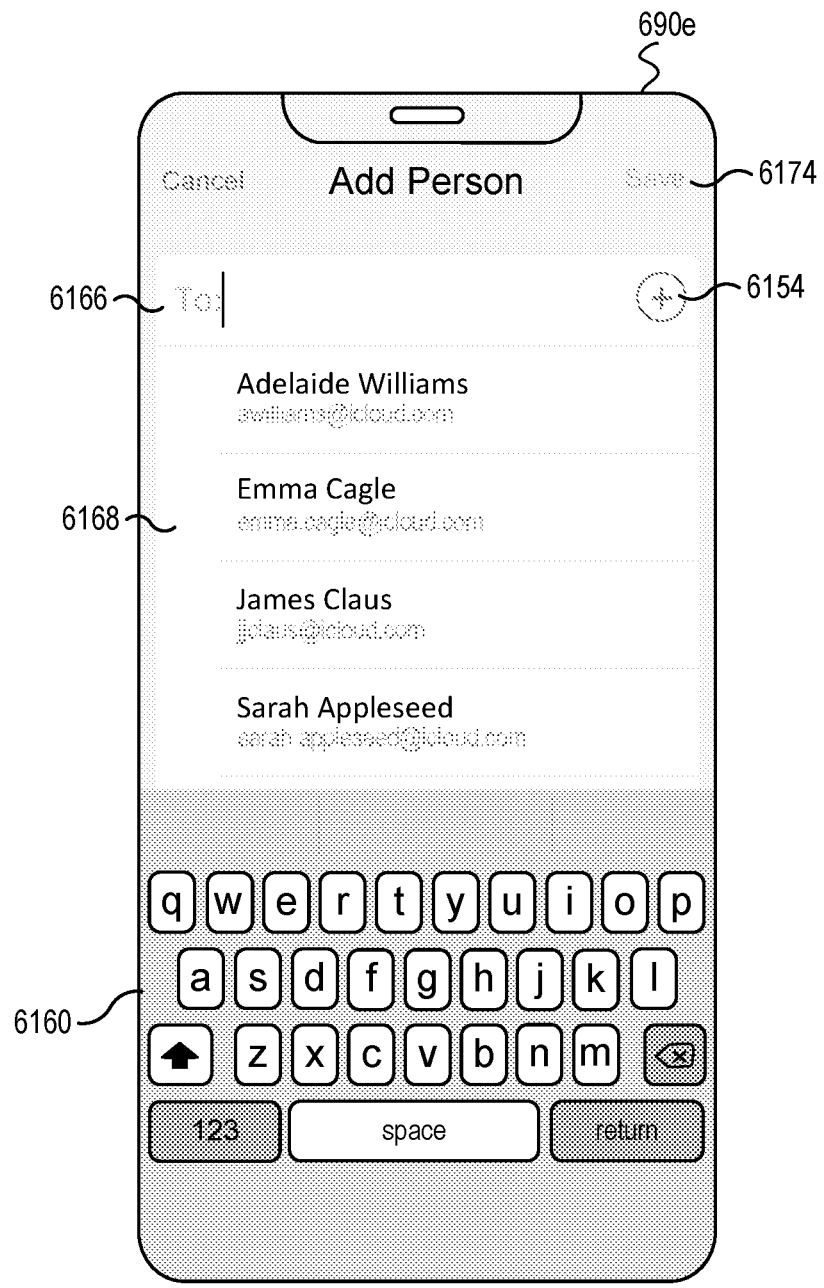
Figure 6A:
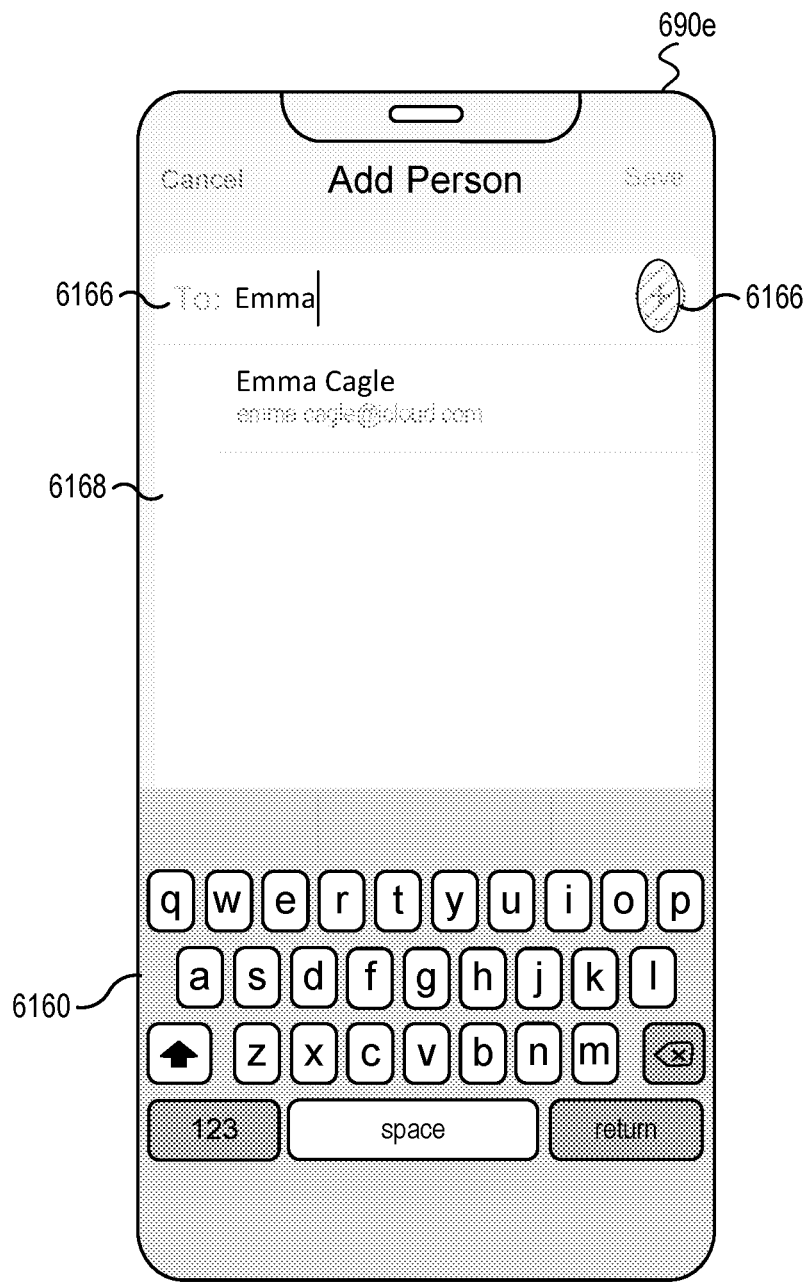
Figure 6A:
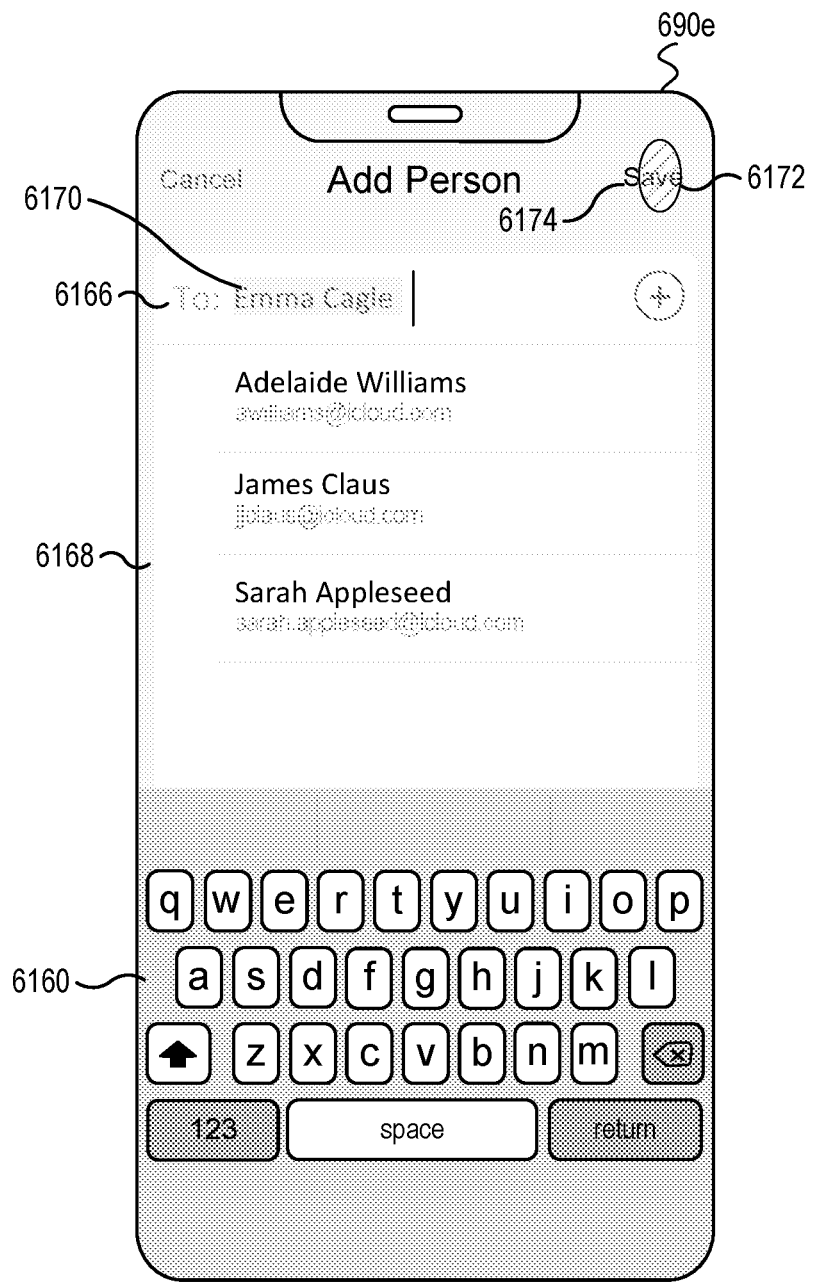
Figure 6A:
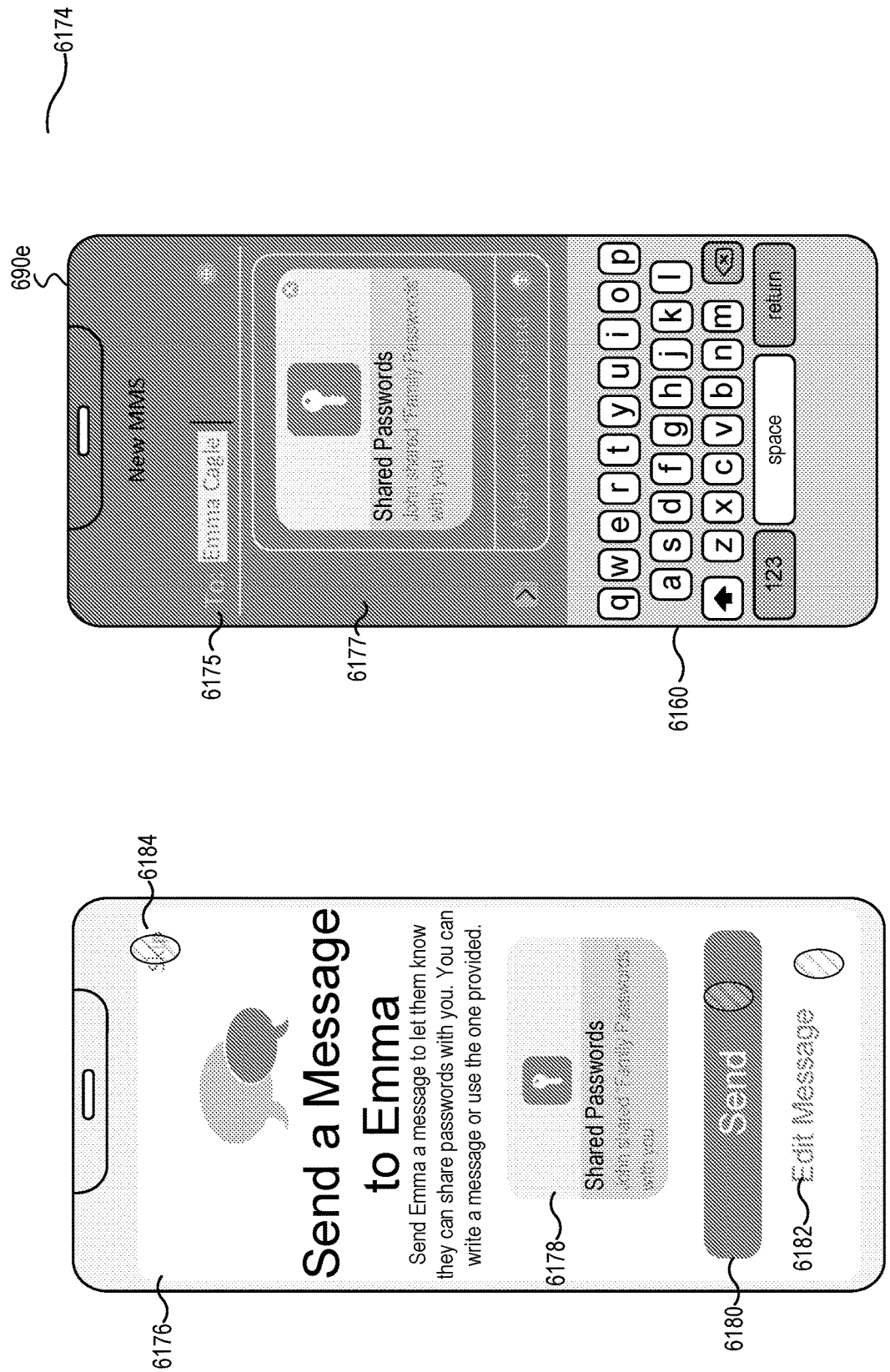
Figure 6A:
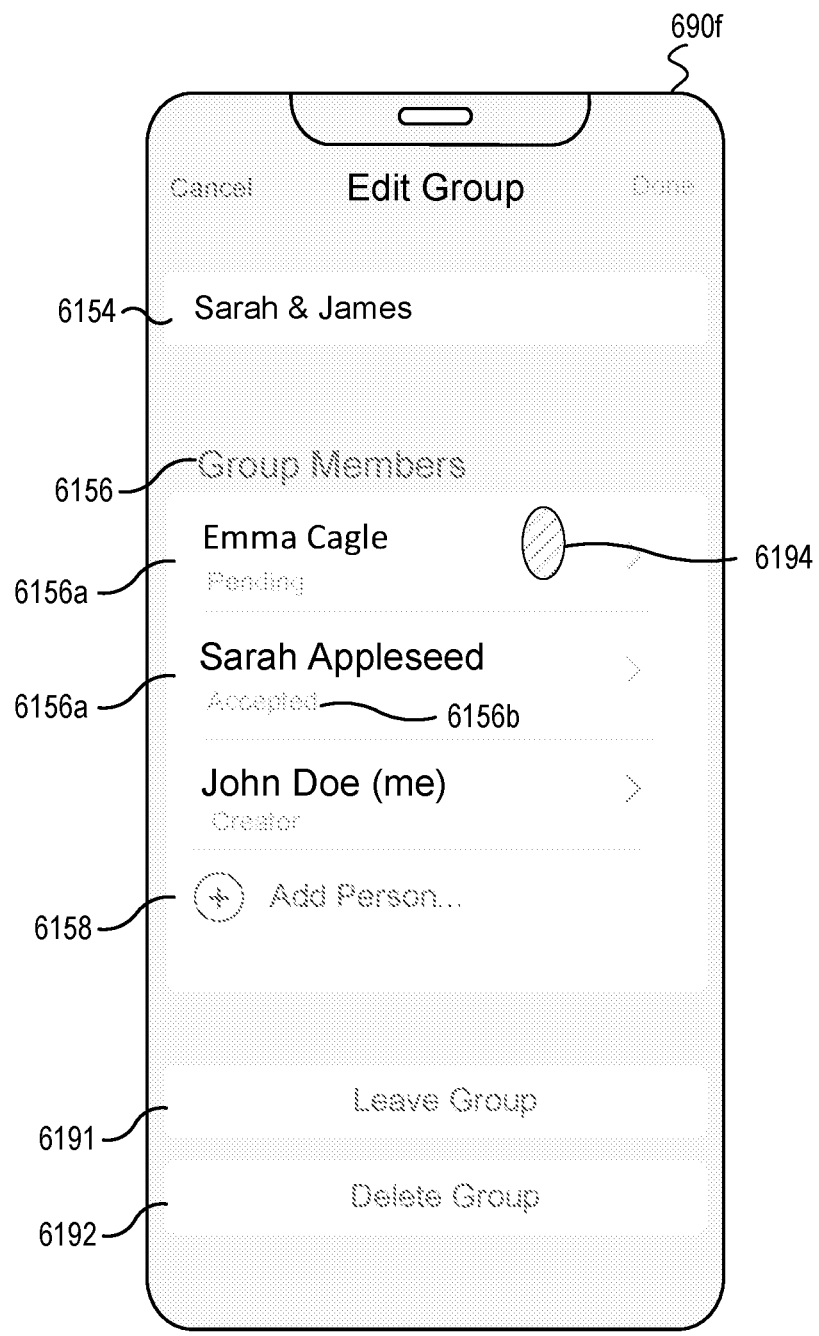
Figure 6A:
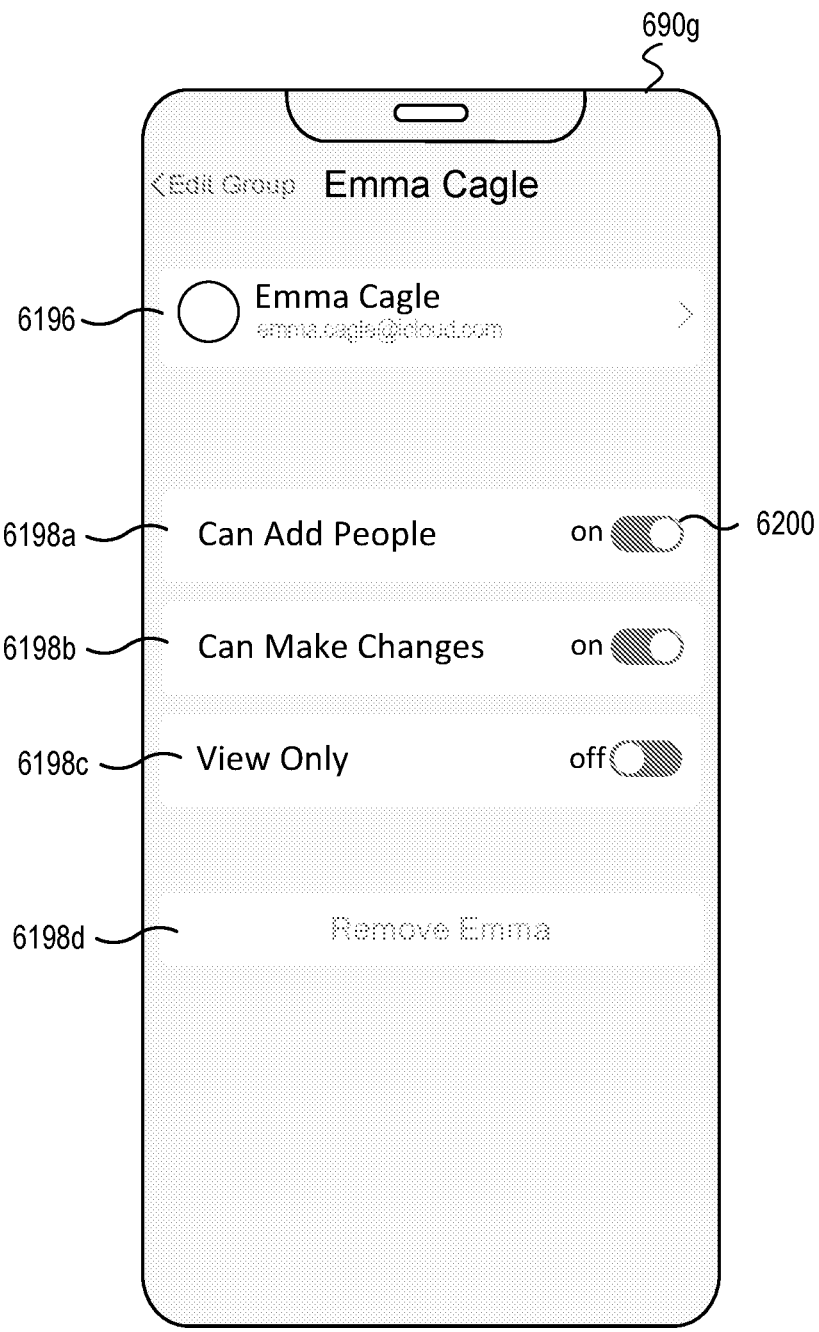
Figure 6A:
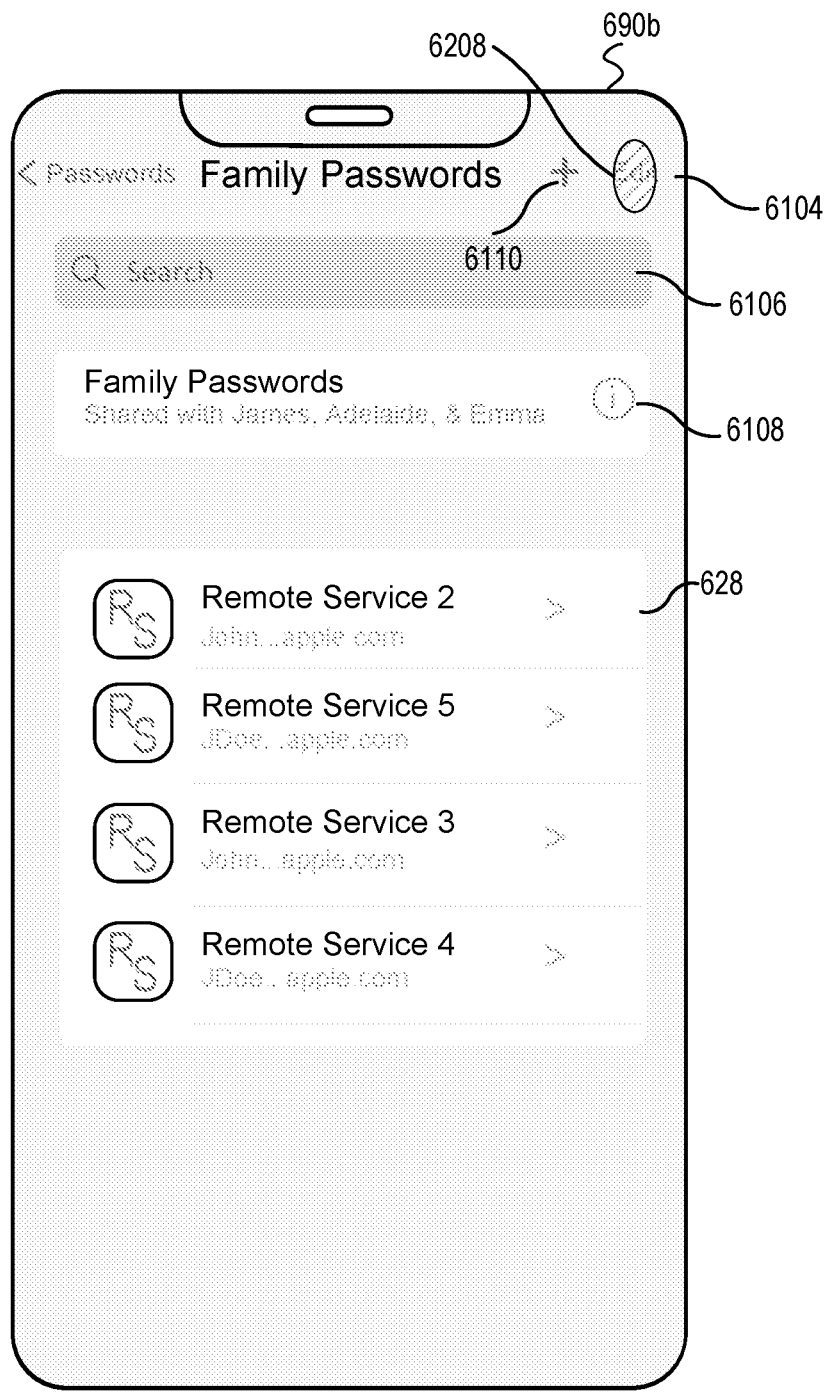
Figure 6A:
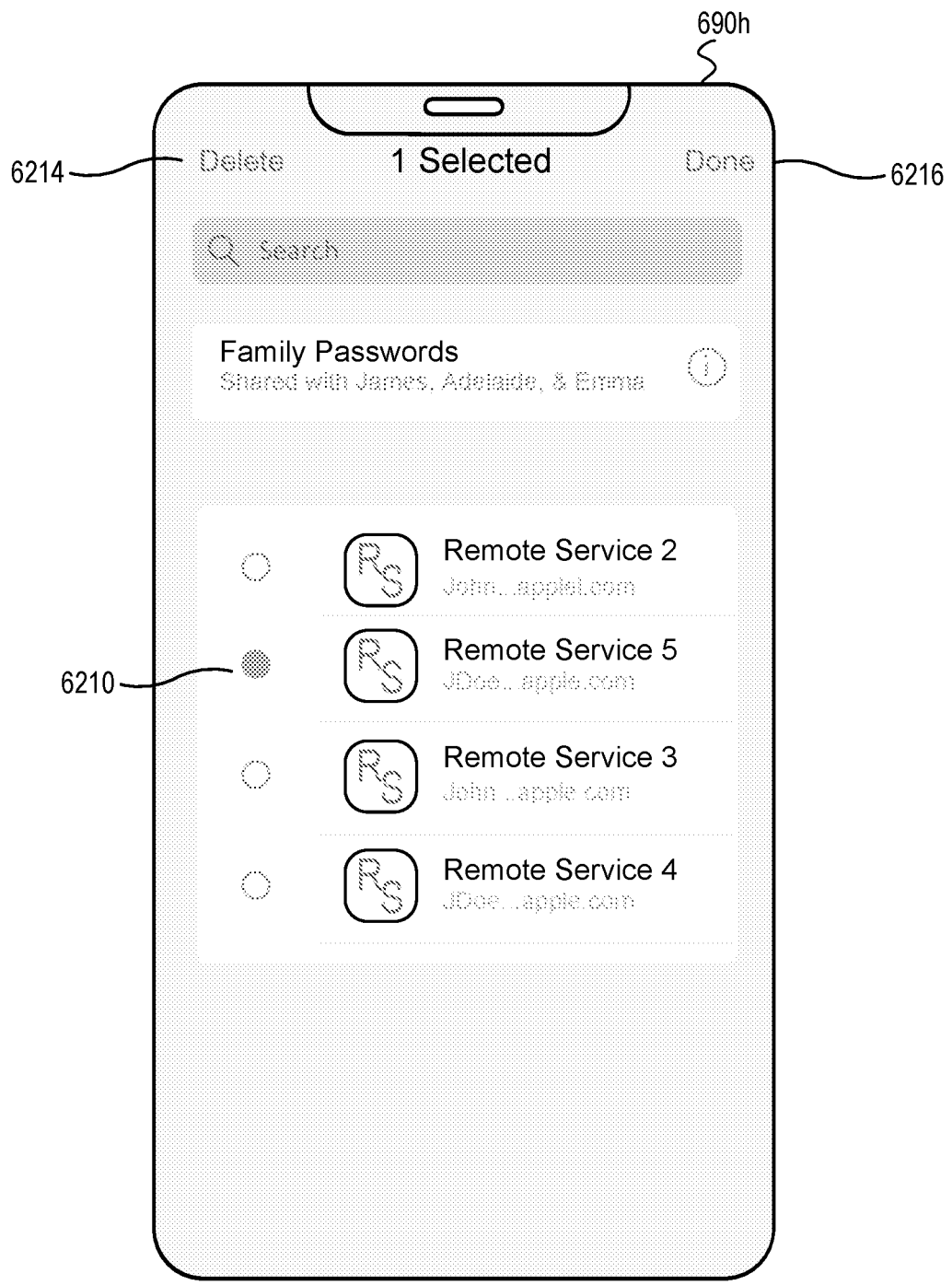
Figure 6A:
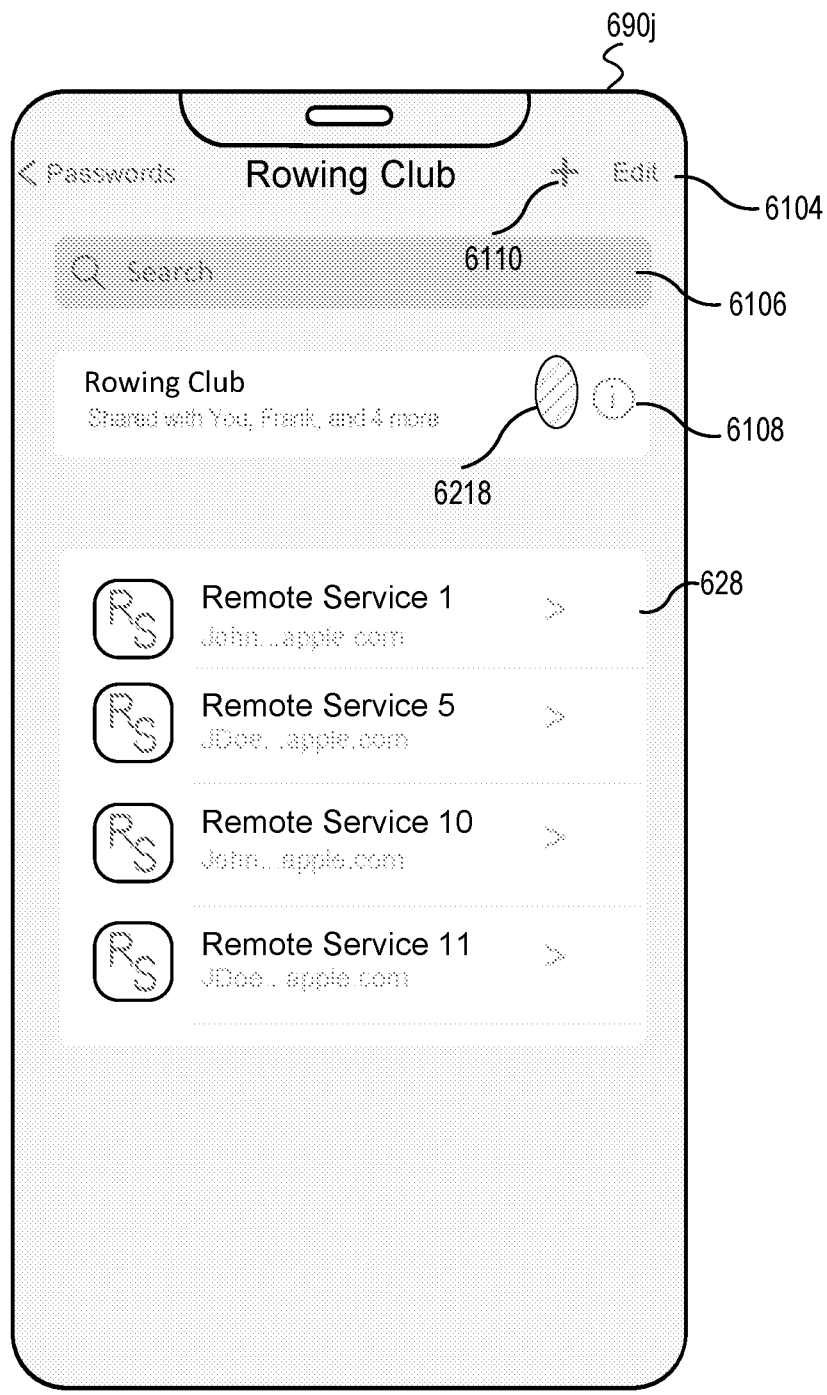
Figure 6A:
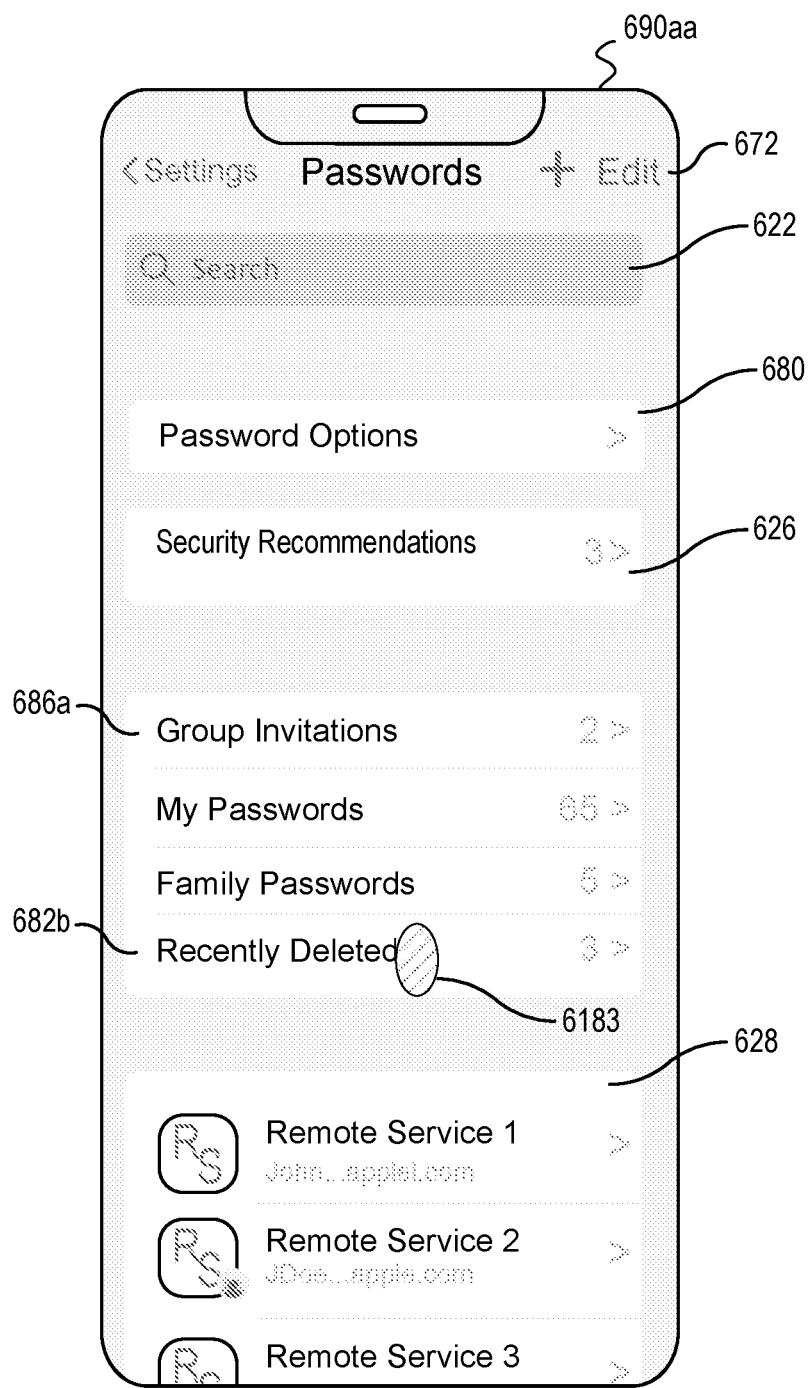
Figure 6A:
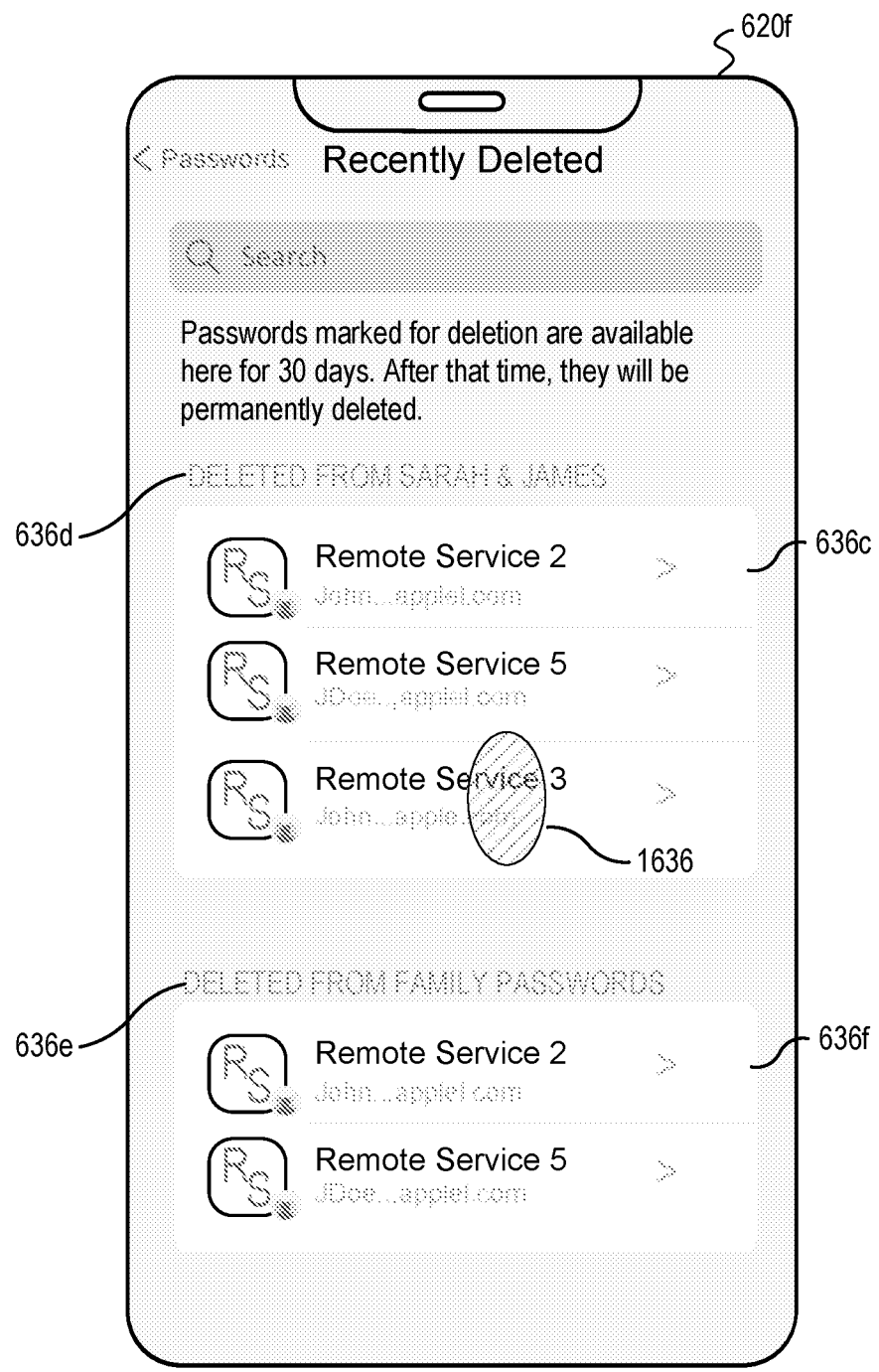
Figure 6A:
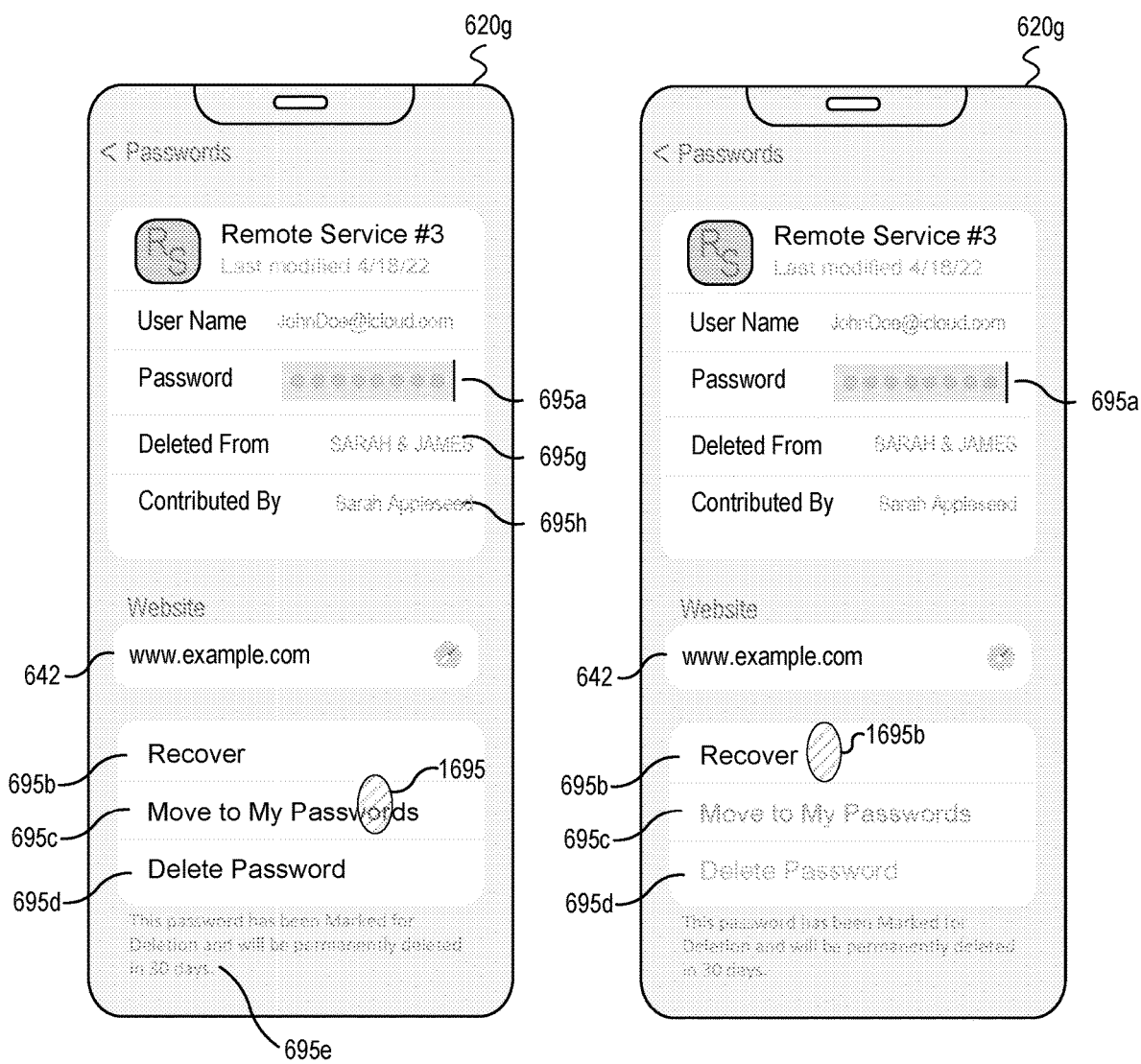
Figure 6A:
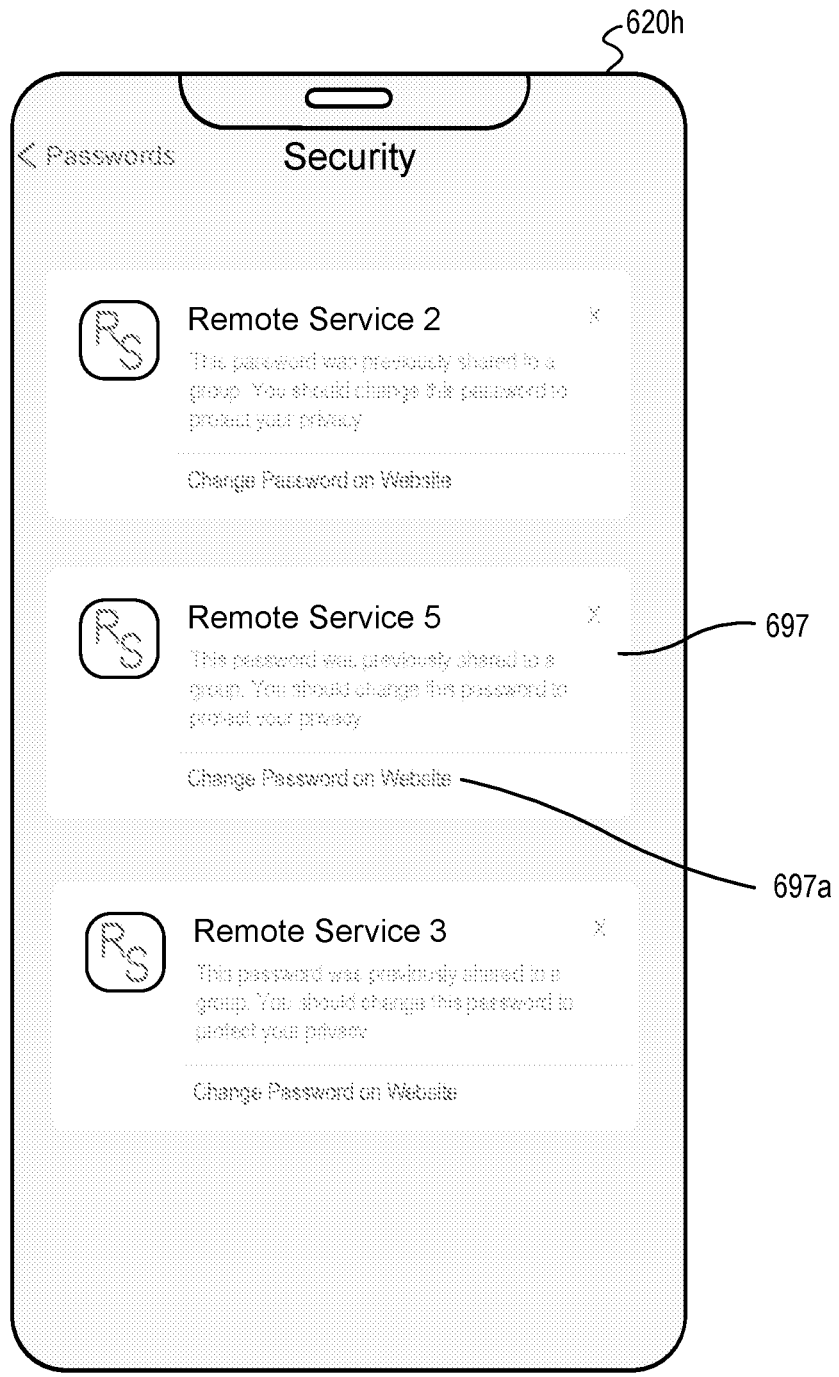

FIG. 6Z illustrates a transition back to supplemental affordances 6134 and 6144 upon detection of an input 6150 in FIG. 6Y directed to confirmation affordance 6148*a*, where the respective affordance 6144*a* for the family passwords group have been modified to indication the credential is no longer being shared with the family passwords group.

FIG. 6AA illustrates an exemplary create new group user interface 690*d* displayed upon detection of an input 6152 in FIG. 6P directed to new shared group affordance 692*b* while displaying password management user interface 690*a*. The create new group user interface 690*d* includes group name input affordance 6154, member affordance 6156, and query keyboard 6160. The member affordance 6156 includes a member listing element 6156*a* and add affordance 6158. The member listing element 6156*a* is, optionally, prepopulated with the creator member. FIG. 6AA further illustrates an exemplary suggested group creation interface 690*m* displayed upon detection of an input 6220 in FIG. 6M directed to a recommendation to share password affordance 682 with a "Family Passwords" group. The suggested group creation interface 690*m* includes a group name affordance 6154 prepopulated with a suggested name (e.g., family passwords) and member affordance 6156 prepopulated with at least subset, or all of, the contactable people with whom the user has a predetermined relationship (e.g., the users associated with a family account).

FIG. 6AB illustrates transition of new group user interface 690*d* upon detection of an input 5162 in FIG. 6AA directed to group name affordance 6154 and subsequent inputs from query keyboard 6160 to create the group name "Sarah & James."

FIG. 6AC illustrates an exemplary add person user interface 690*e* displayed upon detection of an input 5164 in FIG. 6AB directed to add person affordance 6158. The add person user interface 690*e* includes contact input affordance 6166 that, in response to a selection input, causes the device to initiate a process for displaying input received from query keyboard 5160 and a contact listing 6168 of contactable persons associated with the device 100 (e.g., contacts saved in the user's contact list on device 100). As illustrated in FIG. 6AD, the listing 6168 of contactable persons is modified in accordance with the input received from query keyboard 6160.

FIG. 6AE illustrates an exemplary transition of add person user interface 690*e* upon detection of an input 6166 in FIG. AD directed to selection of a specific contactable person (e.g., input 6166 in FIG. 6AD). In FIG. 6AE the contact input affordance 6166 transitions the displayed input text into a contact token 6170 indicating selection of a particular contactable person and save affordance 6174 is transitioned to a more prominent color.

FIG. 6AF illustrate an exemplary message prompt user interface 6176 displayed upon detection of an input 6172 in FIG. 6AE directed to the save affordance 6174. The message prompt user interface 6176 includes a send affordance 6180 that, when selected causes the device to initiate a process for accepting a default "shared password" token 6178 in response to a selection input and an edit message affordance 6182 that, when selected causes the device to initiate a process to open a message conversation user interface 690*e* in response to selection input. In addition, the message prompt user interface 6176 includes a skip affordance 6184 that, when selected causes the device to forgo sending a message. Message conversation user interface 690*e*, displayed in response to selection of edit message affordance 6182 includes a prepopulated "To" field 6175 with user contact token 6170 and a message field 6177 prepopulated with the "shared password" token 6178 along with an input field accepting custom text in response to input from query keyboard 6160.

FIG. 6AG illustrates an exemplary edit group interface 690*f* for an existing group (e.g., "Sarah & James") displayed upon detection of an input 6188 in FIG. 6Q directed to a group identification affordance 6108 while displaying shared group interface 690*b* for a respective group. The existing group user interface 690*f* includes group name affordance 6154, member affordance 6156, and delete group affordance 6192. The member affordance 6156 includes a member listing element 6156*a*, status affordance 6156*b*, and add affordance 6158. The status affordance 6156*b* indicates whether the member was accepted or declined an invitation to join the group or whether an invitation is pending.

FIG. 6AH illustrates an exemplary member rights interface 690*g* displayed upon detection of an input 6194 in FIG. 6AG directed to a respective member element 6156*a* while displaying the group interface 690*f* The member rights interface 690*g* includes a member identification affordance 6196 and one or more selectable elements 6200 corresponding to respective parameters or rights associated with the respective member. For example, parameter 6198*a* which gives the respective member the right to add people to the shared group, parameter 6198*b* which give the respective member the right to make changes to the shared group, and parameter 6198*c* which restricts the respective member to only viewing rights. In addition, the member rights interface 690*g* includes a remove member affordance 3198*d* which removes the member from the respective group.

FIG. 6AI illustrates an exemplary shared group interface 690*b* displayed upon detection of an input 698 in FIG. 6N directed to a respective shared group 682*a* while displaying password management user interface 690*a*. Shared group interface 690*b* includes respective credential affordances 628 for a plurality of different credentials being shared with the group, group identification affordance 6108, search affordance 6106, edit affordance 6104, and add affordance 6110. FIG. 6AJ illustrates an exemplary group edit interface 690*h* displayed upon detection of an input 6208 in FIG. 6AI directed to edit affordance 6104. The group edit interface 690*h* includes a respective selection element 6210 for a plurality of different credentials shared with the respective group, delete affordance 6214 for deleting the selection credentials, and done affordance 6216 that returns to the shared group interface 690*b*.

FIG. 6AK illustrates an exemplary shared group interface 690*b* displayed upon detection of an input 698 in FIG. 6N directed to a respective shared group 682*b* with which an invitation to join a group from another person has been accepted while displaying password management user interface 390*a*. The joined group interface 690*j* includes credential affordances 628 for a plurality of credentials that are being shared with the group, group identification affordance 6108, search affordance 6106, edit affordance 6104, and add affordance 6110. One or more of these affordances may be removed or disabled based on the rights assigned to the member by the group creator.

FIG. 6AL illustrates an exemplary group edit interfaces 690*i* displayed upon detection of an input 6218 in FIG. 6AK directed to group identification affordance 6108. The group edit interfaces 690*i* includes group name affordance 6154, and member affordance 6156. The member affordance 6156 includes a member listing element 6156*a*, and add affordance 6158. If the privileged assigned to the member by the creator does not include the ability to add members, the add affordance 6158*b* is disabled, removed, or not displayed.

FIG. 6AM illustrates a password management user interface 690*aa* for managing and sharing authentication information associated with (e.g., saved in association with a credential synchronization service) a user and thus accessible to (e.g., stored at or stored in secure cloud storage associated with) the computing systems associated with the user. The password management user interface 690*aa*, like the password management user interface in FIG. 6M, includes a search affordance 622, a credential synchronization service affordance 680, a security recommendation affordance 626, an edit affordance 672, and respective authentication affordances 628 for a plurality of different remote services for which authentication information has been saved. Password management user interface 690*a* further includes a group invitations affordance 686*a* that indicates one more invitation to join a group are pending and, in response to a selection input, causes the device to initiate a process for responding to a pending initiation (e.g., joining 688 or declining 692 in FIG. 6O. In addition, in some embodiments password management user interface 690*aa* further includes a recently deleted affordance 682*b* indicating whether any previously shared credentials (e.g., passwords or passkeys) have been associated (e.g., are no longer being shared with a group) from the user. This disassociation of a previously shared credential may result from various actions from any group user. A contributing user deleting a shared credential (e.g., 664 in FIG. 6I), a contributing user initiating a process to stop sharing a credential with a group (e.g., 6150 in FIG. 6Y), a user deleting a group (e.g., 6192 in FIG. 6AG), a group creator removing a user from a group (e.g., 6198*d* in FIG. 6AH), and a user leaving a group are example actions which may results in a shared credential being disassociated from one more users.

FIG. 6AN illustrates an exemplary supplemental user interface 620*f* displayed upon detection of an input 6183 in FIG. 6AM directed to a recently deleted affordance 682*b* while displaying password management user interface 690*aa* when one or more previously shared credentials have been disassociated with the user. Supplemental user interface 620*f* includes identification 636*d* of the shared group from which one or more disassociated credentials associated with a respective remote service(s) 636*c* is no longer being shared with the group.

FIG. 6AO illustrates an exemplary credential user interface 620*g* displayed upon detection of an input 1695 in FIG. 6AN directed to a respective remote service affordance 628*c* while displaying the supplemental user interface 620*f*. The credential user interface 620*g* includes identification of the respective remote service 636 along with associated authentication information 636*a* and 636*b* of the disassociated authentication credential (e.g., password or passkey); and remote service website affordance 642 that in response to a selection input redirects the user to the remote service website. The credential user interface 620*g* further includes, in accordance with a determination that the user is the contributor the disassociated password, a recover affordance 695*b* that in response to a selection input unmarks the password for deletion and reassociates the password with the user (e.g., moves to my passwords), a move to my passwords affordance 695*c* that in response to a selection input moves the password to the users my password group, and a delete password affordance 695*d* that in response to a selection input permanently deletes the password associated with the remote service without waiting the time period (e.g., 30, 60, or 90 days) associated with passwords marked for deletion. If the user is not the contributor of the authentication credential, then one or more of the affordances, e.g., delete password 695*d* and move to my passwords 695*c* may be greyed out or removed as illustrated in interface 620*gg*. In addition, any group user may initiate process for retaining a copy of the password (e.g., by copying the password 695*a* and pasting it a new user password). Although not shown in FIG. 6AO, the credential user interface 620*g* may further includes an account options affordance 640 as illustrated in FIG. 6F.

FIG. 6AP illustrates an exemplary security notification interface 620*h* displayed upon detection of an input 1697 in FIG. 6N directed to a security affordance 626 while displaying the password management user interface 690*a*. The security notification interface 620*h* includes one or more notifications 697 regarding respective authentication credentials (e.g., password or passkeys) that were previously shared with a group but are no longer being shared (e.g., disassociated credentials) and corresponding affordance 697 that in response to a selection input redirects the user to the remote service website to initiate a credential change.

FIG. 7 is a flow diagram illustrating a method for managing and sharing authentication information using a computer system in accordance with some embodiments. Method 700 is performed at a computer system (e.g., 100, 300, 500 in FIGS. 2, 4A, and 5A) that is in communication with a display generation component and one or more input devices. In some embodiments, the display is a touch-screen display and the touch-sensitive surface is on or integrated with the display. In some embodiments, the display is separate from the touch-sensitive surface. Some operations in method 700 are, optionally, combined, the orders of some operations are, optionally, changed, and some operations are, optionally, omitted.

As described below, method 700 provides an intuitive way for managing and sharing authentication information. The method reduces the number, extent, and/or nature of the input from a user when accessing a remote service that requires authentication and/or managing and sharing authentication information between devices and users, thereby creating a more efficient human-machine interface. For battery-operated computing devices, enabling a user To manage and share authentication information faster and more efficiently conserves power and increases the time between battery charges.

FIG. 7 is a flow diagram illustrating method 700 for managing authentication information (e.g., passkeys, verification codes, and/or passwords), in accordance with some embodiments. Method 700, is performed at (and/or performed by) a first computing system (e.g., smart phone, tablet, and/or computer) that is in communication with a display generation component (e.g., a display controller, a touch-sensitive display system; and/or an integrated or connected display device) and one or more input devices (e.g., a touch-sensitive surface, mouse, pencil, and/or gesture capture device), the first computing system being associated with a first user account of a first user (702). Method 700 includes: receiving (704), via the one or more input devices, one or more inputs (e.g., tapping on a remote service affordance/icon) that corresponds to a request (e.g., input 606*a* in FIG. 6A and/or input 620 in FIG. 6B) to access a remote service that requires authentication (e.g., a media streaming service, a banking service, a remote messaging service, or other remote service that requires authentication); and in response to receiving (702) the one or more inputs (e.g., input 606*a* in FIG. 6A and/or input 620 in FIG. 6B)) that correspond to the request to access the remote service, providing (706) authentication information to the remote service that is based on a private key that is accessible to (e.g., stored at or stored in secure cloud storage associated with) the first computing system (e.g., transition from interface 608*a* in FIG. 6B to remote service interface 608*b* in FIG. 6C). An example activation of a remote service and providing authentication information to the remote service is discussed above with reference to FIGS. 6A-6C.

In some embodiments, the authentication information (708) does not include the private key (e.g., and does not include information that can be used to determine the private key), the private key (710) was established (e.g., created, generated, or selected) by a second computer system that is different from the first computer system (e.g., when the second computer system was used to create and or modify authentication credentials for authenticating with the remote service), and the second computer system is also associated (712) with the first user account.

Enabling the user to authenticate with authentication information based on a private key increases the security of operations of the first computing system and reduces a number of inputs needed to authenticate with the remote service making operation of the first computing system faster and more efficient, which conserves power and, for battery devices, increases the time between battery charges.

In some embodiments the first user account is associated with multiple computing systems and the private key is accessible to (e.g., stored at or stored in secure cloud storage associated with) the multiple computing system associated with the first user account, including the first computer system and the second computer system. Making the private key securely accessible to all the computing systems associated with the first user account, increases the security of operations of the computing systems and reduces a number of inputs needed to authenticate with the remote service making operation of the computing systems faster and more efficient, which conserves power and, for battery devices, increases the time between battery charges.

In some embodiments method 700 includes receiving, via the one or more input devices, one or more second inputs (e.g., one or more selection inputs selecting a password management icon) that correspond to a request (e.g., input 630 in FIG. 6D) to add a private key for generating authentication information associated with a remote service. In some embodiments, in response to receiving the one or more second inputs that correspond to the request, method 700 includes: associating a new private key with the remote service; and making the new private key securely accessible to the first computing system; and making the new private key accessible to the second computing system via a wireless credential synchronization service (e.g., a server-based or cloud service that synchronizes credentials between different devices such as devices associated with a same user account). An example request for adding a passkey to a remote service is discussed above with reference to FIGS. 6D-6H.

Making a new private key accessible to the first computing system securely accessible to the second computing system associated with the first user account, increases the security of operations of the computing systems and reduces a number of inputs needed to authenticate with the remote service making operation of the computing systems faster and more efficient, which conserves power and, for battery devices, increases the time between battery charges.

In some embodiments method 700 includes in accordance with a determination (726) that the private key has been updated at the second computer system, updating the private key accessible to (e.g., stored at the computer system or stored in secure cloud storage associated with) the first computer system. Updating the private key accessible to the first computing system in response to the private key being updates at the second computer system, increases the security of operations of the first computing system and reduces a number of inputs needed to authenticate with the remote service making operation of the computing system faster and more efficient, which conserves power and, for battery devices, increases the time between battery charges.

In some embodiments method 700 further includes: displaying, via the display generation component, an authentication information management user interface (e.g., password manager interface 620a in FIG. 6D) that includes one or more selectable user interface elements (e.g., authentication affordances 628 in FIG. 6D) corresponding to different remote services; and receiving, via the one or more input devices, one or more second inputs (e.g., tapping on a remote service affordance/icon in password manager) that corresponds to selection of one of the one or more selectable user interface elements corresponding to a respective remote service (e.g., input 630 in FIG. 6D). Method 700 further includes in response to receiving the one or more second inputs that correspond to selection of the respective remote service, displaying, via the display generation component, an account information management user interface (e.g., remote service account interface 620c in FIG. 6F) for the respective remote service that includes: in accordance with a determination that a first type of authentication information (e.g., a user-defined password 636b in FIG. 6F) associated with the respective remote service is accessible to (e.g., stored at or stored in secure cloud storage associated with) the first computing system, displaying a first selectable user interface element that corresponds to a second type of authentication information (e.g., secure token) based on a private key (e.g., add passkey affordance 640c in FIG. 6F); and in response to receiving one or more third inputs (e.g., input 650 in FIG. 6F) that correspond to selection of the first selectable user interface element: initiating a process (e.g., 652 in FIG. 6G) to associate the second type of authentication information based on a private key with the remote service. An example request for adding a passkey to a remote service is discussed above with reference to FIGS. 6D-6H. In some embodiments, in accordance with a determination that the process for associating a private key with a remote service has been completed, the private key is made accessible to (e.g., stored at or stored in secure cloud storage associated with) the first computing system. FIG. 6H illustrates interface 608d which is updated to reflect the addition of a passkey with respect to a respective remote service.

Enabling a user change from a first type of authentication information (e.g., user generated password) to a second type of authentication information based on a private key increases the security of operations of the first computing system and reduces a number of inputs needed to authenticate with the remote service making operation of the first computing system faster and more efficient, which conserves power and, for battery devices, increases the time between battery charges.

In some embodiments method 700 further includes while displaying the authentication information management user interface (e.g., password manager interface 620a in FIG. 6D) that includes the one or more selectable user interface elements, displaying a second user interface element that corresponds to a request to make authentication information based on a private key accessible to the first computing system; receiving, via the one or more input devices, one or more third inputs (e.g., tapping on a remote service affordance/icon 628 while displaying password manager interface 620a in FIG. 6D) that correspond to selection of the second user interface element; and in response to receiving the one or more third inputs that correspond to selection of the second user interface element, initiating a process (e.g., 652 in FIG. 6G) for associating authentication information based on a private key with a remote service. Method 700 further includes after associating authentication information based on the private key with the remote service, making the associated authentication information based on the private key accessible to (e.g., stored at or stored in secure cloud storage associate with) the first computing system. FIG. 6H illustrates interface 608D which is updated to reflect the addition of a passkey with respect to a respective remote service.

Enabling the user to associate authentication information based on a private key with a remote service and make the authentication based on the private key accessible to the first computing system using an authentication information management user interface allows the user to quickly recognize the authentication information types associated with a remote service, increases the security of operations of the first computing system and reduces a number of inputs needed to authenticate with the remote service making operation of the first computing system faster and more efficient, which conserves power and, for battery devices, increases the time between battery charges.

In some embodiments method 700 further includes displaying, via the display generation component, an authentication information management user interface (e.g., password manager interface 620a in FIG. 6D) that includes one or more selectable user interface elements (e.g., authentication affordances 628 in FIG. 6D), each of the one or more selectable user interface elements being associated with a respective remote service that requires authentication and for which authentication information is accessible to the first computing device. Method 700 further includes receiving, via the one or more input devices, one or more second inputs (e.g., tapping on a remote service affordance/icon in password manager) that corresponds to selection of a respective remote service user interface element (e.g., input 630 in FIG. 6D); and in response to receiving the one or more second inputs that correspond to selection of the respective remote service, displaying, via the display generation component, an account information management user interface (e.g., remote service management interface 620*c* in FIG. 6F) for the respective remote service that includes: one or more authentication user interface elements (e.g., 636*b* in FIG. 6F or 654 in FIG. 6H), the one for more authentication user interface elements corresponding to a different type of authentication information (e.g., password, password and verification code, and/or passkey) associated with the respective remote service and accessible to the first computing device. Displaying a user interface elements for a plurality of authentication information types associated with a respective remote service and accessible to the first computing system allows the user to quickly recognize the authentication information types associated with a remote service, increases the security of operations of the first computing system and reduces a number of inputs needed to authenticate with a remote service making operation of the first computing system faster and more efficient, which conserves power and, for battery devices, increases the time between battery charges.

In some embodiments method 700 further includes while displaying an account information management user interface for a respective remote service (e.g., 620*e* in FIG. 6J), in accordance with a determination that both a first type of authentication information and a second type of authentication information based on a private key is accessible to the first computing system, displaying a second selectable user interface element (e.g., a delete password element 668 in FIG. 6J) that to corresponds to a request to delete the first authentication information type. Method 700 includes receiving, via the one or more input devices, one or more fourth inputs (e.g., a selection input corresponding to selection of the delete password icon) that correspond to the second selectable user interface which corresponds to a request to delete the first authentication information type (e.g., input 674 in FIG. 6J); and in response to receiving the one or more fourth inputs that correspond to the request to delete the first information type, making the first authentication information type associated with the respective remote service inaccessible to the first computing system. FIG. 6K illustrates interface 608*e* which is updated to reflect the removal of the password credential type with respect to a respective remote service.

Allowing a user to delete a first authentication information type (e.g., a less secure type or types no longer desired) when a second authentication type is accessible, allows the user to easily manage the authentication information associated with a remote service, and increases the security of operations of the first computing system making operation of the computing system faster and more efficient, which conserves power and, for battery devices, increases the time between battery charges.

In some embodiments method 700 includes receiving, via the one or more input device, one or more fifth inputs (e.g., input 676 in FIG. 6H) that correspond to a request to change the authentication information based on a private key associated with a remote service and accessible to the first computing device. In response to receiving the one or more fifth inputs that correspond to the request to change authentication information, initiating a process (e.g., 652 in FIG. 6G) to change the authentication information and making the changed authentication information accessible to the first computing system; and after the process initiated with the remote service has been completed, making the changed authentication information securely accessible to the second computing device. Securely synchronizing authentication information between computing devices associated with the same user accounts reduces accidental input of incorrect authentication information to a remote service, and reduces a number of inputs need to authenticate with the remote service making operation of the first computing system faster and more efficient, which conserves power and, for battery devices, increases the time between battery charges.

In some embodiments method 700 further includes while displaying an account information management user interface for a respective remote service (e.g., 608*e* in FIG. 6H), in accordance with a determination that a second type of authentication information based on a private key is accessible to the first computing system, displaying a third selectable user interface (e.g., delete passkey affordance 658 in FIG. 6H) element that corresponds to a request to delete the second authentication information type. Method 700 further includes receiving, via the one or more input devices, one or more sixth inputs (e.g., tapping on the delete passkey affordance 658 in FIG. 6H) that correspond to the request to delete the second authentication information type; and in response to receiving the one or more sixth inputs that correspond to the request to delete the second information type, making the second authentication information type associated with the respective remote service inaccessible to the first computing system. FIG. 6L illustrates interface 608*f* which is updated to reflect the removal of the passkey credential type with respect to a respective remote service, specifically authentication information 654 is transitioned to the password credential 636*b* and the delete passkey affordance 658 is transitioned to delete password affordance 644.

Allowing a user to delete authentication information based on a private key allows the user to easily manage the authentication information associated with a remote service, and increases the security of operations of the first computing system making operation of the first computing system faster and more efficient, which conserves power and, for battery devices, increases the time between battery charges.

In some embodiments method 700 further includes initiating a process with the remote service to change the authentication information based on a private key and making the changed authentication information accessible to the first computing system includes: navigating the user to a portion (e.g., 608*c* in FIG. 6G) of a website associated with the respective remote service (e.g., in response to receiving the one or more fifth inputs that correspond to the request to change authentication information) that enables the authentication information (e.g., a public key and/or private key) associated with the remote service to be changed. In some embodiments the portion of the website corresponds to a user settings interface or profile and security settings interface.

Navigating a user to a website of the remote service to change/update authentication information allows the user to easily update/change authentication information at the remote service, and increases the security of operations of the first computing system making operation of the first computing system faster and more efficient, which conserves power and, for battery devices, increases the time between battery charges.

In some embodiments the one or more selectable user interface elements include: a fifth selectable user interface element (e.g., change password on website affordance 640*d* in FIG. 640) that allows the user to change the first authentication information associated with the respective remote service; the method includes detecting selection of the fifth user interface element; and in response to detecting selection of the fifth user interface element, navigating the user to a portion (e.g., 608*d* in FIG. 6G) of a website associated with the respective remote service that enables the first authentication information to be changed. Displaying a selectable user interface element that allows the user to change authentication information associated with a remote service by navigating to a website of the remote service allows the user to easily update/change authentication information at the remote service, and increases the security of operations of the computing system making operation of the computing system faster and more efficient, which conserves power and, for battery devices, increases the time between battery charges.

In some embodiments method 700 while displaying an authentication information management user interface associated with a respective remote service (e.g., interface 608*d* in FIG. 6H), in accordance with a determination that authentication information based on a private key (e.g., secure token) has been created for a respective remote service, displaying a date created element (e.g., passkey affordance 654 in FIG. 6H) indicating when the passkey was created. Displaying a date created element indicating when authentication information was created for a respective remote service allows the user to easily manage the authentication information associated with a remote service, and increases the security of operations of the first computing system making operation of the first computing system faster and more efficient, which conserves power and, for battery devices, increases the time between battery charges.

In some embodiments providing the authentication information provided to the remote services includes: generating a secure token signed using the private key accessible to the first computing system. Generating a secure token (e.g., passkey) signed using a private key accessible to the first computing device increases the security of operations of the first computing system and reduces a number of inputs needed to authenticate with the remote service making operation of the first computing system faster and more efficient, which conserves power and, for battery devices, increases the time between battery charges.

Note that details of the processes described above with respect to method 700 (e.g., FIG. 7) are also applicable in an analogous manner to the methods described below. For example, methods 800 and 900 optionally include one or more of the characteristics of the various methods described above with reference to method 700. For example, the authentication information based on a private key that is provided when accessing a remote service that requires authentication may be shared among multiple devices associated with the same user or multiple users described below. For brevity, these details are not repeated below.

Method 800, which is performed (802) at (and thus performed by) a first computing system (e.g., smart phone, tablet, and/or computer) that is in communication with a display generation component (e.g., a display controller, a touch-sensitive display system, and/or an integrated or connected display device) and one or more input devices (e.g., touch-sensitive surface; mouse, pencil, and/or gesture capture device) includes: receiving (804), via the one or more input devices, one or more inputs (e.g., tapping on a remote service affordance/icon 604 in FIG. 6A and/or input 620 in FIG. 6B requesting use of passkey to login to the remote service) that correspond to a first request to provide, to a remote service (e.g., media streaming service, remote messaging service, and/or remote content providing service) that requires authentication, an authentication credential (e.g., password or passkey) that is shared (e.g., passkey 654 in FIG. 6W which is shared 6142 with 2 groups) with a second user. In response to receiving (804) the first request, providing (806) a first authentication credential to the remote service without requiring the user to input the first authentication credential at the first computer system (e.g., because the first authentication credential is stored at the first computer system or retrieved from remote storage that is accessible to the first computer system) (e.g., transition from interface 608*a* in FIG. 6B to remote service interface 608*b* in FIG. 6C), where the first authentication credential was established by the first user (e.g., a password or passkey created when setting up or changing authentication credentials for the remote service). After providing the authentication credential to the remote service, receiving (808), via the one or more input devices, one or more inputs (e.g., tapping on a remote service affordance/icon 604 in FIG. 6A and/or input 620 in FIG. 6B requesting use of passkey to login to the remote service) that correspond to a second request (e.g., a request that occurs after the user has logged out or been logged out of the remote service) to provide, to the remote service (e.g., media streaming service, remote messaging service, and/or remote content providing service) that requires authentication, the authentication credential (e.g., password or passkey) that is shared with a second user (e.g., passkey 654 in FIG. 6W which is shared 6142 with 2 groups). In response to receiving (808) the second request, in accordance with the shared authentication credential having been updated based on input from the second user (e.g., 6198*b* in FIG. 6AH illustrates that a user with which a credential is shared can have the right to make changes to the credential), providing (810) a second authentication credential to the remote service without requiring the user to input the second authentication credential at the first computer system. An example activation of a remote service and providing authentication information to the remote service is discussed above with reference to FIGS. 6A-6C a similar process is performed at computing system of a second user when the passkey associated with the remote service is shared with the second user.

Enabling the user to share authentication credentials (e.g., passwords and/or passkeys) and synchronizing updated authentication credentials reduces a number of inputs needed to perform when accessing the remote service, and makes operation of the computing system faster and more efficient, which conserves power and, for battery devices, increases the time between battery charges.

In some embodiments, method 800 further includes, in response to receiving the second request, in accordance with the shared authentication credential being updated by the second user, providing the updated shared authentication credential (e.g., password or passkey) to the remote service without notifying the first user of the update to the shared authentication credential. Updating shared authentication credentials without notifying users of the update reduces a number of inputs needed to perform when accessing the remote service, and reduces the number of notifications provided to the user, making operation of the computing system faster and more efficient, which conserves power and, for battery devices, increases the time between battery charges. A similar activation of a remote service and providing authentication information to the remote service discussed above with reference to FIGS. 6A-6C is performed upon subsequent activation of the remote service.

In some embodiments, method 800 further includes, in a response receiving the second request, in accordance with a determination that the shared authentication credential has not been updated, providing the first authentication credential (e.g., password or passkey) to the remote service. Synchronizing authentication credentials reduces a number of inputs needed to perform when accessing a remote service requiring authentication, making operation of the computing system faster and more efficient, which conserves power and, for battery devices, increases the time between battery charges.

In some embodiments, method 800 further includes, receiving, via the one or more input devices, a first set of one or more inputs that correspond to a request to initiate a process for sharing a respective authentication credentials (e.g., input 6130 in FIG. 6U, and/or input 6114 in FIG. 6R), that is associated with a remote service that requires authentication, with a respective group of one or more users, and in response to receiving the first set of one or more inputs, sharing the respective authentication credential with the respective group of one or more users. In some embodiments, the process for sharing a respective authentication credential includes displaying sharing user interface (e.g., 690e in FIG. 6AC-6AE) that allows a user to select a user to share with and then to select a credential (e.g., 6120 in FIG. 6S) to share or allows the user to select a credential to share and then to select a user to share it with. An example process for sharing a respective authentication credential for a remote service is discussed above with reference to FIGS. 6P, 6R-6T, and 6AA-6AG.

Allowing a user to share authentication credentials, reduces a number inputs need to be performed with accessing the remote service, thereby reducing input of incorrect credentials, making operation of the computing system faster and more efficient, which conserves power and, for battery devices, increases the time between battery charges.

In some embodiments, method 800 further includes, while displaying a first data selection user interface (e.g., 6120 in FIGS. 6S and 6T), receiving an input (e.g., 6128 in FIG. 6T) that corresponds to selection of one of the one or more shared credential user interface elements associated with a respective set of one or more authentication credentials, and in response to the receiving the input that corresponds to selection of one of the one or more shared credential user interface element, displaying, via the display generation component, a sharing user interface (e.g., 690e in FIGS. 6AC-6AE) that allows the user to identify a contactable user with which to share the respect set of one or more authentication credentials, a contactable user being a user associated with the first user (e.g., part of the first user's contact list). Limiting credential sharing to existing contacts ensures that information required to properly share is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes, displaying, via the display generation component, an authentication credential management user interface (e.g., password manager interface 690a in FIGS. 6M, 6N, and/or 6P) that includes one or more user interface elements including a sharing affordance (e.g., shared password recommendation affordance 682 in FIG. 6M, plus affordance 684 in FIGS. 6M, 6N, 6P) which allows a user to initiate a process for sharing an authentication credential with another user. Method 800 further includes detecting, via the one or more input devices, an input corresponding to the sharing affordance, and in response to detecting the input corresponding to the sharing affordance, displaying, via the display generation component, one or more sharing group user interface elements (e.g., 682a in FIGS. 6N-6P), each sharing group user interface element corresponding to a respective group of one or more users with which a respective set of one or more authentication credentials has been shared. Method 800 further includes detecting, via the one or more input devices, an input (e.g., 698 in FIG. 6N) corresponding to a respective sharing group user interface element, and in response to detecting the input corresponding to a respective sharing group user interface element, displaying, via the display generation component, an add affordance (6110 in FIG. 6Q or 6118 in FIG. 6R) that allows the first user to add an authentication credentials accessible to the first computing system to the respective set of one or more authentication credentials shared with the respective group of one or more users. An example process for adding an existing credential to a sharing group is discussed above with reference to FIGS. 6R-6T. Activating credential sharing with a share with user interface that allows different sets of authentication credentials to be shared with different groups of people ensures that information required to properly share is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes, while displaying a first data selection user interface (e.g., 690a in FIGS. 6N-6P) including one or more sharing group user interface elements that respectively correspond to a set of one or more users with one or more authentication credentials accessible by the first computing system may be shared, displaying an add affordance (e.g., plus icon 684 in FIGS. 6M-6O), and detecting, via the one or more input devices, an input (e.g., 696 in FIG. 6N) corresponding to selection of the add affordance while displaying the first data selection user interface. In response to detecting the input corresponding to selection of the add affordance while displaying the first data selection user interface, allowing a user to create a new sharing group (e.g., input 6152 in FIG. 6P) with which a set of one or more authentication credentials may be shared or a new set of one or more authentication credentials that may be shared with one or more existing sharing groups, each sharing group being associated with one or more users. An example process for creating a new sharing group is discussed above with reference to FIGS. 6AA-6AG. Allowing a user to create new sharing groups or sets of authentication credentials to be shared ensures that information required to properly share is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes, while displaying a first data selection user interface (e.g., 690a in FIGS. 6N-6P) that includes one or more sharing group user interface elements that respectively correspond to a set of one or more users with which one or more authentication credentials accessible by the first computing system may be shared, receiving an input (e.g., 698 in FIG. 6N) corresponding to a respective one of the one or more sharing group user interface elements, and in response to receiving the input corresponding to a respective sharing group user interface element, displaying, via the display generation component, an edit affordance (e.g., 6104 in FIG. 6Q) that allows a member of the respective sharing group to edit one or more properties associated with the respective sharing group. Allowing a user to edit one or more properties associated with a sharing group ensures that information required to properly share is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes, while displaying a respective sharing group user interface (e.g., 690b in FIG. 6Q), detecting, via the one or more input devices, an input corresponding to selection of an edit affordance (e.g., 6114 in FIG. 6R) in the respective sharing group user interface; and in response to detecting the input corresponding to selection of the edit affordance while displaying the respective sharing group user interface, displaying one or more user interface elements (e.g., 6114 in FIG. 6R) that allows a group member to add a new authentication credential to a set of one more authentication credentials shared with the respective sharing group, where the one or more user interface elements including: a first selectable user interface element for identifying an authentication credential (e.g., 6118 in FIG. 6R); and a second selectable user interface element (e.g., 6116 in FIG. 6R) for associating a remote service with the identified authentication credential. Method 800 further includes in response to receiving one or more inputs identifying an authentication credentials and an associated remote service, making the authentication credential accessible to the first computing system.

Allowing a user to add additional authentication credentials to be shared with an existing sharing group allow the user to more efficiently manage the information shared with the group, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes, detecting, via the one or more input devices, an input (e.g., 6112 in FIG. 6Q and 6114 in FIG. 6R) corresponding to selection of an edit affordance while displaying a respective sharing group user interface; and in response to detecting the input corresponding to selection of the edit affordance while displaying the respective sharing group user interface, displaying one or more user interface elements (e.g., 6126 in FIGS. 6S-6T) that allows a group member to share an authentication credential with the respective sharing group. In response to receiving one or more inputs corresponding to a user interface element that allows a group member to share an authentication credential, adding in accordance with a selection from a listing (e.g., 6128 and 6126 in FIG. 6T) of authentication credentials accessible to the first computing device an authentication credential accessible of the first computing device to a set of one or more credentials shared with the respective sharing group. Allowing a user to share an existing authentication credentials with a group reduce a number of inputs need to share a credential with a group of users, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes, detecting, via the one or more input devices, an input (e.g., 6202 in FIG. 6Q) corresponding to selection of an edit affordance (e.g., 628 in FIG. 6Q) while displaying a respective sharing group user interface (e.g., 690b in FIG. 6Q); and in response to detecting the input corresponding to selection of the edit affordance while displaying a respective sharing group user interface (e.g., 690b in FIG. 6Q), displaying one or more user interface elements (e.g., 648 in FIG. 6W) that allows a group member to edit an authentication credential currently shared with the respective sharing group. Allowing a user to edit an authentication credential previously shared with a group of users ensures that the shared credentials remains up to date, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes, detecting, via the one or more input devices, an input (e.g., 6208 in FIG. 6AI) corresponding to selection of an edit affordance (e.g., 6104 in FIG. 6AI) while displaying a respective sharing group user interface (e.g., 690b in FIG. 6AI); and in response to detecting the input corresponding to selection of the edit affordance while displaying the respective sharing group user interface (e.g., 690h in FIG. AJ), displaying one or more user interface elements (e.g., 6210 and 6214 in FIG. 6AJ) that allows a group member to stop sharing an existing authentication credential (e.g., a shared password or passkey) with the respective sharing group.

Allowing a user to stop sharing an authentication credential a group of users ensures proper access control and security, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes, detecting, via the one or more input devices, an input (e.g., 6188 in FIG. 6Q) corresponding to selection of a respective sharing group user interface element; and in response to detecting the input corresponding to selection of the respective sharing group user interface element, displaying, via the display generation component, a group member element (e.g., 6156 in FIG. 6AG) which identifies (e.g., lists) one or more users (e.g., 6156a in FIG. 6AG) associated with the respective sharing group.

Displaying a user interface element that identifies the users/members of a respective sharing group reduces the input needed for the user to manage the sharing group, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the group member element (e.g., 6156 in FIG. 6AG) further identifies for one or more users associated with the respective sharing group a current state (e.g., 6156*b* in FIG. 6AG) (e.g., invited, declined, or joined) of the user with respect to an invitation to join the group.

Displaying a user interface element that identifies a current state, e.g., invited or joined, of the users/members of a respective sharing group reduces the input needed for the user to manage the sharing group, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes, displaying, via the display generation component, an authentication credential management user interface (e.g., password manager interface) that includes one or more credential user interface elements (e.g., saved passwords) corresponding to one or more authentication credentials associated with the first user; and detecting, via the one or more input devices, an input corresponding to selection of a respective credential user interface element.

Method 800 further includes in response to detecting the input (e.g., 6206 in FIG. 6M, 6102 in FIG. 6N or 6202 in FIG. 6Q), corresponding to selection of the respective credential user interface element (e.g., 628 in FIGS. 6M, 6I, and 6Q), displaying, via the display generation component, a credential management user interface (e.g., 690*c* in FIGS. 6U and 6W) including one or more property setting elements (e.g., 648, 658, 648, or 6130 in FIGS. 6U and 6W, or) associated with the respective authentication credential (e.g., saved password or passkey) that allows the first user to edit one or more settings related to the respective authentication credential.

Displaying a credential management user interface including one or more property setting elements associated with the respective authentication credential (e.g., saved password or passkey) that allows the user to edit one or more property settings related to the respective authentication credential, reduces the input needed for the user to manage shared credentials, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes, detecting, via the one or more input devices, an input (e.g., 6132 in FIG. 6U) corresponding to selection of a respective first one (e.g., 6130 in FIG. 6U) of the one or more property setting elements; and in response to detecting the input corresponding to selection of the respective first one of the one or more property setting elements initiating a process (e.g., 6136 in FIG. 6V) for sharing the respective authentication credential (e.g., saved password or passkey) with another user. Displaying a credential management user interface including one or more property setting elements associated with the respective authentication credential (e.g., saved password or passkey) that allows the user to edit a shared with property related to the respective authentication credential, reduces the input needed for the user to manage shared credentials, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes detecting, via the one or more input devices, an input (e.g., 6132 in FIG. 6U) corresponding to selection of a respective second one (e.g., 6136 in FIG. 6V) of the one or more property setting elements; and in response to detecting the input corresponding to selection of the respective second one of the one or more property setting elements initiating a process for sharing the respective authentication credential (e.g., saved password or passkey) with a group of one or more users. Displaying a credential management user interface including one or more property setting elements associated with the respective authentication credential (e.g., saved password or passkey) that allows the user to edit a shared with group property related to the respective authentication credential, reduces the input needed for the user to manage shared credentials, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes detecting input (e.g., 6146 in FIG. 6X) corresponding to selection of a respective third one of the one or more property setting elements; and in response to detecting the input corresponding to selection of the respective third one of the one or more property setting elements initiating a process (e.g., 6150 in FIG. 6Y) for ceasing to share the respective authentication credential with a particular user or a particular group of users. Displaying a credential management user interface including one or more property setting elements associated with the respective authentication credential (e.g., saved password or passkey) that allows the user to stop sharing the respective authentication credential, reduces the input needed for the user to manage shared credentials, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes receiving, via the one or more inputs, one or more inputs (e.g., 5164 in FIG. 6AB) that correspond to a request to a share one or more authentication credentials with a contactable user (e.g., part of the first user's contact list); and in response to receiving one or more inputs (e.g., 6166 in FIG. 6AD and 6172 in FIG. 6AE) identifying a contactable user with which to share an authentication credential, sending, via a messaging application associated with the first computing system, a notification (e.g., 6178 in FIG. 6AF) to the contactable user associated with a third computing system (e.g., smart phone, tablet, and/or computer) inviting the contactable user to participate in a shared credential group with the first user. Using a messaging application to notify a user of an invitation to share an authentication credential, reduces the input needed for the user to manage shared credentials, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes in response to receiving the one or more inputs identifying a contactable user (e.g., 6170 in FIG. 6AE) with which to share an authentication credential, displaying, via the display generation component, a messaging prompt (e.g., 6176 in FIG. 6AF) indicating initiation of the invitation of the contactable user prior to sending the notification. Displaying a messaging prompt indicating initiation of an invitation to share with a user prior to sending, reduces accidental sharing, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes while display the messaging prompt indicating initiation of the invention of the contactable user, pre-populating the messaging prompt with content (e.g., 6178 in FIG. 6AF) announcing the first user's invitation to the contactable person to participate in an authentication credential sharing group. Displaying a pre-populated messaging prompt, reduces the input needed for the user to manage shared credentials, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes while displaying an authentication credential management user interface (e.g., password manager interface 690a in FIG. 6O) that includes one or more credential user interface elements (e.g., 628 in FIG. 6O) (e.g., saved passwords or passkeys) corresponding to one or more authentication credentials associated with the first user, in accordance with a determination of receipt of one or more invitations for the first user to participate in an authentication credential sharing group initiated by one or more other users, displaying, via the display generation component, a respective invitation element (e.g., 686 in FIG. 6O) for one or more different received invitations. Displaying a respective invitation element for a received invitation to share an authentication credential, reduces the input needed for the user to manage shared credentials, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes while displaying, via the display generation component, a first data selection user interface (e.g., 690a in FIG. 6N) that includes a first sharing group user interface element (e.g., 682a in FIG. 6N) that corresponds to a set of one or more users with which one or more authentication credentials accessible by the first computing system have been shared, in accordance with a determination of receipt of acceptance, by the first user, of an invitation to participate in an authentication credential sharing group received from a second user, displaying a second sharing group user interface element (e.g., 682b in FIGS. 6N-6P) indicating a credential sharing group (e.g., "rowing club" in FIGS. 6N-6P) corresponding to the accepted invitation, the second sharing group user interface element (e.g., 690b in FIG. 6AK) including an add affordance (e.g., 6108 in FIG. 6AK) that allows the first user to add additional users to the respective sharing group; and in response to receiving an input (e.g., 6214 in FIG. 6AK) corresponding to the add affordance (e.g., 6108 in FIG. 6AK), displaying, via the display generation component, one or more user interface elements (e.g., 690e in FIGS. 6AC-6AE) that identify a contactable user and adding the contactable user to the respective sharing group. Allowing invited members of a sharing group to additional users/members to the group, reduces the input needed for the user to manage shared credentials, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes receiving a request (e.g., 6214 in FIG. 6AK) to display information about a respective group that shares authentication credentials; and in response to receiving the request, displaying a user interface (e.g., 690i in FIG. 6AL) that includes information about the respective group, including: in accordance with a determination that a user (e.g., a user who created or has management privileges for the respective group) has enabled an ability of the first user to add additional users (e.g., 6198a in FIG. 6AH) to the respective sharing group, displaying the second sharing group element with an add affordance (e.g., 6158 in FIG. 6AL) that, when selected, initiates a process for adding additional users to the respective sharing group; and in accordance with a determination that a user (e.g., a user who created or has management privileges for the respective group) has disabled an ability of the first user to add additional users (e.g., 6198c in FIG. 6AH) to the respective sharing group, displaying the second sharing group element (e.g., 6158b in FIG. 6AL) without an active add affordance for adding additional users to the respective sharing group.

Disabling or removing an add affordance in accordance with whether the creator of the group has disabled the feature, allows more efficient control or group membership, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes in accordance with determination of receipt of acceptance, by the first user, of an invitation to participate in an authentication credential sharing group received from another user displaying a sharing group user interface element (e.g., 682b in FIGS. 6N-6P) indicating a credential sharing group corresponding to the accepted invitation. The method further includes detecting, via the one or more input devices, an input corresponding to the sharing group user interface element; and in response to detecting the input corresponding to the sharing group user interface element, displaying, via the display generation component, a sharing group user interface (e.g., 690*j* in FIG. 6AK) that includes a change (e.g., edit and/or delete) credential affordance (e.g., 6104 in FIG. 6AK).

In some embodiments, method 800 further includes while displaying the sharing group user interface (e.g., 690*b* in FIG. AI) including a change credential affordance (e.g., 6104 in FIG. 6AI), detecting a sequence of one or more inputs including an input (6208 in FIG. 6AI) corresponding to selection of the change credential affordance; and in response to detecting the sequence of one or more inputs (6210 and 624 in FIG. 6AJ), changing an authentication credential shared with the respective sharing group. Allowing invited members to change a shared authentication credential associated with the group, ensures that the shared credentials remains up to date, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes receiving a request to create a group for sharing credentials (e.g., 6152 in FIG. 6P); and in response to receiving the request to create the group for sharing credentials: in accordance with a determination that the request to create the group for sharing credentials included acceptance of a suggestion (e.g., 682 in FIG. 6M) to create a group based on a set of users with whom the user has a predetermined relationship (e.g., a family sharing group, a work group, or a friend group), displaying a group creation user interface (e.g., 690*m* in FIG. 6AA) with at least a subset (or all of) the users with whom the user has the predetermined relationship suggested as participants in the group for sharing credentials; and in accordance with a determination that the request to create the group for sharing credentials included selection of a group creation affordance independent of any suggestions to create groups, displaying the group creation user interface (e.g., 690*d* in FIG. 6AA) without displaying users with whom the user has the predetermined relationship suggested as participants in the group for sharing credentials.

Displaying, a credential sharing user interface that includes one or more user interface elements that include: a first group element that corresponds to a first category where the associated member users all meet a first criteria (e.g., all associated with the same family account); and an create group element that allows a user to add a user defined group, reduces the input needed for the user to manage shared credentials, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the first category corresponds to a family group and the first criteria corresponds to users associated with the same family account (e.g., a group of users who share content and/or permissions and optionally share a set of payment credentials used to make digital purchases of content). Displaying a first group element that corresponds to a family where the associated member users are all associated with the same family account, reduces the input needed for the user to manage shared credentials, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the method 800 further includes in response to receiving a request (e.g., 5164 in FIG. 6AB, 6198*d* in FIG. 6AH) to change membership of an existing group (e.g., a request to add or remove one or more member users from an existing group), from a respective member of the existing group, changing membership of the existing group based on the request from the respective member (e.g., allowing the requesting member to adding or removing one or more member users from the existing group). Allowing members to add or remove other members associated with the group, reduces the input needed for user/members to manage shared credential groups, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the method 800 further includes displaying, via the display generation component, an authentication credential management user interface (e.g., password manager interface 690*a* in FIGS. 6N-6P) that includes a plurality of credential sharing group user interface elements (e.g., 682*a* in FIGS. 6N-6P), a credential sharing group user interface element corresponding to a respective different sharing group with which a set of one or more authentication credentials has been shared. Displaying an authentication credential management user interface that includes a plurality of credential sharing group elements, a credential sharing group element corresponding to a respective different sharing group with which a set of one or more authentication credentials has been shared, reduces the input needed for users to manage shared credential groups, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the method 800 further includes detecting, via the one or more input devices, an input corresponding to a respective credential sharing group user interface element; and in response to detecting the input corresponding to the respective credential sharing group user interface element, displaying, via the display generation component, a sharing group user interface that includes a plurality of group parameter user interface elements (e.g., 682*a* and 682*b* in FIG. 6N), including a first group user interface element that displays information (e.g., number of members and/or number of credentials shared with the group) about the respective group. Displaying group parameter elements that display information (e.g., number of members and/or number of credentials shared with the group) about the respective group, reduces the input needed for users to manage shared credential groups, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the method 800 further includes while displaying the authentication credential management user interface, displaying a search user interface (e.g., 622 in FIGS. 6N-6P) element that allows a user to search for a particular sharing group or authentication credential accessible to the first computing system. Displaying a search element that allows a user to search for a particular sharing group, reduces the input needed for user to manage shared credential groups, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the method 800 further includes while displaying the authentication credential management user interface (e.g., 690a in FIGS. 6N-6P) displaying an authentication credential listing user interface element (e.g., 628 in FIGS. 6N-6P) that identifies one or more authentication credentials (e.g., saved passwords or passkeys) associated with the first user. Displaying an authentication credential listing that identifies authentication credentials (e.g., saved passwords or passkeys) associated with the user, reduces the input needed for user to manage credentials, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges. In some embodiments, the authentication credential listing user interface element (e.g., 628 in FIGS. 6N-6P) concurrently displays representations of multiple authentication credentials associated with the first user.

In some embodiments, the method 800 further includes while displaying the authentication credential management user interface (e.g., 690a in FIGS. 6N-6P), displaying a security user interface element (e.g., 626 in FIGS. 6N-6P) that identifies potential security issues with one or more authentication credentials (e.g., saved passwords or passkeys) associated with the first user. Displaying a security recommendation identifying potential security issues with an authentication credentials (e.g., saved passwords or passkeys) associated with the user, increases security and reduces the input needed for user to manage credentials, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the method 800 further includes displaying, via the display generation component, an authentication credential management user interface (e.g., password manager interface 690a in FIGS. 6N-6P) that includes concurrently displaying representations of a plurality of selectable credential user interface elements (e.g., 626 in FIGS. 6N-6P), wherein one or more representations of the plurality of authentication credentials that are shared with at least one other user are visually distinguished (e.g., the authentication credential is badged with a share icon (e.g., 6140 in FIGS. 6N and 6W) or displayed with a different color or font) from one or more representations of authentication credentials that are not shared with other users. Displaying selectable credential elements corresponding to a plurality of different authentication credentials associated with a user, reduces the input needed for a user to manage credentials, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the method 800 further includes in response to detecting an input corresponding to selection of a respective credential user interface element (e.g., 628 in FIGS. 6N-6P), displaying, via the display generation component, a credential user interface (e.g., 690c in FIGS. 6W-6X) including one or more user interface elements including a first user interface element indicating one or more groups (e.g., by number 6142 in FIG. 6W or by name 6144 in FIG. 6X) with which the respective authentication credential is currently shared. Displaying a credential user interface including one or more user interface elements including a first user interface element indicating one or more groups (e.g., by group name) with which the respective authentication credential is currently shared, reduces the input needed for a user to manage credentials, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the method 800 further includes detecting, via the one or more input devices, an input corresponding to selection of a respective credential user interface element (e.g., 628 in FIGS. 6N-6P); and in response to detecting the input corresponding to selection of the respective credential user interface element, displaying, via the display generation component, a credential user interface (e.g., 690c in FIGS. 6W-6X) including one or more user interface elements including a second user interface element (e.g., by number 6142 in FIG. 6W) indicating a number of groups with which the respective authentication credential is currently being shared. Displaying a credential user interface including one or more user interface elements including a first user interface element indicating one or more groups (e.g., by group name) with which the respective authentication credential is currently shared, including a second user interface element indicating a number of groups with which the respective authentication element is currently being shared, reduces the input needed for a user to manage credentials, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the method 800 further includes detecting, via the one or more input devices, an input corresponding to selection of a respective credential user interface element (e.g., 628 in FIGS. 6N-6P); and in response to detecting the input corresponding to selection of the respective credential user interface element, displaying, via the display generation component, a credential user interface (e.g., 690c in FIGS. 6V and 6X) including one or more user interface elements including a third user interface element that, when selected, initiates a process (e.g., 6136 in FIGS. 6V and 6X) for adding the respective authentication credential to a new group. In some embodiments, the method 800 further includes detecting, via the one or more input devices, an input corresponding to selection of the third user interface element; and in response to detecting the input corresponding to selection of the third user interface element, adding the respective authentication credential to a new group while removing the respective authentication credential from any existing group with which the respective authentication credential has been shared. Adding a respective authentication credential to a new group while removing the respective from any existing group with which the respective authentication credential has been shared, reduces the input needed for a user to manage credentials, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the method 800 further includes detecting, via the one or more input devices, an input corresponding to selection of a respective credential user interface element (e.g., 628 in FIGS. 6N-6P); and in response to detecting the input corresponding to selection of a respective credential user interface element, displaying, via the display generation component, a credential user interface including one or more user interface elements (e.g., 690c in FIGS. 6V and 6X) including a third user interface element (e.g., 6136 in FIGS. 6V and 6X) that, when selected, initiates a process for adding the respective authentication credential to a new group; detecting, via the one or more input devices, an input corresponding to selection of the third user interface element; and in response to detecting the input corresponding to selection of the third user interface element, adding the respective authentication credential to a new group by copying the respective authentication credential from an existing group with which the respective authentication credential has been shared without synchronizing the respective authentication credential between the new group and the existing group. Adding a respective authentication credential to a new group by copying the respective authentication credential from an existing group with which the respective authentication credential has been shared without synchronizing the respective authentication credential between the new group and the existing group, reduces the input needed for a user to manage credentials, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the method 800 further includes detecting, via the one or more input devices, an input corresponding to selection of a respective credential user interface element; in response to detecting the input corresponding to selection of a respective credential user interface element (e.g., 628 in FIGS. 6N-6P), displaying, via the display generation component, a credential user interface (e.g., 690c in FIGS. 6V and 6X) including one or more user interface elements including a third user interface element (e.g., 6136 in FIGS. 6V and 6X) that, when selected, initiates a process for adding the respective authentication credential to a new group; detecting, via the one or more input devices, an input corresponding to selection of the third user interface element; and in response to detecting the input corresponding to selection of the third user interface element, adding the respective authentication credential to a new group by copying the respective authentication credential from an existing group with which the respective authentication credential has been shared and synchronizing the respective authentication credential between the new group and the existing group. Adding a respective authentication credential to a new group by copying the respective authentication credential from an existing group with which the respective authentication credential has been shared and synchronizing the respective authentication credential between the new group and the existing group, reduces the input needed for a user to manage credentials, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes receiving, via the one or more input devices, one or more inputs (e.g., tapping on a remote service affordance/icon 604 in FIG. 6A) that correspond to a third request to provide, to a remote service (e.g., media streaming service, remote messaging service, and/or remote content providing service) that requires authentication, an authentication credential (e.g., password or passkey) and in response to receiving the third request in accordance with the authentication credential having been shared with another user, displaying, via the display generation component, a selectable user interface element (e.g., affordance 614 in FIG. 6B) corresponding to an authentication credential associated with the remote service and including an indication (e.g., badge or glyph 614a in FIG. 6B) the authentication credential is shared. Displaying an indication of shared credential ensures that information required to properly share credentials is received, thereby ensuring proper data privacy and security. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the indication that the authentication credential is shared (e.g., badge 614a in FIG. 6A) is a badge or glyph associated with sharing data. Displaying a badge or glyph to indicate that a specific credential has been shared ensures the user can easily determine which credentials have been shared with other users, thereby ensuring proper data privacy and security. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the badge or glyph displayed (e.g., 614a in FIG. 6A) to indicate an authentication credential is shared is the same for a plurality of different shared authentication credentials. Displaying the same badge or glyph to indicate a credential has been shared provides consistency preventing user confusion and ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 800 further includes in response to receiving a request to provide, to a remote service (e.g., media streaming service, remote messaging service, and/or remote content providing service) that requires authentication, displaying, via the display generation component, a selectable user interface element (e.g., 614 in FIG. 6B) corresponding to an authentication credential associated with the remote service in an autofill user interface (e.g., inline near a credential entry field 618 in FIG. 6B, or near a text entry user interface 610 in FIG. 6B such as a software keyboard). Displaying an authentication credential associated with a remote service in an autofill interface reduces a number of inputs needed to perform when accessing the remote service and makes operation of the computing system faster and more efficient, which conserves power and, for battery devices, increases the time between battery charges.

In some embodiments, method 800 further includes receiving an indication that one or more users have been added to a group of users with which a respective set of one or more authentication credentials has been shared, and in response to receiving the indication that one or more users have been added notifying (e.g., a wake screen notification, notification in a password user interface, and/or a banner notification overlaid on another user interface such as an active application or system user interface) the group of users of the addition to the group of users. Notifying members of a group which is sharing an authentication credential of an addition to the group ensures that information required to properly share credentials is received, thereby ensuring proper data privacy and security. Ensuring proper action of functions and reducing errors enhances the operability of the computing system and makes the user-device interface more efficient, making operation of the computing system faster and more efficient, which conserves power and, for battery devices, increases the time between battery charges.

Method 900, which is performed (902) at (and thus performed by) a first computing system (e.g., smart phone, tablet, and/or computer) that is in communication with a display generation component (e.g., a display controller, a touch-sensitive display system, and/or an integrated or connected display device) and one or more input devices (e.g., touch-sensitive surface; mouse, pencil, and/or gesture capture device) includes: receiving (904) an input (e.g., tapping remote service affordance/icon 630 in FIG. 6D and/or inputs 6183 and 1636 in FIGS. 6AM and 6AN) corresponding to a request to display a respective portion (e.g., interface 620g in FIG. 6AO) of an authentication credential management user interface (e.g., a password, passcode, or passkey management user interface) for authentication credential management software that includes options for managing one or more shared credentials that are shared between the user of the first computing system with one or more other users. In some embodiments, the request is selection of a notification (e.g., notification 697 in FIG. 6AP) that a respective credential has been deleted from a shared group, or that the user has been removed from a shared group that included the shared credential. In some embodiments, the request (e.g., inputs 6183 and 1636 in FIGS. 6AM and 6AN) is a request to display a credential detail view (e.g., interface 620g in FIG. 6AO) for the respective credential. In some embodiments, the request is a request to display one or more recently deleted credentials (e.g., input 6183 in FIG. 6AM).

In response to receiving (906) the input corresponding to the request to display the respective portion of the authentication credential management user interface, displaying, via the display generation component, the respective portion of the authentication credential management user interface (e.g., password management interface 620f in FIG. 6AN) that includes one or more credential user interface elements (e.g., remote service elements 636c in FIG. 6AN) corresponding to different authentication credentials associated with a first user of the first computing system (e.g., because the different authentication credentials are stored at the first computer system or retrieved from remote storage that is accessible to the first computer system), including, in accordance with a determination that a respective authentication credential that was previously shared with a group of users including the first user of the first computing system and one or more other users is no longer shared with the group of users including the first user of the first computing system and the one or more other users, displaying, via the display generation component, one or more user interface elements (e.g., move to my passwords icon 695c, a recover icon 695b, or password field element 695a in FIG. 6AO) associated with retaining a copy of the respective authentication credential. In addition, while displaying (908) the respective portion of the authentication credential management user interface, detecting an input (e.g., input 1636 in FIG. 620f) directed to a respective user interface element of the one or more user interface elements associated with the respective authentication credential, and in response to detecting (910) the input directed to a respective user interface element, initiating a process for retaining a copy of the respective authentication credential in the authentication credential management software.

Allowing a user to retain a copy of disassociated authentication credential provides a more efficient way of managing previously shared authentication credentials, thereby ensuring proper data security, and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the respective authentication credential is no longer shared with the group of users including the first user of the first computing system and the one or more other users because the first user of the first computing system is no longer a member of the group of users. In some embodiments, the process for changing membership of a respective sharing group includes displaying a sharing group interface (e.g., 690F in FIG. 6AG) that allows a user/member to select one or more options, for example, a member to be removed from the group (e.g., 6198d in FIG. 6AH, to leave the group (e.g., 6191 in FIG. 6AG), or to disband the group (e.g., 6192 in FIG. 6AG). Disassociating authentication credentials from removed members when there is a change in the membership of the shared group provides consistency preventing user confusion and ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the first user of the first computing system is no longer a member of the group because the first user left the group (e.g., tapping on the leave group affordance 6191 while displaying edit group interface 690*f*). In some embodiments, the process for a member leaving a includes displaying a sharing group interface that allows a user/member to select one or more options, for example, a member to be removed from the group, to leave the group, or to disband the group. Disassociating shared authentication credentials when a member leaves a group with which they are shared provides consistency preventing user confusion and ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the first user of the first computing system is no longer a member of the group because the first user was removed from the group by one or more other users in the group (e.g., tapping on the remove member affordance 6198*d* while display interface 690*f* in FIG. 6AH). Disassociating shared authentication credentials when group owner removes a member from the group with which they are shared provides consistency preventing user confusion and ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the first user of the first computing system is no longer a member of the group because the group was disbanded (e.g., the group has ceased to exist because one or more of the members of the group requested to close or delete the group by tapping the delete affordance 6192 in FIG. 6AG). Disassociating shared authentication credentials from members of a group when the group owner disbands the group with which they are shared provides consistency preventing user confusion and ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges In some embodiments, disbanding a group includes returning the one or more authentication credentials shared with the disbanded group to their respective user who contributed them to the disbanded group. In some embodiments, the individual credentials shared with a disbanded group are returned by default to the individual members/user who contributed them to the disbanded group. Returning shared authentication credentials to their respective user/owns who contributed them when a group is disbanded ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 900 further includes, receiving a request (e.g., input 630 in FIG. 6D, input 6102 in FIG. 6N, input 6202 in FIG. 6Q, and/or input 1636 in FIG. 6AN) to display information about a respective authentication credential (e.g., saved password or passkey) shared with a group, and in response to receiving the request, displaying a detailed credential user interface (e.g., interface 620*c* in FIG. 6F, interface 620*e* in FIG. 6K, interface 690*c* in FIG. 6W, and/or interface 620*g* in FIG. 6A) that includes information about the respective authentication credential, including one or more selectable user interface objects (e.g., elements 636 and 640, 642, and 644 in FIG. 6F and/or elements 695*a*-695*d* in FIG. 6AO) associated with the respective authentication credentials (e.g., saved password or passkey). In addition, while displaying the detailed credential user interface that includes the one or more selectable user interface objects associated with the respective authentication credential method 900 may further include receiving one or more inputs (e.g., selecting the contents of the password field 695*a* in FIG. 6AO) corresponding to a respective one of the one or more selectable user interfaces elements and in response to receiving the one or more inputs corresponding to a respective one of the one or more selectable user interface elements, copying the respective authentication credential and associating the copied authentication credential with the first user of the first computing system (e.g., saving the copied authentication credential to a location that is accessible to the first computing system).

In some embodiments, users other than the user of the first computer system, which whom the respective authentication credential has been shared may be presented with the same and/or similar user interface elements (e.g., 695*a* and 695*b* in FIG. 6AO) allowing them to copy/save a formerly shared authentication credential while other user interface elements (e.g., greyed out elements 695*c* and 695*d* in FIG. 6AO) are disabled or removed.

Allowing members of a shared group to copy and save a respective authentication credential shared with the group ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the respective authentication credential is no longer shared with the group of users including the first user of the first computing system and the one or more other users because the respective authentication credential has been changed (e.g., deleted or removed from the sharing group) (e.g., by tapping delete shared passkey affordance 664 in FIG. 6I, or tapping stop sharing password affordance 6148*a* in FIG. 6Y).

Disassociating authentication credentials from members of a shared group when there is a change to the authentication credential ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the respective authentication credential has been removed from the group of users including the first user of the first computing system and the one or more other users (e.g., tapping on move to my password affordance 1695 in FIG. 6AO). Disassociating an authentication credential from members of a shared group when the authentication credential is removed from the group ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 900 further includes receiving a request (e.g., input 1636 in FIG. 6AN) to display information about a respective authentication credential (e.g., saved password or passkey) which has been shared with a group of users including the first user of the first computing system and one or more other users, and in response to receiving the request, displaying a detailed credential user interface (e.g., interface 620*g* in FIG. 6AO) that includes information about the respective authentication credential, including, in accordance with a determination that the first user of the first computing system contributed the respective authentication credential to the group of users including the first user and the one or more other users, a move affordance (e.g., move to my passwords affordance 695*c* in FIG. 6AO) that allows the first user of the first computing system, as the contributor, to move the respective authentication credential from the group of users including the first user of the first computing system and the one or more other users.

Only allowing a user who contributed an authentication credential to a shared group to move the authentication credential from the shared group ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 900 further includes receiving a request (e.g., input 1636 in FIG. 6AN) to display information about a respective authentication credential (e.g., saved password or passkey) which has been shared with a group of users including the first user of the first computing system and one or more other users, and in response to receiving the request, displaying a detailed credential user interface (e.g., interface 608*f* in FIG. 6L) that includes information about the respective authentication credential. Displaying the detailed credential user interface including: in accordance with a determination that the first user of the first computing system did not contribute the respective authentication credential to the group of users including the first user and the one or more other users, displaying a credential field (e.g., password field 636*b* in FIG. 6L) that allows the first user of the first computing system to copy the respective authentication credential, and a delete affordance (e.g., delete password affordance 644 in FIG. 6L) which allows the first user of the first computer system as member of the group of users with which the respective authentication credential is shared to mark the respective authentication credential for deletion.

Allowing members of a shared group to copy and then delete an authentication credential shared with the group ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the respective authentication credential is no longer shared with the group of users including the first user of the first computing system and the one or more other users because the respective authentication credential has been marked for deletion (e.g., input 664 in FIG. 6I and/or input 6150 in FIG. 6Y). Disassociating an authentication credential from members of a shared group when the authentication credential is deleted ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, the respective authentication credential is marked for deletion (e.g., input 664 in FIG. 6I) by the first user of the first computing system and/or the one or more other users with whom the respective authentication has been shared. Allowing members of a shared group to delete a respective authentication credential irrespective of whether the member contributed the respective authentication credential ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges In some embodiments, method 900 further includes automatically deleting (e.g., notification 695*e* in FIG. 6AO) one or more authentication credentials that were marked for deletion after a threshold amount of time has elapsed since the one or more authentication credentials were marked for deletion (e.g., 30, 60 or 90 days). In some embodiments the contributor of an authentication credential marked for deletion my request (e.g., by tapping delete password affordance 695*d* while display interface 620*g* in FIG. 6AO) permanent deletion of the authentication credential prior to lapse of the threshold amount of time. Automatically deleting authentic credentials from a recently deleted folder have a threshold time period ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 900 further includes receiving a request (e.g., input 6183 in FIG. 6AM) to display information about one or more authentication credentials marked for deletion by a second user which is a member of a sharing group of which the first user is also a member and with which the authentication credential was shared and in response to receiving the request to display information about the authentication credentials marked for deletion, displaying a marked for deletion credential user interface (e.g., interface 620f in FIG. 6AN) that includes information about one or more authentication credentials (e.g., 636c in FIG. 6AN) marked for deletion and associated with the first user. The marked for deletion credential user interface including, in accordance with a determination that the first user contributed the deleted authentication credential, displaying a delete affordance (e.g., delete password affordance 695d in FIG. 6AO) which allows the first user to accelerate permanent deletion of the deleted authentication credential. In some embodiments, in accordance with a determination that the first user did not contribute the authentication credential marked for deletion the first user is not provided (e.g., greyed out delete password affordance 695d in FIG. 6AO) means to accelerate permanent deletion of the authentication credential marked for deletion.

Allowing the user who contributed an authentication credential to accelerate permanent deletion of the authentication credential ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 900 further includes receiving a request (e.g., input 6183 in FIG. 6AM) to display information about one or more authentication credentials marked for deletion by a second user which is a member of a sharing group of which the first user is also a member and with which the authentication credential was shared and in response to receiving the request to display information about the authentication credentials that have been marked for deletion, displaying a user interface (e.g., 620g in FIG. 6AO) that includes information about authentication credentials associated with the first user that have been marked for deletion, including a recover affordance (e.g., recover affordance 695b in FIG. 6AO) which allows the first user to recover one or more of the authentication credentials that have been marked for deletion. In addition, while displaying the user interface (e.g., 620g in FIG. 6AO) including information about authentication credentials associated with the first user that have been marked for deletion, detecting an input (e.g., input 1695b in FIG. 6AO) directed to the recover affordance; and in response to detecting the input directed to the recover affordance initiating a process for recovering a respective one of the one or more authentication credentials that have been marked for deletion.

Allowing members of a shared group to recover authentication credentials deleted from the shared group allows the contributor of an authentication credential to maintain formerly shared credentials, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiment, method 900 further includes receiving a request (e.g., input 6183 in FIG. 6AM) to display information about one or more authentication credentials marked for deletion and associated with the first user and in response to receiving the request to display information about authentication credentials marked for deletion and associated with the first user, displaying a marked for deletion credential user interface (e.g., interface 620f in FIG. 6AN) that concurrently displays a first user interface element (e.g., elements 636c in FIG. 6An) corresponding to a first authentication credential marked for deletion and shared with a first group (e.g., group 636d in FIG. 6AN) of users including the first user for the first computing system and a second user and a second user interface element (e.g., elements 636f in FIG. 6AN) corresponding to a second authentication credential marked for deletion and shared with a second group (e.g., group 636e in FIG. 6AN) of users including the first user of the first computing device and at least a third user. Displaying authentication credentials corresponding to authentication credentials deleted from one or more shared groups ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 900 further includes while displaying the marked for deletion credential user interface (e.g., 620f in FIG. 6AN) that includes one or more credential user interface elements (e.g., elements 636c and 636f in FIG. 6AN) corresponding to different authentication credentials deleted from one or more sharing groups, displaying an indication (e.g., indications 636d and 636e in FIG. 6AN) from which group the respective deleted authentication credentials where deleted. In some embodiments, the marked for deletion credential user interface displays a first authentication credential marked for deletion which was formerly shared with a first group using a first identifier and a second authentication credential marked for deletion which was formerly shared with a second group using a second identifier. In addition, in a case that multiple authentication credentials marked for deletion were formerly shared with the same group, the same group identifier is used.

Displaying an indication of which group(s) deleted authentication credentials were deleted from ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 900 further includes while displaying a marked for deletion credential user interface (e.g., interface 620f in FIG. 6AN) that includes one or more credential user interface elements corresponding to different authentication credentials deleted from one or more sharing groups, detecting, via the one or more input devices, an input (e.g., input 1636 in FIG. 6AN) corresponding to selection of a respective one of the different authentication credentials marked for deletion, and in response to detecting the input corresponding to selection of a respective one of the different authentication credentials marked for deletion while displaying the marked for deletion credential user interface, displaying a detailed credential view (e.g., interface 620g in FIG. 6AO). The detailed credential view including a first user interface element (e.g., 695*b* in FIG. 6AO) that allows the first user to restore the respective one of the different authentication credentials marked for deletion to the sharing group from which it was deleted, or to a folder associated with the first user.

Allowing users to restore a deleted credential to the group from which it was deleted or another folder associated with the user ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges In some embodiments, method 900 further includes receiving a request (e.g., input 664 in FIG. 6I and/or input 6150 in FIG. 6Y) to mark an authentication credential shared with one or more sharing groups for deletion and contributed by a member of the one or more sharing groups, and in response to receiving the request to mark a shared authentication credential for deletion sending a notification (e.g., wake screen notification, and/or banner notification displayed over a different application or system user interface) (e.g., security notification 697 in FIG. 6AP) to the contributing member that the authentication credential has been deleted. (Notifying the contributor of a shared authentication credential when the contributed authentication credential has been deleted ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.)

In some embodiments, method 900 further includes a receiving a request (e.g., input 664 in FIG. 6I and/or input 6150 in FIG. 6Y) to mark an authentication credential shared with one or more sharing groups for deletion and in response to receiving the request to mark a shared authentication credential for deletion moving the authentication credential requested to be deleted from the one or more sharing groups to a recently deleted collection (e.g., elements 636*c* or 636*f* in FIG. 6AN). Moving shared authentication credentials that have been deleted to a recently deleted folder ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 900 further includes in accordance with a determination that one or more shared authentication credentials associated with the first user are no longer being shared, displaying a user interface element (e.g., wake screen notification, banner notification displayed over a different application or system user interface, and/or notification in the password manager interface) (e.g., security notification 697 in FIG. 6AP) which alerts that first user that one or more authentication credentials should be reviewed and/or modified. Alerting a user when a shared authentication credential is no longer being shared ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges In some embodiments, method 900 further includes while displaying a detailed credential user interface (e.g., interface 690*aa* in FIG. 6AM) that includes information about a respective authentication credential, including one or more property setting elements (e.g., elements 680 and 628 in FIG. 6F) associated with the respective authentication credentials that allows the first user to edit one or more settings related to the respective authentication credential, in accordance with a determination that the respective authentication credential is no longer being shared, displaying, via the display generation component, a user interface element (e.g., a security recommendations element 626 in FIG. 6AM) which alerts that first user that the respective authentication credential was previously shared (e.g., and that it should be reviewed and/or modified). In some embodiments, if the respective authentication credential is still being shared with the sharing group the user interface element (e.g., security recommendation element) is not displayed.

Alerting a user when a shared authentication credential is no longer being shared ensures that information required to properly share credentials is received, thereby ensuring data privacy and security. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 900 further includes while displaying the authentication credential management user interface (e.g., password management interface 690*aa* in FIG. 6AM) that includes one or more credential user interface elements (e.g., 628 in FIG. 6AM) corresponding to different authentication credentials associated with a first user, in accordance with a determination that one or more shared authentication credentials associated with the first user are no longer being shared, displaying, via the display generation component, a user interface element (e.g., a security recommendations element 626 in FIG. 6AM) which alerts that first user that one or more authentication credentials were previously shared. (e.g., and that it should be reviewed and/or modified). In some embodiments, if the shared authentication credentials associated with the first user are still being shared with the sharing group the user interface element (e.g., security recommendation element) is not displayed.

Alerting a user when a shared authentication credential is no longer being shared ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges In some embodiments, method 900 further includes while displaying the authentication credential management user interface (e.g., password management interface 690*aa* in FIG. 6AM) that includes one or more credential user interface elements corresponding to different authentication credentials associated with a first user, in accordance with a determination that the first user has removed a shared authentication credential from a sharing group or the first user has left a sharing group, displaying, via the display generation component, a user interface element (e.g., a security recommendations element 626 in FIG. 6AM) which alerts that first user that one or more authentication credentials were previously shared (e.g., and that it should be reviewed and/or modified). In some embodiments, if the first user has not removed a shared authentication credential from a sharing group or has not left a sharing group the user interface element (e.g., security recommendation element) is not displayed.

Alerting a user when a shared authentication credential is no longer being shared ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 900 further includes while displaying a detailed credential user interface (e.g., interface 620g in FIG. 6AO) that includes information about a respective shared authentication credential, including one or more property setting elements associated with the respective authentication credentials that allows the first user to edit one or more settings related to the respective authentication credential, displaying, via the display generation component, an indication (e.g., indicator 695h in FIG. 6AO) of who (e.g., which user or member of a credential sharing group in which the respective authentication credential was shared) contributed the shared authentication credential. Displaying the user who contributed a shared credential in a detailed credential view ensures that information required to properly share credentials is received, thereby ensuring proper sharing and reducing errors. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 900 further includes while displaying an authentication credential management user interface (e.g., password manager interface 690a in FIGS. 6O and/or 690aa in FIG. 6AM) that includes one or more credential user interface elements (e.g., saved passwords 628) corresponding to one or more authentication credentials associated with the first user, in accordance with a determination of receipt of one or more invitations for the first user to participate in an authentication credential sharing group initiated by one or more other users, displaying, via the display generation component, a respective invitation element (e.g., affordance 686 in FIGS. 6O and/or 686a in FIG. 6AM) for one or more received invitations, and in response to detecting selection of a respective invitation element while displaying the authentication credential management user interface (e.g., password manager interface) that includes one or more credential user interface elements (e.g., saved passwords) corresponding to one or more authentication credentials associated with the first user, displaying, via the display generation component, an invitation response interface (e.g., 686 in FIG. 6O) including an indication of who is (e.g., a list of which user or users are) currently participating (or have been invited to participate) in a sharing group associated with a respective invitation element. In some embodiments, the authentication credential management user interface may concurrently display a plurality of invitations, each inviting the user to join respective, different sharing group. In addition, in some embodiments, the invitation response interface display is based on which of one of a plurality of concurrently displayed invitations is selected.

Displaying a response invitation element that include the users who are currently participating in the respective group, provides a potential group member with the information needed to manage shared credentials, thereby ensuring data privacy and security. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 900 further includes receiving, via a messaging application associated with the first computing system, a notification (e.g., 6177 in FIG. 6AF) from a second user associated with a second computing system (e.g., smart phone, table, and/or computer) inviting the first user to participate in a shared credential group with the second user, and in response to receiving the notification from the second user, displaying, via the display generation component, an invitation element (e.g., 686 in FIG. 6O) including an indication of who is (e.g., a list of which user or users are) currently participating (or have been invited to participate) in the shared credential group associated with the invitation element. Displaying a shared credential group invitation interface that includes the users who are currently participating in the respective group, provides a potential group member with the information needed to manage shared credentials, thereby ensuring data privacy and security. Ensuring proper action of functions and reducing errors enhances the operability of the computing system and makes the user-device interface more efficient, making operation of the computing system faster and more efficient, which conserves power and, for battery devices, increases the time between battery charges.

In some embodiments, method 900 further includes while displaying respective invitation elements (e.g., 686a in FIG. 6AM) for one or more invitations to join a respective sharing group received by the first user, detecting an input corresponding to selection of a respective invitation element and in response to detecting selection of a respective invitation element while displaying the respective invitation elements, displaying an invitation response interface (e.g., 686 in FIG. 6O) including an indication of who is (e.g., a list of which user or users are) currently participating (or have been invited to participate) in a sharing group associated with a respective invitation element. Displaying a response invitation interface that include the users who are currently participating in the respective group, provides a potential group member with the information needed for the user to manage shared credentials, thereby ensuring data privacy and security. Ensuring proper action of functions and reducing errors enhances the operability of the computing system and makes the user-device interface more efficient, making operation of the computing system faster and more efficient, which conserves power and, for battery devices, increases the time between battery charges.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A method, comprising:
at a first computing system that is in communication with a display generation component and one or more input devices, the first computing system being associated with a first user account of a first user:
receiving, via the one or more input devices, one or more inputs that corresponds to a request to access a remote service that requires authentication; and
in response to receiving the one or more inputs that correspond to the request to access the remote service, providing authentication information to the remote service that is based on a private key that is accessible to the first computing system, wherein:
the authentication information does not include the private key;
the private key was established by a second computing system that is different from the first computing system; and
the second computing system is also associated with the first user account.

2. The method of claim 1, wherein the first user account is associated with multiple computing systems and the private key is accessible to the multiple computing system associated with the first user account, including the first computing system and the second computing system.

3. The method of claim 1, further comprising:
receiving, via the one or more input devices, one or more second inputs that correspond to a request to add a private key for generating authentication information associated with a remote service; and
in response to receiving the one or more second inputs that correspond to the request:
associating a new private key with the remote service; and
making the new private key securely accessible to the first computing system; and
making the new private key accessible to the second computing system via a wireless credential synchronization service.

4. The method of claim 1, further comprising:
in accordance with a determination that the private key has been updated at the second computing system, updating the private key accessible to the first computing system.

5. The method of claim 1, further comprising:
displaying, via the display generation component, an authentication information management user interface that includes one or more selectable user interface elements corresponding to different remote services;
receiving, via the one or more input devices, one or more second inputs that corresponds to selection of one of the one or more selectable user interface elements corresponding to a respective remote service;
in response to receiving the one or more second inputs that correspond to selection of the respective remote service, displaying, via the display generation component, an account information management user interface for the respective remote service that includes:
in accordance with a determination that a first type of authentication information associated with the respective remote service is accessible to the first computing system, displaying a first selectable user interface element that corresponds to a second type of authentication information based on a private key; and
in response to receiving one or more third inputs that correspond to selection of the first selectable user interface element:
initiating a process to associate the second type of authentication information based on a private key with the remote service.

6. The method of claim 5, further comprising
while displaying the authentication information management user interface that includes the one or more selectable user interface elements, displaying a second user interface element that corresponds to a request to make authentication information based on a private key accessible to the first computing system;
receiving, via the one or more input devices, one or more third inputs that correspond to selection of the second user interface element; and
in response to receiving the one or more third inputs that correspond to selection of the second user interface element, initiating a process for associating authentication information based on a private key with a remote service; and
after associating authentication information based on the private key with the remote service, making the associated authentication information based on the private key accessible to the first computing system.

7. The method of claim 5, further comprising:
while displaying an account information management user interface for a respective remote service, in accordance with a determination that both a first type of authentication information and a second type of authentication information based on a private key is accessible to the first computing system, displaying a second selectable user interface element that to corresponds to a request to delete the first type of authentication information;
receiving, via the one or more input devices, one or more fourth inputs that correspond to the second selectable user interface element which corresponds to a request to delete the first type of authentication information; and
in response to receiving the one or more fourth inputs that correspond to the request to delete the first type of authentication information, making the first type of authentication information associated with the respective remote service inaccessible to the first computing system.

8. The method of claim 5, further comprising:
while displaying an account information management user interface for a respective remote service, in accordance with a determination that a second type of authentication information based on a private key is accessible to the first computing system, displaying a third selectable user interface element that corresponds to a request to delete the second type of authentication information;
receiving, via the one or more input devices, one or more sixth inputs that correspond to the request to delete the second type of authentication information; and in response to receiving the one or more sixth inputs that correspond to the request to delete the second type of authentication information, making the second type of authentication information associated with the respective remote service inaccessible to the first computing system.

9. The method of claim 5, where the one or more selectable user interface elements include:
a fifth selectable user interface element that allows the first user to change the first type of authentication information associated with the respective remote service;
the method includes detecting selection of the fifth selectable user interface element; and
in response to detecting selection of the fifth selectable user interface element, navigating the first user to a portion of a website associated with the respective remote service that enables the first authentication information to be changed.

10. The method of claim 6, including
while displaying an authentication information management user interface associated with a respective remote service, in accordance with a determination that authentication information based on a private key has been created for a respective remote service, displaying a date created element indicating when the private key was created.

11. The method of claim 1, further comprising:
displaying, via the display generation component, an authentication information management user interface that includes one or more selectable user interface elements, each of the one or more selectable user interface elements being associated with a respective remote service that requires authentication and for which authentication information is accessible to the first computing system;
receiving, via the one or more input devices, one or more second inputs that corresponds to selection of a respective remote service user interface element;
in response to receiving the one or more second inputs that correspond to selection of the respective remote service, displaying, via the display generation component, an account information management user interface for the respective remote service that includes:
one or more authentication user interface elements, each of the one for more authentication user interface element corresponding to a type of authentication information associated with the respective remote service and accessible to the first computing system.

12. The method of claim 1, further comprising
receiving, via the one or more input device, one or more fifth inputs that correspond to a request to change the authentication information based on a private key associated with a remote service and accessible to the first computing sytem; and
in response to receiving the one or more fifth inputs that correspond to the request to change authentication information, initiating a process to change the authentication information and making the changed authentication information accessible to the first computing system; and
after the process initiated with the remote service has been completed, making the changed authentication information securely accessible to the second computing system.

13. The method of claim 12, where initiating a process with the remote service to change the authentication information based on a private key and making the changed authentication information accessible to the first computing system includes:
navigating the first user to a portion of a website associated with the respective remote service that enables the authentication information associated with the remote service to be changed.

14. The method of claim 1, wherein providing the authentication information provided to the remote service includes:
generating a secure token signed using the private key accessible to the first computing system.

15. A non-transitory computer-readable storage medium storing one or more programs configured to be executed by one or more processors of a first computing system that is in communication with a display generation component and one or more input devices, the first computing system associated with a first user account of a first user, and the one or more programs including instructions for:
receiving, via the one or more input devices, one or more inputs that corresponds to a request to access a remote service that requires authentication; and
in response to receiving the one or more inputs that correspond to the request to access the remote service, providing authentication information to the remote service that is based on a private key that is accessible to the first computing system, wherein:
the authentication information does not include the private key;
the private key was established by a second computing system that is different from the first computing system; and
the second computing system is also associated with the first user account.

16. The non-transitory computer-readable storage medium of claim 15, wherein the first user account is associated with multiple computing systems and the private key is accessible to the multiple computing systems associated with the first user account, including the first computing system and the second computing system.

17. The non-transitory computer-readable storage medium of claim 15, the one or more programs further including instructions for:
receiving, via the one or more input devices, one or more second inputs that correspond to a request to add a private key for generating authentication information associated with a remote service; and
in response to receiving the one or more second inputs that correspond to the request:
associating a new private key with the remote service; and
making the new private key securely accessible to the first computing system; and
making the new private key accessible to the second computing system via a wireless credential synchronization service.

18. The non-transitory computer-readable storage medium of claim 15, the one or more programs further including instructions for:
in accordance with a determination that the private key has been updated at the second computing system, updating the private key accessible to the first computing system.

19. The non-transitory computer-readable storage medium of claim 15, the one or more programs further including instructions for:
displaying, via the display generation component, an authentication information management user interface that includes one or more selectable user interface elements corresponding to different remote services;

receiving, via the one or more input devices, one or more second inputs that corresponds to selection of one of the one or more selectable user interface elements corresponding to a respective remote service;

in response to receiving the one or more second inputs that correspond to selection of the respective remote service, displaying, via the display generation component, an account information management user interface for the respective remote service that includes:

in accordance with a determination that a first type of authentication information associated with the respective remote service is accessible to the first computing system, displaying a first selectable user interface element that corresponds to a second type of authentication information based on a private key; and in response to receiving one or more third inputs that correspond to selection of the first selectable user interface element:

initiating a process to associate the second type of authentication information based on a private key with the remote service.

20. The non-transitory computer-readable storage medium of claim 19, the one or more programs further including instructions for:

while displaying the authentication information management user interface that includes the one or more selectable user interface elements, displaying a second user interface element that corresponds to a request to make authentication information based on a private key accessible to the first computing system;

receiving, via the one or more input devices, one or more third inputs that correspond to selection of the second user interface element; and in response to receiving the one or more third inputs that correspond to selection of the second user interface element, initiating a process for associating authentication information based on a private key with a remote service; and after associating authentication information based on the private key with the remote service, making the associated authentication information based on the private key accessible to the first computing system.

21. The non-transitory computer-readable storage medium of claim 19, the one or more programs further including instructions for:

while displaying an account information management user interface for a respective remote service, in accordance with a determination that both a first type of authentication information and a second type of authentication information based on a private key is accessible to the first computing system, displaying a second selectable user interface element that to corresponds to a request to delete the first type of authentication information;

receiving, via the one or more input devices, one or more fourth inputs that correspond to the second selectable user interface element which corresponds to a request to delete the first type of authentication information; and in response to receiving the one or more fourth inputs that correspond to the request to delete the first type of authentication information, making the first type of authentication information associated with the respective remote service inaccessible to the first computing system.

22. The non-transitory computer-readable storage medium of claim 21, where the one or more selectable user interface elements include:

a fifth selectable user interface element that allows the first user to change the first type of authentication information associated with the respective remote service;

the instructions include detecting selection of the fifth selectable user interface element; and in response to detecting selection of the fifth selectable user interface element, navigating the first user to a portion of a website associated with the respective remote service that enables the first type of authentication information to be changed.

23. The non-transitory computer-readable storage medium of claim 19, the one or more programs further including instructions for:

while displaying an account information management user interface for a respective remote service, in accordance with a determination that a second type of authentication information based on a private key is accessible to the first computing system, displaying a third selectable user interface element that corresponds to a request to delete the second type of authentication information;

receiving, via the one or more input devices, one or more sixth inputs that correspond to the request to delete the second type of authentication information; and in response to receiving the one or more sixth inputs that correspond to the request to delete the second type of authentication information, making the second type of authentication information associated with the respective remote service inaccessible to the first computing system.

24. The non-transitory computer-readable storage medium of claim 19, the one or more programs further including instructions for:

while displaying an authentication information management user interface associated with a respective remote service, in accordance with a determination that authentication information based on a private key has been created for a respective remote service, displaying a date created element indicating when the private key was created.

25. The non-transitory computer-readable storage medium of claim 15, the one or more programs further including instructions for:

displaying, via the display generation component, an authentication information management user interface that includes one or more selectable user interface elements, each of the one or more selectable user interface elements being associated with a respective remote service that requires authentication and for which authentication information is accessible to the first computing system;

receiving, via the one or more input devices, one or more second inputs that corresponds to selection of a respective remote service user interface element;

in response to receiving the one or more second inputs that correspond to selection of the respective remote service, displaying, via the display generation component, an account information management user interface for the respective remote service that includes:

one or more authentication user interface elements, each of the one for more authentication user interface element corresponding to a type of authentication information associated with the respective remote service and accessible to the first computing system.

26. The non-transitory computer-readable storage medium of claim 15, the one or more programs further including instructions for:
   receiving, via the one or more input devices, one or more fifth inputs that correspond to a request to change the authentication information based on a private key associated with a remote service and accessible to the first computing system; and
   in response to receiving the one or more fifth inputs that correspond to the request to change authentication information, initiating a process to change the authentication information and making the changed authentication information accessible to the first computing system; and
   after the process initiated with the remote service has been completed, making the changed authentication information securely accessible to the second computing system.

27. The non-transitory computer-readable storage medium of claim 26, where initiating a process with the remote service to change the authentication information based on a private key and making the changed authentication information accessible to the first computing system includes:
   navigating the first user to a portion of a website associated with the respective remote service that enables the authentication information associated with the remote service to be changed.

28. The non-transitory computer-readable storage medium of claim 15, wherein providing the authentication information provided to the remote service includes:
   generating a secure token signed using the private key accessible to the first computing system.

29. A first computing system configured to communicate with a display generation component and one or more input devices, the first computing system associated with a first user account of a first user, and comprising:
   one or more processors; and
   memory storing one or more programs configured to be executed by the one or more processors, the one or more programs including instructions for:
      receiving, via the one or more input devices, one or more inputs that corresponds to a request to access a remote service that requires authentication; and
      in response to receiving the one or more inputs that correspond to the request to access the remote service, providing authentication information to the remote service that is based on a private key that is accessible to a first computing system, wherein:
         the authentication information does not include the private key;
         the private key was established by a second computing system that is different from the first computing system; and
         the second computing system is also associated with the first user account.

30. The first computing system of claim 29, wherein the first user account is associated with multiple computing systems and the private key is accessible to the multiple computing systems associated with the first user account, including the first computing system and the second computing system.

31. The first computing system of claim 29, the one or more programs further including instructions for:
   receiving, via the one or more input devices, one or more second inputs that correspond to a request to add a private key for generating authentication information associated with a remote service; and
   in response to receiving the one or more second inputs that correspond to the request:
      associating a new private key with the remote service; and
         making the new private key securely accessible to the first computing system; and
         making the new private key accessible to the second computing system via a wireless credential synchronization service.

32. The first computing system of claim 29, the one or more programs further including instructions for:
   in accordance with a determination that the private key has been updated at the second computing system, updating the private key accessible to the first computing system.

33. The first computing system of claim 29, the one or more programs further including instructions for:
   displaying, via the display generation component, an authentication information management user interface that includes one or more selectable user interface elements corresponding to different remote services;
   receiving, via the one or more input devices, one or more second inputs that corresponds to selection of one of the one or more selectable user interface elements corresponding to a respective remote service;
   in response to receiving the one or more second inputs that correspond to selection of the respective remote service, displaying, via the display generation component, an account information management user interface for the respective remote service that includes:
      in accordance with a determination that a first type of authentication information associated with the respective remote service is accessible to the first computing system, displaying a first selectable user interface element that corresponds to a second type of authentication information based on a private key; and
      in response to receiving one or more third inputs that correspond to selection of the first selectable user interface element:
         initiating a process to associate the second type of authentication information based on a private key with the remote service.

34. The first computing system of claim 33, the one or more programs further including instructions for:
   while displaying the authentication information management user interface that includes the one or more selectable user interface elements, displaying a second user interface element that corresponds to a request to make authentication information based on a private key accessible to the first computing system;
   receiving, via the one or more input devices, one or more third inputs that correspond to selection of the second user interface element; and
   in response to receiving the one or more third inputs that correspond to selection of the second user interface element, initiating a process for associating authentication information based on a private key with a remote service; and
   after associating authentication information based on the private key with the remote service, making the associated authentication information based on the private key accessible to the first computing system.

35. The first computing system of claim 33, the one or more programs further including instructions for:

while displaying an account information management user interface for a respective remote service, in accordance with a determination that both a first type of authentication information and a second type of authentication information based on a private key is accessible to the first computing system, displaying a second selectable user interface element that to corresponds to a request to delete the first type of authentication information;

receiving, via the one or more input devices, one or more fourth inputs that correspond to the second selectable user interface element which corresponds to a request to delete the first type of authentication information; and in response to receiving the one or more fourth inputs that correspond to the request to delete the first type of authentication information, making the first type of authentication information associated with the respective remote service inaccessible to the first computing system.

36. The first computing system of claim 35, where the one or more selectable user interface elements include:

a fifth selectable user interface element that allows the first user to change the first type of authentication information associated with the respective remote service;

the instructions include detecting selection of the fifth selectable user interface element; and in response to detecting selection of the fifth selectable user interface element, navigating the first user to a portion of a website associated with the respective remote service that enables the first type of authentication information to be changed.

37. The first computing system of claim 33, the one or more programs further including instructions for:

while displaying an account information management user interface for a respective remote service, in accordance with a determination that a second type of authentication information based on a private key is accessible to the first computing system, displaying a third selectable user interface element that corresponds to a request to delete the second type of authentication information;

receiving, via the one or more input devices, one or more sixth inputs that correspond to the request to delete the second type of authentication information; and in response to receiving the one or more sixth inputs that correspond to the request to delete the second type of authentication information, making the second type of authentication information associated with the respective remote service inaccessible to the first computing system.

38. The first computing system of claim 33, the one or more programs further including instructions for:

while displaying an authentication information management user interface associated with a respective remote service, in accordance with a determination that authentication information based on a private key has been created for a respective remote service, displaying a date created element indicating when the private key was created.

39. The first computing system of claim 29, the one or more programs further including instructions for:

displaying, via the display generation component, an authentication information management user interface that includes one or more selectable user interface elements, each of the one or more selectable user interface elements being associated with a respective remote service that requires authentication and for which authentication information is accessible to the first computing system;

receiving, via the one or more input devices, one or more second inputs that corresponds to selection of a respective remote service user interface element;

in response to receiving the one or more second inputs that correspond to selection of the respective remote service, displaying, via the display generation component, an account information management user interface for the respective remote service that includes:

one or more authentication user interface elements, each of the one for more authentication user interface element corresponding to a type of authentication information associated with the respective remote service and accessible to the first computing system.

40. The first computing system of claim 29, the one or more programs further including instructions for:

receiving, via the one or more input devices, one or more fifth inputs that correspond to a request to change the authentication information based on a private key associated with a remote service and accessible to the first computing system; and in response to receiving the one or more fifth inputs that correspond to the request to change authentication information, initiating a process to change the authentication information and making the changed authentication information accessible to the first computing system; and after the process initiated with the remote service has been completed, making the changed authentication information securely accessible to the second computing system.

41. The first computing system of claim 40, where initiating a process with the remote service to change the authentication information based on a private key and making the changed authentication information accessible to the first computing system includes:

navigating the first user to a portion of a website associated with the respective remote service that enables the authentication information associated with the remote service to be changed.

42. The first computing system of claim 29, wherein providing the authentication information provided to the remote service includes:

generating a secure token signed using the private key accessible to the first computing system.

* * * * *